(12) United States Patent
Triverio

(10) Patent No.: US 12,379,834 B2
(45) Date of Patent: Aug. 5, 2025

(54) EDITING FEATURES OF AN AVATAR

(71) Applicant: Apple Inc., Cupertino, CA (US)

(72) Inventor: Marco Triverio, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/378,470

(22) Filed: Oct. 10, 2023

(65) Prior Publication Data

US 2024/0036717 A1 Feb. 1, 2024

Related U.S. Application Data

(63) Continuation of application No. 17/093,408, filed on Nov. 9, 2020, now Pat. No. 11,921,998.

(60) Provisional application No. 63/077,922, filed on Sep. 14, 2020, provisional application No. 63/023,178, filed on May 11, 2020.

(51) Int. Cl.
| | |
|---|---|
| *G06F 3/04845* | (2022.01) |
| *G06F 3/04842* | (2022.01) |
| *G06F 3/04883* | (2022.01) |
| *G06T 13/40* | (2011.01) |
| *G06T 19/20* | (2011.01) |

(52) U.S. Cl.
CPC ...... *G06F 3/04845* (2013.01); *G06F 3/04842* (2013.01); *G06F 3/04883* (2013.01); *G06T 13/40* (2013.01); *G06T 19/20* (2013.01); *G06T 2219/2012* (2013.01); *G06T 2219/2021* (2013.01)

(58) Field of Classification Search
CPC ............. G06F 3/04845; G06F 3/04842; G06F 3/0488; G06F 3/04883; G06T 13/00; G06T 13/20; G06T 13/40; G06T 19/00; G06T 19/20; G06T 2219/2012; G06T 2219/2021; G06T 2219/2024
USPC ........................................................ 715/764
See application file for complete search history.

(56) References Cited

U.S. PATENT DOCUMENTS

| | | |
|---|---|---|
| 3,633,354 A | 1/1972 | Stemmler |
| 4,847,819 A | 7/1989 | Hong |
| 4,945,521 A | 7/1990 | Klaus |
| 5,383,165 A | 1/1995 | Vaucher |

(Continued)

FOREIGN PATENT DOCUMENTS

| | | |
|---|---|---|
| AU | 2015101639 A4 | 12/2015 |
| AU | 2017100683 B4 | 1/2018 |

(Continued)

OTHER PUBLICATIONS

Non-Final Office Action received for U.S. Appl. No. 18/230,465, mailed on Aug. 15, 2024, 37 pages.

(Continued)

*Primary Examiner* — Hwei-Min Lu
(74) *Attorney, Agent, or Firm* — DLA Piper LLP (US)

(57) ABSTRACT

The present disclosure generally relates to an avatar editing user interface. The avatar editing user interface includes a first view of an avatar at a first size. A request to enter an editing mode for a first feature of a plurality of avatar features of the avatar enables an editing mode for the first feature and causes a second view of the avatar at a second size to be displayed. The editing mode also shifts the avatar to emphasize the first feature relative to other avatar features.

27 Claims, 34 Drawing Sheets

(56) References Cited

U.S. PATENT DOCUMENTS

| | | |
|---|---|---|
| 6,084,598 A | 7/2000 | Chekerylla |
| 6,621,524 B1 | 9/2003 | Iijima et al. |
| 7,180,524 B1 | 2/2007 | Axelrod |
| 7,227,976 B1 | 6/2007 | Jung et al. |
| 7,716,057 B2 | 5/2010 | Horvitz |
| 7,751,285 B1 | 7/2010 | Cain et al. |
| 7,840,668 B1 | 11/2010 | Sylvain et al. |
| 7,908,554 B1 | 3/2011 | Blattner |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,280,979 B2 | 10/2012 | Kunz et al. |
| 8,295,546 B2 | 10/2012 | Craig et al. |
| 8,390,628 B2 | 3/2013 | Harding et al. |
| 8,423,089 B2 | 4/2013 | Song et al. |
| 8,506,396 B1 | 8/2013 | Snyder et al. |
| 8,584,031 B2 | 11/2013 | Moore et al. |
| 8,732,609 B1 | 5/2014 | Bayersdorfer et al. |
| 8,896,652 B2 | 11/2014 | Ralston |
| 8,996,639 B1 | 3/2015 | Faaborg et al. |
| 9,041,764 B2 | 5/2015 | Wang et al. |
| 9,094,576 B1 | 7/2015 | Karakotsios |
| 9,153,031 B2 | 10/2015 | El-Saban et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,264,660 B1 | 2/2016 | Petterson et al. |
| 9,298,257 B2 | 3/2016 | Hwang et al. |
| 9,298,263 B2 | 3/2016 | Geisner et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,489,074 B2 | 11/2016 | Oonishi |
| 9,542,070 B2 | 1/2017 | Xu et al. |
| 9,602,559 B1 | 3/2017 | Barros et al. |
| 9,625,987 B1 | 4/2017 | Lapenna et al. |
| 9,628,416 B2 | 4/2017 | Henderson |
| 9,686,497 B1 | 6/2017 | Terry |
| 9,760,976 B2 | 9/2017 | Kameyama |
| 9,786,084 B1 | 10/2017 | Bhat et al. |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,139,218 B2 | 11/2018 | Matsushita |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,341,612 B2 | 7/2019 | Imaoka |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,410,434 B1 | 9/2019 | Scapel et al. |
| 10,496,244 B2 | 12/2019 | Reynolds et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,620,590 B1 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,811,055 B1 | 10/2020 | Kimber et al. |
| 10,817,981 B1 | 10/2020 | Belkin |
| 10,845,968 B2 | 11/2020 | Scapel et al. |
| 10,855,910 B2 | 12/2020 | Tano et al. |
| 10,902,661 B1 | 1/2021 | Mourkogiannis et al. |
| 10,984,569 B2 | 4/2021 | Bondich et al. |
| 11,061,372 B1 | 7/2021 | Chen et al. |
| 11,107,261 B2 | 8/2021 | Scapel et al. |
| 11,188,190 B2 | 11/2021 | Blackstock et al. |
| 11,217,036 B1 | 1/2022 | Albuz et al. |
| 11,361,521 B2 | 6/2022 | Lee et al. |
| 11,467,713 B2 | 10/2022 | Buzyn et al. |
| 11,729,339 B2 | 8/2023 | Morii |
| 11,798,246 B2 | 10/2023 | Lee et al. |
| 12,033,296 B2 | 7/2024 | Scapel et al. |
| 2001/0019330 A1 | 9/2001 | Bickmore et al. |
| 2001/0050689 A1 | 12/2001 | Park |
| 2002/0054157 A1 | 5/2002 | Hayashi et al. |
| 2002/0135581 A1 | 9/2002 | Russell et al. |
| 2002/0180797 A1 | 12/2002 | Bachmann |
| 2003/0074647 A1 | 4/2003 | Andrew et al. |
| 2003/0135769 A1 | 7/2003 | Loughran |
| 2003/0140309 A1 | 7/2003 | Saito et al. |
| 2003/0206170 A1 | 11/2003 | Bickmore et al. |
| 2004/0075699 A1 | 4/2004 | Franchi et al. |
| 2004/0179039 A1 | 9/2004 | Blattner et al. |
| 2004/0203342 A1 | 10/2004 | Sibecas et al. |
| 2004/0225966 A1 | 11/2004 | Besharat et al. |
| 2005/0122543 A1 | 6/2005 | Walker |
| 2005/0124389 A1 | 6/2005 | Yang |
| 2005/0125744 A1 | 6/2005 | Hubbard et al. |
| 2005/0168566 A1 | 8/2005 | Tada et al. |
| 2005/0174216 A1 | 8/2005 | Lintell |
| 2005/0190653 A1 | 9/2005 | Chen |
| 2005/0248574 A1 | 11/2005 | Ashtekar et al. |
| 2005/0257042 A1 | 11/2005 | Sierra et al. |
| 2005/0261031 A1 | 11/2005 | Seo et al. |
| 2006/0020904 A1 | 1/2006 | Aaltonen et al. |
| 2006/0035632 A1 | 2/2006 | Sorvari et al. |
| 2006/0055700 A1 | 3/2006 | Niles et al. |
| 2006/0166708 A1 | 7/2006 | Kim et al. |
| 2006/0188144 A1 | 8/2006 | Sasaki et al. |
| 2006/0294465 A1 | 12/2006 | Ronen et al. |
| 2007/0003915 A1 | 1/2007 | Templeman |
| 2007/0024614 A1 | 2/2007 | Tam et al. |
| 2007/0052851 A1 | 3/2007 | Ochs et al. |
| 2007/0097113 A1 | 5/2007 | Lee et al. |
| 2007/0113181 A1* | 5/2007 | Blattner ............ G06Q 10/107 715/753 |
| 2007/0162872 A1 | 7/2007 | Hong et al. |
| 2007/0168863 A1 | 7/2007 | Blattner et al. |
| 2007/0171091 A1 | 7/2007 | Nisenboim et al. |
| 2007/0192718 A1 | 8/2007 | Voorhees et al. |
| 2007/0226653 A1 | 9/2007 | Moore et al. |
| 2007/0260984 A1 | 11/2007 | Marks et al. |
| 2008/0046839 A1 | 2/2008 | Mehra et al. |
| 2008/0052242 A1 | 2/2008 | Merritt et al. |
| 2008/0082934 A1 | 4/2008 | Kocienda et al. |
| 2008/0095470 A1 | 4/2008 | Chao et al. |
| 2008/0098031 A1 | 4/2008 | Ducharme |
| 2008/0155428 A1 | 6/2008 | Lee |
| 2008/0158232 A1 | 7/2008 | Shuster |
| 2008/0201438 A1 | 8/2008 | Mandre et al. |
| 2008/0250315 A1 | 10/2008 | Eronen et al. |
| 2008/0298571 A1 | 12/2008 | Kurtz et al. |
| 2008/0309677 A1 | 12/2008 | Fleury et al. |
| 2008/0316227 A1 | 12/2008 | Fleury et al. |
| 2009/0027337 A1 | 1/2009 | Hildreth |
| 2009/0031240 A1 | 1/2009 | Hildreth |
| 2009/0044113 A1 | 2/2009 | Jones et al. |
| 2009/0066817 A1 | 3/2009 | Sakamaki |
| 2009/0077497 A1 | 3/2009 | Cho et al. |
| 2009/0100342 A1 | 4/2009 | Jakobson et al. |
| 2009/0144173 A1 | 6/2009 | Mo et al. |
| 2009/0144639 A1 | 6/2009 | Nims et al. |
| 2009/0201297 A1 | 8/2009 | Johansson |
| 2009/0202114 A1 | 8/2009 | Morin et al. |
| 2009/0216691 A1 | 8/2009 | Borzestowski et al. |
| 2009/0231356 A1 | 9/2009 | Barnes et al. |
| 2009/0233650 A1 | 9/2009 | Hosono |
| 2009/0249247 A1 | 10/2009 | Tseng et al. |
| 2009/0251484 A1 | 10/2009 | Zhao et al. |
| 2009/0254624 A1 | 10/2009 | Baudin et al. |

(56) References Cited

U.S. PATENT DOCUMENTS

| | | |
|---|---|---|
| 2009/0254859 A1* | 10/2009 | Arrasvuori ............ G06Q 10/10 |
| | | 715/810 |
| 2009/0254862 A1 | 10/2009 | Viginisson et al. |
| 2009/0271705 A1 | 10/2009 | Sheng et al. |
| 2009/0297022 A1 | 12/2009 | Pettigrew et al. |
| 2009/0300513 A1 | 12/2009 | Nims et al. |
| 2009/0300525 A1 | 12/2009 | Jolliff et al. |
| 2009/0325701 A1 | 12/2009 | Andres Del Valle |
| 2010/0009747 A1 | 1/2010 | Reville et al. |
| 2010/0026640 A1 | 2/2010 | Kim et al. |
| 2010/0030660 A1 | 2/2010 | Edwards |
| 2010/0097375 A1 | 4/2010 | Tadaishi et al. |
| 2010/0123724 A1 | 5/2010 | Moore et al. |
| 2010/0123915 A1 | 5/2010 | Kashimoto |
| 2010/0124941 A1 | 5/2010 | Cho |
| 2010/0125811 A1 | 5/2010 | Moore et al. |
| 2010/0149573 A1 | 6/2010 | Pat et al. |
| 2010/0153847 A1 | 6/2010 | Fama |
| 2010/0156807 A1 | 6/2010 | Stallings et al. |
| 2010/0169801 A1* | 7/2010 | Blattner ................ H04L 65/403 |
| | | 715/758 |
| 2010/0188426 A1 | 7/2010 | Ohmori et al. |
| 2010/0203968 A1 | 8/2010 | Gill et al. |
| 2010/0211899 A1 | 8/2010 | Fujioka |
| 2010/0218089 A1 | 8/2010 | Chao et al. |
| 2010/0251176 A1 | 9/2010 | Fong et al. |
| 2010/0257469 A1 | 10/2010 | Kim et al. |
| 2010/0277470 A1 | 11/2010 | Margolis |
| 2010/0302138 A1 | 12/2010 | Poot et al. |
| 2010/0317410 A1 | 12/2010 | Song et al. |
| 2011/0004524 A1 | 1/2011 | Paul et al. |
| 2011/0007174 A1 | 1/2011 | Bacivarov et al. |
| 2011/0016425 A1 | 1/2011 | Homburg et al. |
| 2011/0057903 A1 | 3/2011 | Yamano et al. |
| 2011/0061017 A1 | 3/2011 | Ullrich et al. |
| 2011/0072394 A1 | 3/2011 | Victor et al. |
| 2011/0074807 A1 | 3/2011 | Inada et al. |
| 2011/0119610 A1 | 5/2011 | Hackborn et al. |
| 2011/0175832 A1 | 7/2011 | Miyazawa et al. |
| 2011/0205182 A1 | 8/2011 | Miyazawa et al. |
| 2011/0221755 A1 | 9/2011 | Geisner et al. |
| 2011/0239115 A1 | 9/2011 | Williams et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1* | 10/2011 | Van Os .................. A63F 13/63 |
| | | 717/173 |
| 2011/0256848 A1 | 10/2011 | Bok et al. |
| 2011/0265002 A1 | 10/2011 | Hong et al. |
| 2011/0285656 A1 | 11/2011 | Yaksick et al. |
| 2011/0302518 A1 | 12/2011 | Zhang |
| 2011/0304632 A1 | 12/2011 | Evertt et al. |
| 2012/0011449 A1 | 1/2012 | Sasson et al. |
| 2012/0017180 A1 | 1/2012 | Flik et al. |
| 2012/0059787 A1 | 3/2012 | Brown et al. |
| 2012/0069028 A1 | 3/2012 | Bouguerra |
| 2012/0075328 A1 | 3/2012 | Goossens |
| 2012/0079378 A1 | 3/2012 | Goossens |
| 2012/0084692 A1 | 4/2012 | Bae |
| 2012/0102399 A1 | 4/2012 | Nicholson |
| 2012/0113008 A1 | 5/2012 | Makinen et al. |
| 2012/0113762 A1 | 5/2012 | Frost |
| 2012/0158515 A1 | 6/2012 | K |
| 2012/0174029 A1 | 7/2012 | Bastide et al. |
| 2012/0206452 A1 | 8/2012 | Geisner et al. |
| 2012/0210263 A1 | 8/2012 | Perry et al. |
| 2012/0254318 A1 | 10/2012 | Poniatowskl |
| 2012/0256967 A1 | 10/2012 | Baldwin et al. |
| 2012/0293686 A1 | 11/2012 | Karn et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2013/0014019 A1 | 1/2013 | Kim et al. |
| 2013/0015946 A1 | 1/2013 | Lau et al. |
| 2013/0024781 A1 | 1/2013 | Douillet et al. |
| 2013/0024802 A1 | 1/2013 | Zeng et al. |
| 2013/0038759 A1 | 2/2013 | Jo et al. |
| 2013/0063366 A1 | 3/2013 | Paul |
| 2013/0067391 A1 | 3/2013 | Pittappilly et al. |
| 2013/0080287 A1* | 3/2013 | Currie ................ G06Q 30/0621 |
| | | 705/26.5 |
| 2013/0101164 A1 | 4/2013 | Leclerc et al. |
| 2013/0113956 A1 | 5/2013 | Anderson et al. |
| 2013/0117383 A1 | 5/2013 | Hymel et al. |
| 2013/0135315 A1 | 5/2013 | Bares et al. |
| 2013/0141365 A1 | 6/2013 | Lynn et al. |
| 2013/0141513 A1 | 6/2013 | Setton et al. |
| 2013/0147933 A1 | 6/2013 | Kulas et al. |
| 2013/0157646 A1 | 6/2013 | Ferren et al. |
| 2013/0157729 A1 | 6/2013 | Tabe |
| 2013/0159900 A1 | 6/2013 | Pendharkar |
| 2013/0160141 A1 | 6/2013 | Tseng et al. |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0234964 A1 | 9/2013 | Kim et al. |
| 2013/0238686 A1 | 9/2013 | O'Donoghue et al. |
| 2013/0263043 A1 | 10/2013 | Sarbin et al. |
| 2013/0275875 A1 | 10/2013 | Gruber et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0322218 A1 | 12/2013 | Burkhardt et al. |
| 2013/0342730 A1 | 12/2013 | Lee et al. |
| 2014/0015784 A1 | 1/2014 | Oonishi |
| 2014/0043329 A1 | 2/2014 | Wang et al. |
| 2014/0047389 A1 | 2/2014 | Aarabi |
| 2014/0055554 A1 | 2/2014 | Du et al. |
| 2014/0078144 A1 | 3/2014 | Berriman et al. |
| 2014/0115488 A1 | 4/2014 | Hackborn |
| 2014/0123005 A1 | 5/2014 | Forstall et al. |
| 2014/0137013 A1 | 5/2014 | Matas |
| 2014/0143682 A1 | 5/2014 | Druck et al. |
| 2014/0143693 A1 | 5/2014 | Goossens et al. |
| 2014/0149878 A1 | 5/2014 | Mischari et al. |
| 2014/0157167 A1 | 6/2014 | Zhu |
| 2014/0164955 A1 | 6/2014 | Thiruvidam et al. |
| 2014/0168217 A1 | 6/2014 | Kim et al. |
| 2014/0181219 A1 | 6/2014 | Wang et al. |
| 2014/0195972 A1 | 7/2014 | Lee et al. |
| 2014/0218371 A1 | 8/2014 | Du et al. |
| 2014/0237393 A1 | 8/2014 | Van Wie et al. |
| 2014/0267618 A1 | 9/2014 | Esteban et al. |
| 2014/0300635 A1 | 10/2014 | Suzuki |
| 2014/0306898 A1 | 10/2014 | Cueto |
| 2014/0333671 A1 | 11/2014 | Phang et al. |
| 2014/0336808 A1 | 11/2014 | Taylor et al. |
| 2014/0351720 A1 | 11/2014 | Yin |
| 2014/0362091 A1 | 12/2014 | Bouaziz et al. |
| 2014/0368601 A1 | 12/2014 | Decharms |
| 2015/0011204 A1 | 1/2015 | Seo et al. |
| 2015/0033192 A1 | 1/2015 | Bohannon et al. |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0052462 A1 | 2/2015 | Kulkarni |
| 2015/0058754 A1 | 2/2015 | Rauh |
| 2015/0062052 A1 | 3/2015 | Bernstein et al. |
| 2015/0070378 A1 | 3/2015 | Kriese et al. |
| 2015/0077502 A1 | 3/2015 | Jordan et al. |
| 2015/0078621 A1 | 3/2015 | Choi et al. |
| 2015/0082193 A1 | 3/2015 | Wallace et al. |
| 2015/0082446 A1 | 3/2015 | Flowers et al. |
| 2015/0091896 A1 | 4/2015 | Tarquini et al. |
| 2015/0100537 A1 | 4/2015 | Grieves et al. |
| 2015/0113435 A1 | 4/2015 | Phillips |
| 2015/0149899 A1 | 5/2015 | Bernstein et al. |
| 2015/0149927 A1 | 5/2015 | Walkin et al. |
| 2015/0153952 A1 | 6/2015 | Grossman et al. |
| 2015/0195179 A1 | 7/2015 | Skare et al. |
| 2015/0213604 A1 | 7/2015 | Li et al. |

(56) References Cited

U.S. PATENT DOCUMENTS

| | | |
|---|---|---|
| 2015/0248235 A1 | 9/2015 | Offenberg et al. |
| 2015/0253740 A1 | 9/2015 | Nishijima et al. |
| 2015/0254396 A1 | 9/2015 | Tamura et al. |
| 2015/0281145 A1 | 10/2015 | Ji |
| 2015/0302624 A1 | 10/2015 | Burke |
| 2015/0312175 A1 | 10/2015 | Langholz |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0334075 A1 | 11/2015 | Wang et al. |
| 2015/0350141 A1 | 12/2015 | Yang et al. |
| 2015/0366293 A1 | 12/2015 | Clarkson |
| 2015/0370529 A1 | 12/2015 | Zambetti et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0050169 A1 | 2/2016 | Ben Atar et al. |
| 2016/0062582 A1 | 3/2016 | Wilson et al. |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0103427 A1 | 4/2016 | Westra et al. |
| 2016/0117147 A1 | 4/2016 | Zambetti et al. |
| 2016/0132200 A1 | 5/2016 | Walkin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0187995 A1 | 6/2016 | Rosewall |
| 2016/0217601 A1 | 7/2016 | Tsuda et al. |
| 2016/0226926 A1 | 8/2016 | Singh et al. |
| 2016/0227121 A1 | 8/2016 | Matsushita |
| 2016/0247309 A1 | 8/2016 | Li et al. |
| 2016/0259413 A1 | 9/2016 | Anzures et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0275724 A1 | 9/2016 | Adeyoola et al. |
| 2016/0284123 A1 | 9/2016 | Hare et al. |
| 2016/0323507 A1 | 11/2016 | Chong et al. |
| 2016/0327911 A1 | 11/2016 | Eim et al. |
| 2016/0328875 A1 | 11/2016 | Fang et al. |
| 2016/0357282 A1 | 12/2016 | Block et al. |
| 2016/0357720 A1 | 12/2016 | Thimbleby |
| 2016/0370974 A1 | 12/2016 | Stenneth |
| 2017/0003659 A1 | 1/2017 | Nakanishi |
| 2017/0018289 A1 | 1/2017 | Morgenstern |
| 2017/0032554 A1 | 2/2017 | O'Donovan et al. |
| 2017/0046065 A1 | 2/2017 | Zeng et al. |
| 2017/0061635 A1 | 3/2017 | Petrovich et al. |
| 2017/0068439 A1 | 3/2017 | Mohseni |
| 2017/0069124 A1 | 3/2017 | Tong et al. |
| 2017/0080346 A1* | 3/2017 | Abbas ..................... A63F 13/79 |
| 2017/0082983 A1 | 3/2017 | Katzer et al. |
| 2017/0083086 A1 | 3/2017 | Mazur et al. |
| 2017/0111616 A1 | 4/2017 | Li et al. |
| 2017/0123571 A1 | 5/2017 | Huang et al. |
| 2017/0124751 A1 | 5/2017 | Ross et al. |
| 2017/0131886 A1 | 5/2017 | Kim et al. |
| 2017/0140214 A1 | 5/2017 | Matas et al. |
| 2017/0164888 A1 | 6/2017 | Matsuda et al. |
| 2017/0178287 A1 | 6/2017 | Anderson |
| 2017/0193684 A1 | 7/2017 | Du et al. |
| 2017/0206095 A1 | 7/2017 | Gibbs et al. |
| 2017/0220212 A1 | 8/2017 | Yang et al. |
| 2017/0236298 A1 | 8/2017 | Vetter |
| 2017/0255169 A1 | 9/2017 | Lee et al. |
| 2017/0269715 A1 | 9/2017 | Kim et al. |
| 2017/0285916 A1 | 10/2017 | Xu et al. |
| 2017/0286913 A1 | 10/2017 | Liu et al. |
| 2017/0322711 A1 | 11/2017 | Robinson et al. |
| 2017/0323266 A1 | 11/2017 | Seo |
| 2017/0332045 A1 | 11/2017 | Mette et al. |
| 2017/0336926 A1 | 11/2017 | Chaudhri et al. |
| 2017/0336928 A1 | 11/2017 | Chaudhri et al. |
| 2017/0337554 A1 | 11/2017 | Mokhasi et al. |
| 2017/0352091 A1 | 12/2017 | Chen et al. |
| 2018/0004404 A1 | 1/2018 | Delfino et al. |
| 2018/0024726 A1 | 1/2018 | Hviding |
| 2018/0034867 A1 | 2/2018 | Zahn et al. |
| 2018/0047200 A1* | 2/2018 | O'Hara ................. G06V 10/242 |
| 2018/0059903 A1 | 3/2018 | Lim et al. |
| 2018/0067633 A1 | 3/2018 | Wilson et al. |
| 2018/0074693 A1 | 3/2018 | Jones et al. |
| 2018/0081515 A1 | 3/2018 | Block et al. |
| 2018/0088787 A1 | 3/2018 | Bereza et al. |
| 2018/0091732 A1* | 3/2018 | Wilson ..................... G06F 3/048 |
| 2018/0095635 A1 | 4/2018 | Valdivia et al. |
| 2018/0095649 A1 | 4/2018 | Valdivia et al. |
| 2018/0114543 A1 | 4/2018 | Novikoff |
| 2018/0121060 A1 | 5/2018 | Jeong et al. |
| 2018/0131878 A1 | 5/2018 | Charlton et al. |
| 2018/0165862 A1 | 6/2018 | Sawaki |
| 2018/0165863 A1 | 6/2018 | Kubo et al. |
| 2018/0189549 A1 | 7/2018 | Inomata |
| 2018/0191944 A1 | 7/2018 | Carbonell et al. |
| 2018/0246639 A1 | 8/2018 | Han et al. |
| 2018/0268589 A1 | 9/2018 | Grant |
| 2018/0275750 A1 | 9/2018 | Zeng |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349795 A1 | 12/2018 | Boyle et al. |
| 2019/0050045 A1 | 2/2019 | Jha et al. |
| 2019/0058827 A1 | 2/2019 | Park et al. |
| 2019/0072909 A1 | 3/2019 | Misaki et al. |
| 2019/0080070 A1 | 3/2019 | Van Os et al. |
| 2019/0080072 A1 | 3/2019 | Van Os et al. |
| 2019/0080189 A1 | 3/2019 | Van Os et al. |
| 2019/0088018 A1 | 3/2019 | Shenton et al. |
| 2019/0096106 A1 | 3/2019 | Shapiro et al. |
| 2019/0114038 A1* | 4/2019 | Geiger ..................... G06T 11/60 |
| 2019/0139207 A1 | 5/2019 | Jeong et al. |
| 2019/0158735 A1 | 5/2019 | Wilson et al. |
| 2019/0160378 A1 | 5/2019 | Fajt et al. |
| 2019/0235748 A1 | 8/2019 | Seol et al. |
| 2019/0266775 A1 | 8/2019 | Lee et al. |
| 2019/0266807 A1* | 8/2019 | Lee ......................... G06T 11/001 |
| 2019/0295056 A1 | 9/2019 | Wright |
| 2019/0310761 A1 | 10/2019 | Agarawala et al. |
| 2019/0339847 A1* | 11/2019 | Scapel .................... G06T 13/80 |
| 2019/0342507 A1* | 11/2019 | Dye ........................ G06T 13/40 |
| 2019/0347868 A1 | 11/2019 | Scapel et al. |
| 2019/0354265 A1 | 11/2019 | Winnemoeller |
| 2019/0369836 A1 | 12/2019 | Faulkner et al. |
| 2019/0370448 A1 | 12/2019 | Devine et al. |
| 2019/0371033 A1 | 12/2019 | Scapel et al. |
| 2020/0034025 A1 | 1/2020 | Brady et al. |
| 2020/0045245 A1 | 2/2020 | Van Os et al. |
| 2020/0068095 A1 | 2/2020 | Nabetani |
| 2020/0089302 A1 | 3/2020 | Kim et al. |
| 2020/0104620 A1 | 4/2020 | Cohen et al. |
| 2020/0201540 A1 | 6/2020 | Zambetti et al. |
| 2020/0226848 A1 | 7/2020 | Van Os et al. |
| 2020/0234481 A1 | 7/2020 | Scapel et al. |
| 2020/0234508 A1 | 7/2020 | Shaburov et al. |
| 2020/0264738 A1 | 8/2020 | Lee et al. |
| 2020/0265234 A1 | 8/2020 | Lee et al. |
| 2020/0285851 A1 | 9/2020 | Lin et al. |
| 2020/0311429 A1 | 10/2020 | Chen |
| 2020/0358725 A1 | 11/2020 | Scapel et al. |
| 2020/0380103 A1 | 12/2020 | Hosoda |
| 2020/0380768 A1 | 12/2020 | Harris et al. |
| 2020/0380781 A1 | 12/2020 | Barlier et al. |
| 2020/0402304 A1 | 12/2020 | Hwang et al. |

(56) References Cited

U.S. PATENT DOCUMENTS

| | | | |
|---|---|---|---|
| 2020/0409533 A1 | 12/2020 | Blackstock et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0056769 A1 | 2/2021 | Scapel et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0089136 A1 | 3/2021 | Hossain et al. |
| 2021/0096703 A1 | 4/2021 | Anzures et al. |
| 2021/0099568 A1 | 4/2021 | Depue et al. |
| 2021/0099761 A1 | 4/2021 | Zhang |
| 2021/0152505 A1 | 5/2021 | Baldwin et al. |
| 2021/0168108 A1 | 6/2021 | Antmen et al. |
| 2021/0264656 A1 | 8/2021 | Barlier et al. |
| 2021/0287343 A1 | 9/2021 | Kaida |
| 2021/0311609 A1 | 10/2021 | Dandoko |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349612 A1 | 11/2021 | Triverio |
| 2021/0375042 A1 | 12/2021 | Chen et al. |
| 2021/0390753 A1 | 12/2021 | Scapel et al. |
| 2021/0405831 A1 | 12/2021 | Mourkogiannis et al. |
| 2022/0070385 A1 | 3/2022 | Van Os et al. |
| 2022/0084279 A1 | 3/2022 | Lindmeier et al. |
| 2022/0124140 A1 | 4/2022 | Okina et al. |
| 2022/0134234 A1 | 5/2022 | Sachson et al. |
| 2022/0206675 A1 | 6/2022 | Hawkes |
| 2022/0229546 A1 | 7/2022 | Lee et al. |
| 2022/0230379 A1 | 7/2022 | Shriram et al. |
| 2022/0253136 A1 | 8/2022 | Holder et al. |
| 2022/0262080 A1 | 8/2022 | Burton et al. |
| 2022/0291793 A1 | 9/2022 | Zambetti et al. |
| 2022/0301041 A1 | 9/2022 | Lee et al. |
| 2022/0319075 A1 | 10/2022 | Hu et al. |
| 2022/0374137 A1 | 11/2022 | Triverio et al. |
| 2022/0392132 A1 | 12/2022 | Sepulveda et al. |
| 2023/0004270 A1 | 1/2023 | Chen et al. |
| 2023/0043249 A1 | 2/2023 | Van Os et al. |
| 2023/0214107 A1 | 7/2023 | Zambetti et al. |
| 2023/0229283 A1 | 7/2023 | Long et al. |
| 2023/0283884 A1 | 9/2023 | Van Os et al. |
| 2023/0305688 A1 | 9/2023 | Triverio et al. |
| 2023/0343053 A1 | 10/2023 | Scapel et al. |
| 2023/0350564 A1 | 11/2023 | Chen et al. |
| 2023/0379573 A1 | 11/2023 | Wilson et al. |
| 2023/0384860 A1 | 11/2023 | Dedonato et al. |
| 2024/0029334 A1 | 1/2024 | Sepulveda et al. |
| 2024/0077937 A1 | 3/2024 | Rickwald et al. |
| 2024/0078846 A1 | 3/2024 | Chyn et al. |
| 2024/0104859 A1 | 3/2024 | Chand et al. |
| 2024/0144626 A1 | 5/2024 | Van Os et al. |
| 2024/0257486 A1 | 8/2024 | El Asmar et al. |
| 2024/0259676 A1 | 8/2024 | Wilson et al. |
| 2024/0393871 A1 | 11/2024 | Thiebot et al. |
| 2024/0395073 A1 | 11/2024 | Huergo Wagner et al. |
| 2025/0022237 A1 | 1/2025 | Burton et al. |
| 2025/0024134 A1 | 1/2025 | Van Os et al. |
| 2025/0037398 A1 | 1/2025 | Scapel et al. |
| 2025/0044921 A1 | 2/2025 | Triverio et al. |
| 2025/0044932 A1 | 2/2025 | Chen et al. |
| 2025/0103132 A1 | 3/2025 | Rickwald et al. |

FOREIGN PATENT DOCUMENTS

| | | |
|---|---|---|
| AU | 2015297035 B2 | 6/2018 |
| CA | 2356232 A1 | 3/2002 |
| CA | 2792987 A1 | 10/2011 |
| CN | 1083229 A | 3/1994 |
| CN | 101042618 A | 9/2007 |
| CN | 101055646 A | 10/2007 |
| CN | 101098535 A | 1/2008 |
| CN | 101203821 A | 6/2008 |
| CN | 101742053 A | 6/2010 |
| CN | 102012738 A | 4/2011 |
| CN | 102035990 A | 4/2011 |
| CN | 102163098 A | 8/2011 |
| CN | 102271241 A | 12/2011 |
| CN | 102298797 A | 12/2011 |
| CN | 102446059 A | 5/2012 |
| CN | 102622085 A | 8/2012 |
| CN | 102790826 A | 11/2012 |
| CN | 102854979 A | 1/2013 |
| CN | 103516894 A | 1/2014 |
| CN | 103703438 A | 4/2014 |
| CN | 103713843 A | 4/2014 |
| CN | 103744671 A | 4/2014 |
| CN | 103947190 A | 7/2014 |
| CN | 104115503 A | 10/2014 |
| CN | 104246793 A | 12/2014 |
| CN | 104270597 A | 1/2015 |
| CN | 104376160 A | 2/2015 |
| CN | 104898402 A | 9/2015 |
| CN | 104952063 A | 9/2015 |
| CN | 105100462 A | 11/2015 |
| CN | 105190700 A | 12/2015 |
| CN | 105391937 A | 3/2016 |
| CN | 105611275 A | 5/2016 |
| CN | 106909064 A | 6/2017 |
| CN | 107533356 A | 1/2018 |
| CN | 107561904 A | 1/2018 |
| CN | 107924113 A | 4/2018 |
| CN | 108885795 A | 11/2018 |
| CN | 110046020 A | 7/2019 |
| DK | 201670652 A1 | 12/2017 |
| EP | 0579093 A1 | 1/1994 |
| EP | 1215867 A2 | 6/2002 |
| EP | 1429291 A1 | 6/2004 |
| EP | 1592212 A1 | 11/2005 |
| EP | 1736931 A2 | 12/2006 |
| EP | 1777611 A1 | 4/2007 |
| EP | 2040146 A2 | 3/2009 |
| EP | 2302493 A2 | 3/2011 |
| EP | 2416563 A2 | 2/2012 |
| EP | 2437148 A2 | 4/2012 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 2990887 A2 | 3/2016 |
| EP | 3026636 A1 | 6/2016 |
| EP | 3047884 A1 | 7/2016 |
| EP | 3051525 A1 | 8/2016 |
| EP | 3079044 A1 | 10/2016 |
| EP | 3101958 A1 | 12/2016 |
| EP | 3190563 A1 | 7/2017 |
| EP | 3211587 A1 | 8/2017 |
| EP | 2556665 B1 | 8/2018 |
| EP | 3401770 A1 | 11/2018 |
| GB | 2370208 A | 6/2002 |
| JP | 9-9072 A | 1/1997 |
| JP | 10-506472 A | 6/1998 |
| JP | 11-312159 A | 11/1999 |
| JP | 2000-162349 A | 6/2000 |
| JP | 2001-144884 A | 5/2001 |
| JP | 2001-313886 A | 11/2001 |
| JP | 2003-9404 A | 1/2003 |
| JP | 2004-519033 A | 6/2004 |
| JP | 2004-184396 A | 7/2004 |
| JP | 2005-521890 A | 7/2005 |
| JP | 2005-532607 A | 10/2005 |
| JP | 2006-520053 A | 8/2006 |
| JP | 2007-528240 A | 10/2007 |
| JP | 2008-97202 A | 4/2008 |
| JP | 2011-517810 A | 6/2011 |
| JP | 2011-525648 A | 9/2011 |
| JP | 2011-209887 A | 10/2011 |
| JP | 2011-530101 A | 12/2011 |
| JP | 2012-38292 A | 2/2012 |
| JP | 2012-123475 A | 6/2012 |
| JP | 2013-101528 A | 5/2013 |
| JP | 2014-206817 A | 10/2014 |

(56) References Cited

FOREIGN PATENT DOCUMENTS

| | | |
|---|---|---|
| JP | 2015-504619 A | 2/2015 |
| JP | 2016-136324 A | 7/2016 |
| JP | 2017-521804 A | 8/2017 |
| JP | 2017-527917 A | 9/2017 |
| JP | 2017-531225 A | 10/2017 |
| JP | 6240301 B1 | 11/2017 |
| JP | 6266736 B1 | 1/2018 |
| JP | 2018-514838 A | 6/2018 |
| JP | 2018-106365 A | 7/2018 |
| JP | 2019-145108 A | 8/2019 |
| JP | 2019-164825 A | 9/2019 |
| JP | 2022-8997 A | 1/2022 |
| KR | 10-2004-0009115 A | 1/2004 |
| KR | 10-2004-0046272 A | 6/2004 |
| KR | 10-2004-0107489 A | 12/2004 |
| KR | 10-2008-0050336 A | 6/2008 |
| KR | 10-2010-0086052 A | 7/2010 |
| KR | 10-2011-0028581 A | 3/2011 |
| KR | 10-2012-0026004 A | 3/2012 |
| KR | 10-2012-0113252 A | 10/2012 |
| KR | 10-2012-0132134 A | 12/2012 |
| KR | 10-2014-0033088 A | 3/2014 |
| KR | 10-2014-0049340 A | 4/2014 |
| KR | 10-2014-0073232 A | 6/2014 |
| KR | 10-2015-0008996 A | 1/2015 |
| KR | 10-2015-0024899 A | 3/2015 |
| KR | 10-2015-0067197 A | 6/2015 |
| KR | 10-1540544 B1 | 7/2015 |
| KR | 10-1587115 B1 | 1/2016 |
| KR | 10-2016-0016910 A | 2/2016 |
| KR | 10-2016-0047891 A | 5/2016 |
| KR | 10-1655078 B1 | 9/2016 |
| KR | 10-2016-0146942 A | 12/2016 |
| KR | 10-2017-0081391 A | 7/2017 |
| KR | 10-2017-0117306 A | 10/2017 |
| KR | 10-2017-0139621 A | 12/2017 |
| KR | 10-2018-0017227 A | 2/2018 |
| KR | 10-1875907 B1 | 7/2018 |
| KR | 10-2019-00114034 A | 10/2019 |
| KR | 10-2020-0101206 A | 8/2020 |
| KR | 10-2020-0132995 A | 11/2020 |
| KR | 10-2338576 B1 | 12/2021 |
| WO | 98/40795 A1 | 9/1998 |
| WO | 99/66394 A1 | 12/1999 |
| WO | 99/66395 A2 | 12/1999 |
| WO | 03/058589 A2 | 7/2003 |
| WO | 03/085460 A2 | 10/2003 |
| WO | 2004/010672 A2 | 1/2004 |
| WO | 2004/079530 A2 | 9/2004 |
| WO | 2006/094308 A2 | 9/2006 |
| WO | 2007/120981 A2 | 10/2007 |
| WO | 2009/073607 A2 | 6/2009 |
| WO | 2009/114239 A1 | 9/2009 |
| WO | WO-2009133710 A1 * | 11/2009 ............. G06T 11/00 |
| WO | 2011/084860 A2 | 7/2011 |
| WO | 2011/127309 A1 | 10/2011 |
| WO | 2012/033708 A1 | 3/2012 |
| WO | 2011/130849 A8 | 5/2012 |
| WO | 2012/128361 A1 | 9/2012 |
| WO | 2012/170354 A2 | 12/2012 |
| WO | 2013/082325 A1 | 6/2013 |
| WO | 2013/097139 A1 | 7/2013 |
| WO | 2013/120851 A1 | 8/2013 |
| WO | 2013/152453 A1 | 10/2013 |
| WO | 2013/152454 A1 | 10/2013 |
| WO | 2013/152455 A1 | 10/2013 |
| WO | 2013/169851 A2 | 11/2013 |
| WO | 2013/169854 A2 | 11/2013 |
| WO | 2013/169870 A1 | 11/2013 |
| WO | 2013/169877 A2 | 11/2013 |
| WO | 2013/189058 A1 | 12/2013 |
| WO | 2014/024000 A1 | 2/2014 |
| WO | 2014/053063 A1 | 4/2014 |
| WO | 2014/094199 A1 | 6/2014 |
| WO | 2014/105279 A1 | 7/2014 |
| WO | 2014/161429 A1 | 10/2014 |
| WO | 2014/200734 A1 | 12/2014 |
| WO | 2015/034960 A1 | 3/2015 |
| WO | 2015/084891 A1 | 6/2015 |
| WO | 2015/144209 A1 | 10/2015 |
| WO | 2015/183756 A1 | 12/2015 |
| WO | 2015/187458 A1 | 12/2015 |
| WO | 2016/022203 A1 | 2/2016 |
| WO | 2016/022204 A1 | 2/2016 |
| WO | 2016/022205 A1 | 2/2016 |
| WO | 2016/036218 A1 | 3/2016 |
| WO | 2016/036522 A2 | 3/2016 |
| WO | 2016/042926 A1 | 3/2016 |
| WO | 2016/045005 A1 | 3/2016 |
| WO | 2016/057062 A1 | 4/2016 |
| WO | 2016/064435 A1 | 4/2016 |
| WO | 2016/101124 A1 | 6/2016 |
| WO | 2016/101131 A1 | 6/2016 |
| WO | 2016/101132 A1 | 6/2016 |
| WO | 2016/144385 A1 | 9/2016 |
| WO | 2016/144975 A2 | 9/2016 |
| WO | 2016/145129 A1 | 9/2016 |
| WO | 2016/161556 A1 | 10/2016 |
| WO | 2016/200587 A1 | 12/2016 |
| WO | 2017/030646 A1 | 2/2017 |
| WO | 2017/077751 A1 | 5/2017 |
| WO | 2017/153771 A1 | 9/2017 |
| WO | 2017/173319 A1 | 10/2017 |
| WO | 2017/201326 A1 | 11/2017 |
| WO | 2017/213439 A1 | 12/2017 |
| WO | 2017/218193 A1 | 12/2017 |
| WO | 2018/006053 A1 | 1/2018 |
| WO | 2018/049430 A2 | 3/2018 |
| WO | 2018/057272 A1 | 3/2018 |
| WO | 2018/212802 A1 | 11/2018 |
| WO | 2019/216997 A1 | 11/2019 |
| WO | 2019/216999 A1 | 11/2019 |
| WO | 2020/226785 A1 | 11/2020 |
| WO | 2021/050190 A1 | 3/2021 |
| WO | 2021/071532 A1 | 4/2021 |
| WO | 2022/147146 A1 | 7/2022 |

OTHER PUBLICATIONS

Notice of Allowance received for Japanese Patent Application No. 2022-170806, mailed on Aug. 9, 2024, 4 pages (1 page of English Translation and 3 pages of Official Copy).

Office Action received for Chinese Patent Application No. 202280036173.1, mailed on Jul. 21, 2024, 12 pages (6 pages of English Translation and 6 pages of Official Copy).

Office Action received for Chinese Patent Application No. 202280036173.1, mailed on May 10, 2024, 16 pages (8 pages of English Translation and 8 pages of Official Copy).

Supplemental Notice of Allowance received for U.S. Appl. No. 18/204,908, mailed on Aug. 13, 2024, 2 pages.

Applicant-Initiated Interview Summary received for U.S. Appl. No. 18/375,309, mailed on Sep. 27, 2024, 2 pages.

Board Decision received for Chinese Patent Application No. 201911199054.4, mailed on Sep. 25, 2024, 24 pages (1 page of English Translation and 23 pages of Official Copy).

Corrected Notice of Allowance received for U.S. Appl. No. 18/230,465, mailed on Oct. 9, 2024, 2 pages.

Kafai et al., "Your Second Selves: Player-Designed Avatars", Games and Culture, May 23, 2010, 21 pages.

Non-Final Office Action received for U.S. Appl. No. 18/407,241, mailed on Oct. 1, 2024, 9 pages.

Notice of Allowance received for U.S. Appl. No. 18/241,802, mailed on Oct. 8, 2024, 11 pages.

Office Action received for European Patent Application No. 21727979.3, mailed on Sep. 26, 2024, 11 pages.

Office Action received for Japanese Patent Application No. 2022-194369, mailed on Sep. 20, 2024, 5 pages (2 pages of English Translation and 3 pages of Official Copy).

Supplemental Notice of Allowance received for U.S. Appl. No. 18/204,908, mailed on Oct. 9, 2024, 2 pages.

(56) References Cited

OTHER PUBLICATIONS

Supplemental Notice of Allowance received for U.S. Appl. No. 18/204,908, mailed on Sep. 26, 2024, 2 pages.
Board Opinion received for Chinese Patent Application No. 201911199054.4, mailed on May 10, 2024, 24 pages (13 pages of English Translation and 11 pages of Official Copy).
Applicant-Initiated Interview Summary received for U.S. Appl. No. 18/204,908, mailed on Jul. 2, 2024, 4 pages.
Communication for Board of Appeal received for European Patent Application No. 19204230.7, mailed on Jun. 18, 2024, 15 pages.
Corrected Notice of Allowance received for U.S. Appl. No. 18/220,715, mailed on Jun. 24, 2024, 2 pages.
Intention to Grant received for European Patent Application No. 23173355.1, mailed on Jun. 28, 2024, 9 pages.
Corrected Notice of Allowance received for U.S. Appl. No. 18/197,242, mailed on Mar. 27, 2024, 2 pages.
International Search Report and Written Opinion received for PCT Patent Application No. PCT/US2023/033376, mailed on Mar. 18, 2024, 21 pages.
Invitation to Pay Additional Fees and Partial International Search Report received for PCT Patent Application No. PCT/US2023/033376, mailed on Jan. 24, 2024, 13 pages.
Notice of Allowance received for U.S. Appl. No. 17/031,765, mailed on Apr. 2, 2024, 34 pages.
Office Action received for Japanese Patent Application No. 2022-194369, mailed on Mar. 15, 2024, 11 pages (5 pages of English Translation and 6 pages of Official Copy).
Office Action received for Korean Patent Application No. 10-2023-7039673, mailed on Feb. 20, 2024, 11 pages (2 pages of English Translation and 9 pages of Official Copy).
Advisory Action received for U.S. Appl. No. 13/082,035, mailed on Jun. 19, 2015, 5 pages.
Advisory Action received for U.S. Appl. No. 13/082,035, mailed on Oct. 23, 2013, 3 pages.
Advisory Action received for U.S. Appl. No. 14/833,014, mailed on Jan. 27, 2017, 3 pages.
Advisory Action received for U.S. Appl. No. 16/259,771, mailed on Feb. 26, 2020, 3 pages.
Advisory Action received for U.S. Appl. No. 16/259,771, mailed on Jul. 14, 2020, 6 pages.
Advisory Action received for U.S. Appl. No. 16/806,981, mailed on Jun. 14, 2021, 6 pages.
Advisory Action received for U.S. Appl. No. 17/031,765, mailed on Dec. 12, 2022, 7 pages.
Advisory Action received for U.S. Appl. No. 17/093,408, mailed on Jun. 5, 2023, 4 pages.
Ali et al., "Facial Expression Recognition Using Human to Animated-Character Expression Translation", Oct. 12, 2019, 8 pages.
Applicant Initiated Interview Summary received for U.S. Appl. No. 16/259,771, mailed on May 5, 2020, 10 pages.
Applicant Initiated Interview Summary received for U.S. Appl. No. 16/806,981, mailed on Jan. 28, 2022, 4 pages.
Applicant Initiated Interview Summary received for U.S. Appl. No. 17/031,671, mailed on Aug. 2, 2021, 5 pages.
Applicant Initiated Interview Summary received for U.S. Appl. No. 17/031,671, mailed on Jun. 13, 2022, 7 pages.
Applicant Initiated Interview Summary received for U.S. Appl. No. 17/031,671, mailed on Nov. 8, 2021, 5 pages.
Applicant-Initiated Interview Summary received for U.S. Appl. No. 13/082,035, mailed on Apr. 4, 2013, 3 pages.
Applicant-Initiated Interview Summary received for U.S. Appl. No. 13/082,035, mailed on Aug. 1, 2016, 3 pages.
Applicant-Initiated Interview Summary received for U.S. Appl. No. 13/082,035, mailed on Jan. 29, 2015, 3 pages.
Applicant-Initiated Interview Summary received for U.S. Appl. No. 13/082,035, mailed on Oct. 30, 2013, 3 pages.
Applicant-Initiated Interview Summary received for U.S. Appl. No. 14/866,560, mailed on Jan. 30, 2019, 3 pages.
Applicant-Initiated Interview Summary received for U.S. Appl. No. 14/866,560, mailed on Jul. 26, 2018, 3 pages.
Applicant-Initiated Interview Summary received for U.S. Appl. No. 14/866,560, mailed on May 14, 2019, 4 pages.
Applicant-Initiated Interview Summary received for U.S. Appl. No. 14/866,560, mailed on Oct. 21, 2019, 3 pages.
Applicant-Initiated Interview Summary received for U.S. Appl. No. 16/259,771, mailed on Apr. 18, 2022, 2 pages.
Applicant-Initiated Interview Summary received for U.S. Appl. No. 16/519,850, mailed on Jun. 26, 2020, 4 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/663,062, mailed on Dec. 18, 2020, 3 pages.
Applicant-Initiated Interview Summary received for U.S. Appl. No. 16/833,436, mailed on Jan. 27, 2022, 2 pages.
Applicant-Initiated Interview Summary received for U.S. Appl. No. 16/833,436, mailed on Jul. 1, 2021, 2 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,671, mailed on Dec. 9, 2022, 5 pages.
Applicant-Initiated Interview Summary received for U.S. Appl. No. 17/031,671, mailed on May 23, 2023, 3 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/031,765, mailed on May 3, 2023, 6 pages.
Applicant-Initiated Interview Summary received for U.S. Appl. No. 17/031,765, mailed on May 23, 2022, 5 pages.
Applicant-Initiated Interview Summary received for U.S. Appl. No. 17/031,765, mailed on Nov. 16, 2022, 5 pages.
Applicant-Initiated Interview Summary received for U.S. Appl. No. 17/031,765, mailed on Sep. 22, 2021, 5 pages.
Applicant-Initiated Interview Summary received for U.S. Appl. No. 17/093,408, mailed on Jan. 5, 2023, 3 pages.
Applicant-Initiated Interview Summary received for U.S. Appl. No. 17/093,408, mailed on Jul. 1, 2022, 3 pages.
Applicant-Initiated Interview Summary received for U.S. Appl. No. 17/093,408, mailed on Mar. 1, 2022, 3 pages.
Applicant-Initiated Interview Summary received for U.S. Appl. No. 17/093,408, mailed on May 10, 2023, 3 pages.
Applicant-Initiated Interview Summary received for U.S. Appl. No. 17/093,408, mailed on May 25, 2023, 2 pages.
Applicant-Initiated Interview Summary received for U.S. Appl. No. 17/370,505, mailed on Oct. 17, 2022, 4 pages.
Applicant-Initiated Interview Summary received for U.S. Appl. No. 17/373,163, mailed on Apr. 11, 2022, 2 pages.
Applicant-Initiated Interview Summary received for U.S. Appl. No. 17/461,014, mailed on Feb. 21, 2023, 3 pages.
Applicant-Initiated Interview Summary received for U.S. Appl. No. 17/746, 179, mailed on Nov. 28, 2022, 4 pages.
Applicant-Initiated Interview Summary received for U.S. Appl. No. 17/941,962, mailed on May 30, 2023, 2 pages.
Applicant-Initiated Interview Summary received for U.S. Appl. No. 18/119,789, mailed on Jul. 31, 2023, 4 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Brief Communication Regarding Oral Proceedings received for European Patent Application No. 19181242.9, mailed on Oct. 5, 2022, 4 pages.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.

(56) References Cited

OTHER PUBLICATIONS

Carretero et al., "Preserving Avatar Genuineness in Different Display Media", Mobile Networks and Applications, Kluwer Academic Publishers, BO, vol. 13, No. 6, Jul. 15, 2008, pp. 627-634.
Certificate of Examination received for Australian Patent Application No. 2019100420, mailed on Jul. 3, 2019, 2 pages.
Certificate of Examination received for Australian Patent Application No. 2019100497, mailed on Jul. 29, 2019, 2 pages.
Certificate of Examination received for Australian Patent Application No. 2019100794, mailed on Dec. 19, 2019, 2 pages.
Certificate of Examination received for Australian Patent Application No. 2019101019, mailed on Nov. 12, 2019, 2 pages.
Certificate of Examination received for Australian Patent Application No. 2019101667, mailed on Mar. 20, 2020, 2 pages.
Certificate of Examination received for Australian Patent Application No. 2020100189, mailed on May 12, 2020, 2 pages.
Certificate of Examination received for Australian Patent Application No. 2020100675, mailed on Jun. 30, 2020, 2 pages.
Certificate of Examination received for Australian Patent Application No. 2020101043, mailed on Dec. 22, 2020, 2 pages.
Certificate of Examination received for Australian Patent Application No. 2020101715, mailed on Oct. 6, 2020, 2 pages.
Corrected Notice of Allowance received for U.S. Appl. No. 15/713,490, mailed on May 1, 2019, 2 pages.
Corrected Notice of Allowance received for U.S. Appl. No. 16/142,288, mailed on Jul. 30, 2019, 5 pages.
Corrected Notice of Allowance received for U.S. Appl. No. 16/143,097, mailed on Nov. 8, 2019, 3 pages.
Corrected Notice of Allowance received for U.S. Appl. No. 16/519,850, mailed on Nov. 2, 2020, 5 pages.
Corrected Notice of Allowance received for U.S. Appl. No. 16/519,850, mailed on Sep. 8, 2020, 5 pages.
Corrected Notice of Allowance received for U.S. Appl. No. 16/599,433, mailed on Aug. 13, 2021, 5 pages.
Corrected Notice of Allowance received for U.S. Appl. No. 16/599,433, mailed on Oct. 14, 2021, 3 pages.
Corrected Notice of Allowance received for U.S. Appl. No. 16/663,062, mailed on Apr. 14, 2021, 2 pages.
Corrected Notice of Allowance received for U.S. Appl. No. 16/663,062, mailed on Jul. 21, 2021, 2 pages.
Corrected Notice of Allowance received for U.S. Appl. No. 17/091,460, mailed on Feb. 16, 2022, 6 pages.
Corrected Notice of Allowance received for U.S. Appl. No. 17/091,460, mailed on Feb. 25, 2022, 6 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Corrected Notice of Allowance received for U.S. Appl. No. 17/370,505, mailed on Apr. 4, 2023, 5 pages.
Corrected Notice of Allowance received for U.S. Appl. No. 17/370,505, mailed on Apr. 28, 2023, 5 pages.
Corrected Notice of Allowance received for U.S. Appl. No. 17/370,505, mailed on Mar. 8, 2023, 5 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Corrected Notice of Allowance received for U.S. Appl. No. 17/525,664, mailed on Apr. 11, 2023, 2 pages.
Corrected Notice of Allowance received for U.S. Appl. No. 17/525,664, mailed on Feb. 23, 2023, 2 pages.
Corrected Notice of Allowance received for U.S. Appl. No. 17/525,664, mailed on May 17, 2023, 2 pages.
Corrected Notice of Allowance received for U.S. Appl. No. 17/525,664, mailed on Nov. 3, 2022, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Decision on Appeal received for Korean Patent Application No. 10-2021-7002582, mailed on May 13, 2022, 29 pages.
Decision on Appeal received for U.S. Appl. No. 14/833,014, mailed on Oct. 30, 2019, 10 pages.
Decision on Appeal received for U.S. Appl. No. 16/259,771, mailed on Aug. 19, 2021, 12 pages.
Decision to Grant received for Danish Patent Application No. PA201670320, mailed on Oct. 18, 2018, 2 pages.
Decision to Grant received for Danish Patent Application No. PA201870372, mailed on Jun. 17, 2020, 2 pages.
Decision to Grant received for Danish Patent Application No. PA201870375, mailed on Jul. 24, 2019, 2 pages.
Decision to Grant received for Danish Patent Application No. PA201870377, mailed on May 14, 2019, 2 pages.
Decision to Grant received for European Patent Application No. 15759998.6, mailed on Jun. 18, 2020, 2 pages.
Decision to Grant received for European Patent Application No. 19172407.9, mailed on Jun. 17, 2021, 2 pages.
Decision to Grant received for European Patent Application No. 19181242.9, mailed on Mar. 23, 2023, 3 pages.
Decision to Grant received for European Patent Application No. 20168021.2, mailed on Feb. 3, 2022, 2 pages.
Decision to Grant received for Japanese Patent Application No. 2018-182607, mailed on Apr. 13, 2022, 3 pages.
Decision to Grant received for Japanese Patent Application No. 2020-193703, mailed on Aug. 10, 2021, 3 pages.
Decision to Grant received for Japanese Patent Application No. 2021-166686, mailed on Apr. 20, 2023, 2 pages.
Decision to Refuse received for European Patent Application No. 19204230.7, mailed on Feb. 4, 2022, 15 pages.
Decision to Refuse received for European Patent Application No. 19724959.2, mailed on Jun. 22, 2021, 13 pages.
Decision to Refuse received for Japanese Patent Application No. 2020-159824, mailed on Sep. 30, 2022, 6 pages.
Droid Life,"20+ Galaxy S9, S9+ Tips and Tricks", Available Online at: https://www.youtube.com/watch?v=sso0mYTfV6w, Mar. 22, 2018, pp. 1-33.
European Search Report received for European Patent Application No. 19172407.9, mailed on Oct. 9, 2019, 4 pages.
European Search Report received for European Patent Application No. 19181242.9, mailed on Nov. 27, 2019, 4 pages.
European Search Report received for European Patent Application No. 20168021.2, mailed on Jul. 8, 2020, 4 pages.
Examiner Interview Summary received for U.S. Appl. No. 16/806,981, mailed on Mar. 26, 2021, 2 pages.
Examiner-Initiated Interview Summary received for U.S. Appl. No. 16/806,981, mailed on Jan. 13, 2022, 4 pages.
Examiner-Initiated Interview Summary received for U.S. Appl. No. 16/806,981, mailed on May 24, 2021, 4 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/259,771, mailed on Oct. 23, 2020, 15 pages.
Examiner's Pre-Review Report received for Japanese Patent Application No. 2019-215503, mailed on Aug. 20, 2021, 15 pages.
Extended European Search Report received for European Patent Application No. 17853657.9, mailed on May 28, 2020, 9 pages.
Extended European Search Report received for European Patent Application No. 19204230.7, mailed on Feb. 21, 2020, 7 pages.
Extended European Search Report received for European Patent Application No. 19212057.4, mailed on Feb. 27, 2020, 8 pages.
Extended European Search Report received for European Patent Application No. 20176616.9, mailed on Sep. 8, 2020, 7 pages.
Extended European Search Report received for European Patent Application No. 22154034.7, mailed on May 11, 2022, 14 pages.
Extended European Search Report received for European Patent Application No. 22179347.4, mailed on Oct. 13, 2022, 7 pages.
Extended European Search Report received for European Patent Application No. 23168077.8, mailed on Jul. 11, 2023, 12 pages.
Extended European Search Report received for European Patent Application No. 23173355.1, mailed on Aug. 4, 2023, 8 pages.

(56) References Cited

OTHER PUBLICATIONS

Fedko Daria, "AR Hair Styles", Online Available at <https://www.youtube.com/watch?v=FrS6tHRbFE0>, Jan. 24, 2017, 2 pages.
Final Office Action received for U.S. Appl. No. 13/082,035, mailed on Apr. 16, 2015, 24 pages.
Final Office Action received for U.S. Appl. No. 13/082,035, mailed on Aug. 15, 2013, 24 pages.
Final Office Action received for U.S. Appl. No. 14/833,014, mailed on Oct. 26, 2016, 32 pages.
Final Office Action received for U.S. Appl. No. 14/866,560, mailed on Oct. 9, 2018, 22 pages.
Final Office Action received for U.S. Appl. No. 15/352,215, mailed on Mar. 7, 2019, 22 pages.
Final Office Action received for U.S. Appl. No. 16/116,221, mailed on Mar. 22, 2019, 35 pages.
Final Office Action received for U.S. Appl. No. 16/259,771, mailed on Aug. 12, 2022, 25 pages.
Final Office Action received for U.S. Appl. No. 16/259,771, mailed on Nov. 18, 2019, 13 pages.
Final Office Action received for U.S. Appl. No. 16/806,981, mailed on Apr. 14, 2021, 24 pages.
Final Office Action received for U.S. Appl. No. 16/806,981, mailed on Mar. 1, 2022, 33 pages.
Final Office Action received for U.S. Appl. No. 16/833,436, mailed on Sep. 21, 2021, 29 pages.
Final Office Action received for U.S. Appl. No. 17/031,671, mailed on Nov. 15, 2022, 27 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/031,765, mailed on Sep. 12, 2022, 37 pages.
Final Office Action received for U.S. Appl. No. 17/093,408, mailed on Mar. 2, 2023, 51 pages.
Final Office Action received for U.S. Appl. No. 17/093,408, mailed on May 18, 2022, 41 pages.
Final Office Action received for U.S. Appl. No. 17/461,014, mailed on Apr. 6, 2023, 24 pages.
Flatlinevertigo, "Black Desert Online: Intro to Hair Customization", Online Available at: <https://www.youtube.com/watch?v=9MCbfd_eMEg>, Sep. 9, 2015, 3 pages.
Gao et al., "Automatic Unpaired Shape Deformation Transfer", ACM Transactions on Graphics, Online available at: https://doi.org/10.1145/3272127.3275028, 2018, 11 pages.
Gauging Gadgets, "How to Customize Watch Faces—Garmin Venu Tutorial", Online Available at: https://www.youtube.com/watch?v=dxajKKulaP0, Jan. 7, 2020, 14 pages.
"Here are Warez Files: Eve Online Character Creator", Online Available at: <http://theherearewarezfiles.blogspot.com/2014/03/eve-online-character-creator-download.html>, Mar. 3, 2014, 7 pages.
Horowitz Paul, "Always Show Scroll Bars in Mac OS X", OS X Daily, available online at: URL: http://osxdaily.com/2011/08/03/show-scroll-bars-mac-os-x-lion/, Aug. 3, 2011, 7 pages.
Intention to Grant received for Danish Patent Application No. PA201570563, mailed on Mar. 17, 2016, 7 pages.
Intention to Grant received for Danish Patent Application No. PA201670320, mailed on May 17, 2018, 2 pages.
Intention to Grant received for Danish Patent Application No. PA201870372, mailed on Feb. 13, 2020, 2 pages.
Intention to Grant received for Danish Patent Application No. PA201870375, mailed on Jun. 3, 2019, 2 pages.
Intention to Grant received for Danish Patent Application No. PA201870375, mailed on Mar. 26, 2019, 2 pages.
Intention to Grant received for Danish Patent Application No. PA201870377, mailed on Mar. 26, 2019, 2 pages.
Intention to Grant received for Danish Patent Application No. PA202070623, mailed on Jul. 20, 2022, 2 pages.
Intention to Grant received for European Patent Application No. 15759998.6, mailed on Apr. 17, 2020, 10 pages.
Intention to Grant received for European Patent Application No. 15759998.6, mailed on Nov. 21, 2019, 12 pages.
Intention to Grant received for European Patent Application No. 19172407.9, mailed on Feb. 11, 2021, 9 pages.
Intention to Grant received for European Patent Application No. 19181242.9, mailed on Nov. 17, 2022, 9 pages.
Intention to Grant received for European Patent Application No. 19181242.9, mailed on Oct. 28, 2021, 16 pages.
Intention to Grant received for European Patent Application No. 20168021.2, mailed on Apr. 15, 2021, 8 pages.
Intention to Grant received for European Patent Application No. 20168021.2, mailed on Sep. 20, 2021, 8 pages.
International Preliminary Report on Patentability received for PCT Patent Application No. PCT/US2011/031616, mailed on Oct. 18, 2012, 6 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2017/049795, mailed on Apr. 4, 2019, 16 pages.
International Preliminary Report on Patentability received for PCT Patent Application No. PCT/US2019/023793, mailed on Nov. 19, 2020, 12 pages.
International Preliminary Report on Patentability received for PCT Patent Application No. PCT/US2019/024067, mailed on Nov. 19, 2020, 12 pages.
International Preliminary Report on Patentability received for PCT Patent Application No. PCT/US2020/014176, mailed on Jul. 29, 2021, 9 pages.
International Preliminary Report on Patentability received for PCT Patent Application No. PCT/US2021/031096, mailed on Nov. 24, 2022, 11 pages.
International Preliminary Report on Patentability received for PCT Patent Application No. PCT/US2021/031212, mailed on Nov. 24, 2022, 16 pages.
International Search Report and Written Opinion received for PCT Application No. PCT/US2017/049795, mailed on Dec. 27, 2017, 26 pages.
International Search Report and Written Opinion received for PCT Patent Application No. PCT/US2011/031616, mailed on Aug. 30, 2011, 8 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2019/023793, mailed on Aug. 27, 2019, 17 pages.
International Search Report and Written Opinion received for PCT Patent Application No. PCT/US2019/024067, mailed on Oct. 9, 2019, 18 pages.
International Search Report and Written Opinion received for PCT Patent Application No. PCT/US2020/014176, mailed on Mar. 26, 2020, 12 pages.
International Search Report and Written Opinion received for PCT Patent Application No. PCT/US2021/031096, mailed on Oct. 13, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2022/029811, mailed on Nov. 7, 2022, 15 pages.
Invitation to Pay Additional Fees and Partial International Search Report received for PCT Patent Application No. PCT/US2022/029811, mailed on Sep. 14, 2022, 9 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2019/023793, mailed on Jul. 5, 2019, 11 pages.

(56) References Cited

OTHER PUBLICATIONS

Invitation to Pay Additional Fees received for PCT Patent Application No. PCT/US2019/024067, mailed on Jul. 16, 2019, 13 pages.
Invitation to Pay Additional Fees received for PCT Patent Application No. PCT/US2021/031096, mailed on Aug. 19, 2021, 8 pages.
Invitation to Pay Additional Fees received for PCT Patent Application No. PCT/US2021/031212, mailed on Jul. 28, 2021, 19 pages.
Invitation to Pay Search Fees received for European Patent Application No. 19724959.2, mailed on Feb. 25, 2020, 3 pages.
Koti Kotresh, "Colour with Asian Paints.A Mobail App by Android Application—2018", Available Online at: <https://www.youtube.com/watch?v=M6EIO7ErYd0&feature=youtu.be&t=81>, May 6, 2018, 2 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Lein et al., "Patternizer", Available online at: https://patternizer.com/, Apr. 2016, 5 pages.
Minutes of the Oral Proceedings received for European Patent Application No. 19181242.9, mailed on Dec. 15, 2020, 6 pages.
Minutes of the Oral Proceedings received for European Patent Application No. 19204230.7, mailed on Feb. 2, 2022, 9 pages.
Minutes of the Oral Proceedings received for European Patent Application No. 19724959.2, mailed on Jun. 14, 2021, 6 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.
Neurotechnology, "Sentimask SDK", Available at: https://www.neurotechnology.com/sentimask.html, Apr. 22, 2018, 5 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 14/833,014, mailed on Mar. 21, 2016, 26 pages.
Non-Final Office Action received for U.S. Appl. No. 13/082,035, mailed on Apr. 21, 2016, 25 pages.
Non-Final Office Action received for U.S. Appl. No. 13/082,035, mailed on Dec. 19, 2012, 19 pages.
Non-Final Office Action received for U.S. Appl. No. 13/082,035, mailed on Sep. 11, 2014, 23 pages.
Non-Final Office Action received for U.S. Appl. No. 14/866,560, mailed on Apr. 19, 2018, 10 pages.
Non-Final Office Action received for U.S. Appl. No. 14/866,560, mailed on Apr. 30, 2019, 23 pages.
Non-Final Office Action received for U.S. Appl. No. 15/352,215, mailed on Sep. 20, 2018, 31 pages.
Non-Final Office Action received for U.S. Appl. No. 16/116,221, mailed on Nov. 13, 2018, 27 pages.
Non-Final Office Action received for U.S. Appl. No. 16/142,288, mailed on Nov. 20, 2018, 15 pages.
Non-Final Office Action received for U.S. Appl. No. 16/142,305, mailed on Nov. 23, 2018, 32 pages.
Non-Final Office Action received for U.S. Appl. No. 16/142,328, mailed on Nov. 8, 2018, 18 pages.
Non-Final Office Action received for U.S. Appl. No. 16/143,097, mailed on Feb. 28, 2019, 17 pages.
Non-Final Office Action received for U.S. Appl. No. 16/259,771, mailed on Jan. 25, 2022, 20 pages.
Non-Final Office Action received for U.S. Appl. No. 16/259,771, mailed on May 8, 2019, 11 pages.
Non-Final Office Action received for U.S. Appl. No. 16/519,850, mailed on Mar. 23, 2020, 8 pages.
Non-Final Office Action received for U.S. Appl. No. 16/599,433, mailed on Jan. 28, 2021, 16 pages.
Non-Final Office Action received for U.S. Appl. No. 16/663,062, mailed on Oct. 28, 2020, 14 pages.
Non-Final Office Action received for U.S. Appl. No. 16/806,981, mailed on Nov. 13, 2020, 22 pages.
Non-Final Office Action received for U.S. Appl. No. 16/806,981, mailed on Sep. 1, 2021, 27 pages.
Non-Final Office Action received for U.S. Appl. No. 16/833,436, mailed on Mar. 29, 2021, 27 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 1, 2022, 32 pages.
Non-Final Office Action received for U.S. Appl. No. 17/031,671, mailed on Apr. 30, 2021, 27 pages.
Non-Final Office Action received for U.S. Appl. No. 17/031,765, mailed on Mar. 17, 2023, 34 pages.
Non-Final Office Action received for U.S. Appl. No. 17/031,765, mailed on Jun. 28, 2021, 32 pages.
Non-Final Office Action received for U.S. Appl. No. 17/031,765, mailed on Mar. 28, 2023, 31 pages.
Non-Final Office Action received for U.S. Appl. No. 17/031,765, mailed on Mar. 29, 2022, 33 pages.
Non-Final Office Action received for U.S. Appl. No. 17/091,460, mailed on Sep. 10, 2021, 10 pages.
Non-Final Office Action received for U.S. Appl. No. 17/093,408, mailed on Dec. 8, 2021, 37 pages.
Non-Final Office Action received for U.S. Appl. No. 17/093,408, mailed on Sep. 14, 2022, 46 pages.
Non-Final Office Action received for U.S. Appl. No. 17/370,505, mailed on Jul. 6, 2022, 14 pages.
Non-Final Office Action received for U.S. Appl. No. 17/373,163, mailed on Jan. 27, 2022, 14 pages.
Non-Final Office Action received for U.S. Appl. No. 17/461,014, mailed on Dec. 7, 2022, 22 pages.
Non-Final Office Action received for U.S. Appl. No. 17/746,179, mailed on Oct. 25, 2022, 18 pages.
Non-Final Office Action received for U.S. Appl. No. 17/827,004, mailed on Nov. 9, 2022, 27 pages.
Non-Final Office Action received for U.S. Appl. No. 18/119,789, mailed on Jun. 28, 2023, 31 pages.
Notice of Acceptance received for Australian Patent Application No. 2017330212, mailed on Apr. 28, 2020, 3 pages.
Notice of Acceptance received for Australian Patent Application No. 2019265357, mailed on Dec. 24, 2020, 3 pages.
Notice of Acceptance received for Australian Patent Application No. 2019266049, mailed on Nov. 24, 2020, 3 pages.
Notice of Acceptance received for Australian Patent Application No. 2020213402, mailed on Sep. 21, 2020, 3 pages.
Notice of Acceptance received for Australian Patent Application No. 2020239749, mailed on May 27, 2022, 3 pages.
Notice of Acceptance received for Australian Patent Application No. 2020294208, mailed on Mar. 2, 2022, 3 pages.
Notice of Acceptance received for Australian Patent Application No. 2021201295, mailed on May 10, 2022, 3 pages.
Notice of Acceptance received for Australian Patent Application No. 2021202254, mailed on Nov. 16, 2022, 3 pages.
Notice of Acceptance received for Australian Patent Application No. 2022200965, mailed on May 11, 2023, 3 pages.
Notice of Acceptance received for Australian Patent Application No. 2022215297, mailed on Sep. 26, 2022, 3 pages.
Notice of Acceptance received for Australian Patent Application No. 2022220279, mailed on Sep. 27, 2022, 3 pages.
Notice of Allowance received for Chinese Patent Application No. 201510557356.X, mailed on Mar. 5, 2020, 2 pages.
Notice of Allowance received for Chinese Patent Application No. 201780058426.4, mailed on Jun. 30, 2023, 2 pages.
Notice of Allowance received for Chinese Patent Application No. 201910315328.5, mailed on Aug. 24, 2022, 4 pages.
Notice of Allowance received for Chinese Patent Application No. 201910379481.4, mailed on Nov. 9, 2020, 6 pages.

(56) References Cited

OTHER PUBLICATIONS

Notice of Allowance received for Chinese Patent Application No. 201910692978.1, mailed on Feb. 4, 2021, 6 pages.
Notice of Allowance received for Chinese Patent Application No. 201911202668.3, mailed on Feb. 4, 2021, 5 pages.
Notice of Allowance received for Chinese Patent Application No. 201911219525.3, mailed on Sep. 29, 2020, 2 pages.
Notice of Allowance received for Chinese Patent Application No. 202110820692.4, mailed on Nov. 16, 2022, 2 pages.
Notice of Allowance received for Danish Patent Application No. PA201570563, mailed on May 24, 2016, 2 pages.
Notice of Allowance received for Danish Patent Application No. PA202070623, mailed on Sep. 20, 2022, 2 pages.
Notice of Allowance received for Japanese Patent Application No. 2018-107114, mailed on Mar. 22, 2019, 4 pages.
Notice of Allowance received for Japanese Patent Application No. 2018-184254, mailed on Jun. 15, 2020, 5 pages.
Notice of Allowance received for Japanese Patent Application No. 2019-215503, mailed on Aug. 26, 2022, 3 pages.
Notice of Allowance received for Japanese Patent Application No. 2019-511767, mailed on Mar. 30, 2020, 4 pages.
Notice of Allowance received for Japanese Patent Application No. 2020-120086, mailed on Nov. 15, 2021, 5 pages.
Notice of Allowance received for Japanese Patent Application No. 2020-159823, mailed on Jul. 24, 2023, 23 pages.
Notice of Allowance received for Japanese Patent Application No. 2020-159825, mailed on Mar. 25, 2022, 5 pages.
Notice of Allowance received for Japanese Patent Application No. 2021-092483, mailed on Sep. 30, 2022, 4 pages.
Notice of Allowance received for Japanese Patent Application No. 2021-153573, mailed on Feb. 17, 2023, 4 pages.
Notice of Allowance received for Korean Patent Application No. 10-2019-7005369, mailed on Oct. 26, 2020, 4 pages.
Notice of Allowance received for Korean Patent Application No. 10-2020-0123852, mailed on Mar. 9, 2023, 7 pages.
Notice of Allowance received for Korean Patent Application No. 10-2020-0123852, mailed on Nov. 28, 2022, 7 pages.
Notice of Allowance received for Korean Patent Application No. 10-2020-0123857, mailed on Feb. 21, 2023, 6 pages.
Notice of Allowance received for Korean Patent Application No. 10-2020-0123887, mailed on Nov. 28, 2022, 7 pages.
Notice of Allowance received for Korean Patent Application No. 10-2020-7031855, mailed on Mar. 22, 2021, 5 pages.
Notice of Allowance received for Korean Patent Application No. 10-2020-7032147, mailed on May 12, 2021, 5 pages.
Notice of Allowance received for Korean Patent Application No. 10-2021-7019525, mailed on Jul. 13, 2021, 5 pages.
Notice of Allowance received for Korean Patent Application No. 10-2021-7023617, mailed on Dec. 21, 2021, 6 pages.
Notice of Allowance received for Korean Patent Application No. 10-2022-7002829, mailed on Feb. 12, 2022, 6 pages.
Notice of Allowance received for Korean Patent Application No. 10-2022-7003364, mailed on Jul. 28, 2023, 7 pages.
Notice of Allowance received for Korean Patent Application No. 10-2022-7009437, mailed on Jun. 22, 2023, 7 pages.
Notice of Allowance received for Korean Patent Application No. 10-2022-7016421, mailed on May 25, 2022, 6 pages.
Notice of Allowance received for Netherland Patent Application No. 2019753, mailed on Jul. 6, 2018, 6 pages.
Notice of Allowance received for Taiwanese Patent Application No. 104128684, mailed on Feb. 23, 2017, 3 pages.
Notice of Allowance received for U.S. Appl. No. 13/082,035, mailed on Oct. 5, 2016, 9 pages.
Notice of Allowance received for U.S. Appl. No. 14/833,014, mailed on Nov. 20, 2019, 5 pages.
Notice of Allowance received for U.S. Appl. No. 14/866,560, mailed on Nov. 15, 2019, 9 pages.
Notice of Allowance received for U.S. Appl. No. 15/352,215, mailed on Nov. 27, 2019, 20 pages.
Notice of Allowance received for U.S. Appl. No. 15/713,490, mailed on Mar. 20, 2019, 15 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.
Notice of Allowance received for U.S. Appl. No. 16/116,221, mailed on Nov. 22, 2019, 13 pages.
Notice of Allowance received for U.S. Appl. No. 16/116,221, mailed on Sep. 20, 2019, 13 pages.
Notice of Allowance received for U.S. Appl. No. 16/142,288, mailed on Jun. 24, 2019, 10 pages.
Notice of Allowance received for U.S. Appl. No. 16/142,288, mailed on Mar. 27, 2019, 9 pages.
Notice of Allowance received for U.S. Appl. No. 16/142,288, mailed on May 1, 2019, 4 pages.
Notice of Allowance received for U.S. Appl. No. 16/142,305, mailed on Apr. 3, 2019, 5 pages.
Notice of Allowance received for U.S. Appl. No. 16/142,305, mailed on May 1, 2019, 2 pages.
Notice of Allowance received for U.S. Appl. No. 16/142,328, mailed on Apr. 5, 2019, 7 pages.
Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/519,850, mailed on Aug. 26, 2020, 8 pages.
Notice of Allowance received for U.S. Appl. No. 16/599,433, mailed on May 14, 2021, 11 pages.
Notice of Allowance received for U.S. Appl. No. 16/599,433, mailed on Oct. 4, 2021, 13 pages.
Notice of Allowance received for U.S. Appl. No. 16/663,062, mailed on Jul. 13, 2021, 7 pages.
Notice of Allowance received for U.S. Appl. No. 16/663,062, mailed on Mar. 24, 2021, 8 pages.
Notice of Allowance received for U.S. Appl. No. 16/833,436, mailed on Jul. 7, 2022, 8 pages.
Notice of Allowance received for U.S. Appl. No. 16/833,436, mailed on Sep. 8, 2022, 8 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/091,460, mailed on Apr. 28, 2022, 9 pages.
Notice of Allowance received for U.S. Appl. No. 17/091,460, mailed on Feb. 4, 2022, 10 pages.
Notice of Allowance received for U.S. Appl. No. 17/091,460, mailed on May 23, 2022, 9 pages.
Notice of Allowance received for U.S. Appl. No. 17/093,408, mailed on Aug. 30, 2023, 59 pages.
Notice of Allowance received for U.S. Appl. No. 17/370,505, mailed on Feb. 2, 2023, 8 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.
Notice of Allowance received for U.S. Appl. No. 17/525,664, mailed on Apr. 26, 2023, 10 pages.
Notice of Allowance received for U.S. Appl. No. 17/525,664, mailed on Feb. 14, 2023, 10 pages.
Notice of Allowance received for U.S. Appl. No. 17/525,664, mailed on Oct. 27, 2022, 11 pages.
Notice of Allowance received for U.S. Appl. No. 17/736,925, mailed on Apr. 24, 2023, 10 pages.
Notice of Allowance received for U.S. Appl. No. 17/736,925, mailed on Aug. 3, 2023, 9 pages.
Notice of Allowance received for U.S. Appl. No. 17/746,179, mailed on Mar. 6, 2023, 8 pages.

(56) References Cited

OTHER PUBLICATIONS

Notice of Allowance received for U.S. Appl. No. 17/941,962, mailed on Jul. 3, 2023, 9 pages.
Notice of Allowance received for U.S. Appl. No. 17/941,962, mailed on Mar. 10, 2023, 11 pages.
Notice of Allowance received for U.S. Appl. No. 17/941,962, mailed on May 3, 2023, 10 pages.
Notice of Allowance received for U.S. Appl. No. 17/971,456, mailed on Jun. 26, 2023, 9 pages.
Office Action received for Australian Patent Application No. 2017330212, mailed on Feb. 21, 2020, 2 pages.
Office Action received for Australian Patent Application No. 2019100794, mailed on Oct. 3, 2019, 4 pages.
Office Action received for Australian Patent Application No. 2020100189, mailed on Apr. 1, 2020, 3 pages.
Office Action received for Australian Patent Application No. 2020101043, mailed on Aug. 14, 2020, 5 pages.
Office Action received for Australian Patent Application No. 2020101043, mailed on Oct. 30, 2020, 4 pages.
Office Action received for Australian Patent Application No. 2020239749, mailed on Jan. 21, 2022, 4 pages.
Office Action received for Australian Patent Application No. 2020239749, mailed on Jul. 16, 2021, 5 pages.
Office Action received for Australian Patent Application No. 2020294208, mailed on Dec. 17, 2021, 2 pages.
Office Action received for Australian Patent Application No. 2021201295, mailed on Jan. 14, 2022, 3 pages.
Office Action received for Australian Patent Application No. 2021202254, mailed on Jun. 20, 2022, 2 pages.
Office Action received for Australian Patent Application No. 2022200965, mailed on Feb. 14, 2023, 4 pages.
Office Action received for Australian Patent Application No. 2023200039, mailed on Jul. 4, 2023, 2 pages.
Office Action received for Chinese Patent Application No. 201510557356.X, mailed on Aug. 15, 2019, 12 pages.
Office Action received for Chinese Patent Application No. 201510557356.X, mailed on Dec. 29, 2017, 11 pages.
Office Action received for Chinese Patent Application No. 201510557356.X, mailed on Nov. 23, 2018, 12 pages.
Office Action received for Chinese Patent Application No. 201520679198.0, mailed on Jun. 24, 2016, 5 pages.
Office Action received for Chinese Patent Application No. 2015206791980, mailed on Mar. 7, 2016, 6 pages.
Office Action Received for Chinese Patent Application No. 2015206791980, mailed on Nov. 18, 2015, 4 pages.
Office Action received for Chinese Patent Application No. 201621208900.6, mailed on Apr. 26, 2017, 2 pages.
Office Action received for Chinese Patent Application No. 201780058426.4, mailed on Dec. 2, 2022, 11 pages.
Office Action received for Chinese Patent Application No. 201810411708.4, mailed on Feb. 24, 2022, 10 pages.
Office Action received for Chinese Patent Application No. 201810411708.4, mailed on Feb. 26, 2021, 16 pages.
Office Action received for Chinese Patent Application No. 201810411708.4, mailed on Nov. 12, 2021, 12 pages.
Office Action received for Chinese Patent Application No. 201910315328.5, mailed on Nov. 30, 2021, 21 pages.
Office Action received for Chinese Patent Application No. 201910379481.4, mailed on Mar. 2, 2020, 18 pages.
Office Action received for Chinese Patent Application No. 201910691865.X, mailed on Aug. 4, 2021, 10 pages.
Office Action received for Chinese Patent Application No. 201910691865.X, mailed on Feb. 4, 2021, 16 pages.
Office Action received for Chinese Patent Application No. 201910691865.X, mailed on Jul. 8, 2020, 17 pages.
Office Action received for Chinese Patent Application No. 201910691872.X, mailed on Jun. 3, 2020, 10 pages.
Office Action received for Chinese Patent Application No. 201910691872.X, mailed on Jun. 23, 2021, 10 pages.
Office Action received for Chinese Patent Application No. 201910691872.X, mailed on Mar. 24, 2021, 19 pages.
Office Action received for Chinese Patent Application No. 201910691872.X, mailed on Nov. 10, 2021, 16 pages.
Office Action received for Chinese Patent Application No. 201910692978.1, mailed on Apr. 3, 2020, 19 pages.
Office Action received for Chinese Patent Application No. 201910692978.1, mailed on Nov. 4, 2020, 4 pages.
Office Action received for Chinese Patent Application No. 201911199054.4, mailed on Jan. 20, 2021, 19 pages.
Office Action received for Chinese Patent Application No. 201911199054.4, mailed on Jul. 3, 2020, 15 pages.
Office Action received for Chinese Patent Application No. 201911199054.4, mailed on Jun. 10, 2021, 13 pages.
Office Action received for Chinese Patent Application No. 201911202668.3, mailed on Aug. 4, 2020, 13 pages.
Office Action received for Chinese Patent Application No. 201911219525.3, mailed on Jul. 10, 2020, 7 pages.
Office Action received for Chinese Patent Application No. 202010295272.4, mailed on Feb. 27, 2023, 15 pages.
Office Action received for Chinese Patent Application No. 202010330318.1, mailed on Jul. 13, 2021, 12 pages.
Office Action received for Chinese Patent Application No. 202010330318.1, mailed on Mar. 31, 2021, 13 pages.
Office Action received for Chinese Patent Application No. 202010330318.1, mailed on Nov. 19, 2020, 18 pages.
Office Action received for Chinese Patent Application No. 202110820692.4, mailed on Mar. 15, 2022, 18 pages.
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for Danish Patent Application No. PA201870366, mailed on Aug. 22, 2019, 3 pages.
Office Action received for Danish Patent Application No. PA201870366, mailed on Dec. 12, 2018, 3 pages.
Office Action received for Danish Patent Application No. PA201870367, mailed on Dec. 20, 2018, 5 pages.
Office Action received for Danish Patent Application No. PA201870368, mailed on Dec. 20, 2018, 5 pages.
Office Action received for Danish Patent Application No. PA201870368, mailed on Oct. 1, 2019, 6 pages.
Office Action received for Danish Patent Application No. PA201870372, mailed on Aug. 20, 2019, 2 pages.
Office Action received for Danish Patent Application No. PA201870372, mailed on Jan. 31, 2019, 4 pages.
Office Action received for Danish Patent Application No. PA201870374, mailed on Feb. 6, 2019, 5 pages.
Office Action received for Danish Patent Application No. PA201870374, mailed on Jun. 17, 2019, 5 pages.
Office Action received for Danish Patent Application No. PA201870375, mailed on Jan. 31, 2019, 4 pages.
Office Action received for Danish Patent Application No. PA201870377, mailed on Jan. 31, 2019, 4 pages.
Office Action received for Danish Patent Application No. PA202070623, mailed on Aug. 24, 2021, 3 pages.
Office Action received for Danish Patent Application No. PA202070623, mailed on May 23, 2022, 3 pages.
Office Action received for Danish Patent Application No. PA202070624, mailed on Feb. 4, 2022, 4 pages.
Office Action received for Danish Patent Application No. PA202070624, mailed on Jun. 16, 2021, 5 pages.

(56) References Cited

OTHER PUBLICATIONS

Office Action received for Danish Patent Application No. PA202070625, mailed on Feb. 8, 2022, 2 pages.
Office Action received for Danish Patent Application No. PA202070625, mailed on Jun. 16, 2021, 3 pages.
Office Action received for Danish Patent Application No. PA202070625, mailed on Sep. 23, 2022, 4 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 17853657.9, mailed on Apr. 1, 2021, 6 pages.
Office Action received for European Patent Application No. 19172407.9, mailed on Oct. 18, 2019, 7 pages.
Office Action received for European Patent Application No. 19181242.9, mailed on Dec. 6, 2019, 9 pages.
Office Action received for European Patent Application No. 19204230.7, mailed on Sep. 28, 2020, 6 pages.
Office Action received for European Patent Application No. 19212057.4, mailed on Mar. 9, 2021, 6 pages.
Office Action received for European Patent Application No. 19724959.2, mailed on Apr. 23, 2020, 10 pages.
Office Action received for European Patent Application No. 20168021.2, mailed on Jul. 22, 2020, 8 pages.
Office Action received for European Patent Application No. 20176616.9, mailed on Jun. 10, 2021, 4 pages.
Office Action received for European Patent Application No. 20704768.9, mailed on Mar. 24, 2023, 8 pages.
Office Action received for European Patent Application No. 22154034.7, mailed on May 26, 2023, 10 pages.
Office Action received for Indian Patent Application No. 201814036470, mailed on Feb. 26, 2021, 7 pages.
Office Action received for Indian Patent Application No. 201814036472, mailed on Jul. 8, 2021, 8 pages.
Office Action received for Indian Patent Application No. 202015008746, mailed on Mar. 6, 2023, 7 pages.
Office Action received for Indian Patent Application No. 202015008747, mailed on Mar. 15, 2023, 10 pages.
Office Action received for Indian Patent Application No. 202215026045, mailed on Mar. 31, 2023, 8 pages.
Office Action received for Indian Patent Application No. 202215026505, mailed on Feb. 8, 2023, 9 pages.
Office Action received for Japanese Patent Application No. 2017-510631, mailed on Mar. 2, 2018, 12 pages.
Office Action received for Japanese Patent Application No. 2018-107114, mailed on Oct. 9, 2018, 4 pages.
Office Action received for Japanese Patent Application No. 2018-182607, mailed on Apr. 6, 2020, 6 pages.
Office Action received for Japanese Patent Application No. 2018-182607, mailed on Jul. 20, 2020, 5 pages.
Office Action received for Japanese Patent Application No. 2018-182607, mailed on Sep. 8, 2021, 7 pages.
Office Action received for Japanese Patent Application No. 2018-184254, mailed on Mar. 2, 2020, 8 pages.
Office Action received for Japanese Patent Application No. 2019-215503, mailed on Feb. 5, 2021, 12 pages.
Office Action received for Japanese Patent Application No. 2019-215503, mailed on Jul. 3, 2020, 12 pages.
Office Action received for Japanese Patent Application No. 2020-120086, mailed on May 21, 2021, 6 pages.
Office Action received for Japanese Patent Application No. 2020-120086, mailed on Nov. 20, 2020, 6 pages.
Office Action received for Japanese Patent Application No. 2020-159823, mailed on Aug. 15, 2022, 6 pages.
Office Action received for Japanese Patent Application No. 2020-159823, mailed on Dec. 23, 2021, 8 pages.
Office Action received for Japanese Patent Application No. 2020-159824, mailed on Dec. 17, 2021, 13 pages.
Office Action received for Japanese Patent Application No. 2020-159825, mailed on Dec. 10, 2021, 4 pages.
Office Action received for Japanese Patent Application No. 2020-193703, mailed on Apr. 19, 2021, 4 pages.
Office Action received for Japanese Patent Application No. 2021-092483, mailed on Apr. 1, 2022, 8 pages.
Office Action received for Japanese Patent Application No. 2021-153573, mailed on Oct. 17, 2022, 4 pages.
Office Action received for Japanese Patent Application No. 2021-166686, mailed on Oct. 3, 2022, 3 pages.
Office Action received for Korean Patent Application No. 10-2019-7005369, mailed on Mar. 13, 2020, 12 pages.
Office Action received for Korean Patent Application No. 10-2020-0123852, mailed on Jun. 9, 2022, 10 pages.
Office Action received for Korean Patent Application No. 10-2020-0123857, mailed on Dec. 16, 2022, 8 pages.
Office Action received for Korean Patent Application No. 10-2020-0123857, mailed on Jun. 9, 2022, 12 pages.
Office Action received for Korean Patent Application No. 10-2020-0123887, mailed on Jun. 9, 2022, 5 pages.
Office Action received for Korean Patent Application No. 10-2020-7031855, mailed on Nov. 24, 2020, 6 pages.
Office Action received for Korean Patent Application No. 10-2020-7032147, mailed on Feb. 16, 2021, 6 pages.
Office Action received for Korean Patent Application No. 10-2021-7002582, mailed on Apr. 16, 2021, 13 pages.
Office Action received for Korean Patent Application No. 10-2021-7002582, mailed on Oct. 29, 2021, 6 pages.
Office Action received for Korean Patent Application No. 10-2022-7003364, mailed on Apr. 22, 2022, 14 pages.
Office Action received for Korean Patent Application No. 10-2022-7003364, mailed on Dec. 26, 2022, 8 pages.
Office Action received for Korean Patent Application No. 10-2022-7009437, mailed on Nov. 30, 2022, 6 pages.
Office Action received for Korean Patent Application No. 10-2023-0064928, mailed on Jun. 9, 2023, 6 pages.
Office Action received for Netherland Patent Application No. 2019753, mailed on Apr. 12, 2018, 8 pages.
Office Action received for Taiwanese Patent Application No. 100111887, mailed on Oct. 7, 2013, 23 pages.
Office Action received for Taiwanese Patent Application No. 104128684, mailed on Nov. 8, 2016, 24 pages.
Office Action received for Australian Patent Application No. 2015101183, issued on Nov. 6, 2015, 4 pages.
Pavlakos et al., "Expressive Body Capture: 3D Hands, Face, and Body from a Single Image", In Proceedings of the IEEE/CVF conference on computer vision and pattern recognition 2019, online available at https://arxiv.org/abs/1904.05866, 2019, pp. 10975-10985.
PC World, "How to make AR Emojis on the Samsung Galaxy S9", You Tube, Available Online: https://www.youtube.com/watch?v=8wQICfulkz0, Feb. 25, 2018, 2 pages.
Pre-Appeal Review Report received for Japanese Patent Application No. 2018-182607, mailed on Jan. 21, 2021, 4 pages.
Pre-Appeal Review Report received for Japanese Patent Application No. 2020-159823, mailed on Jan. 12, 2023, 4 pages.
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Record of Oral Hearing received for U.S. Appl. No. 16/259,771, mailed on Aug. 4, 2021, 15 pages.
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.

(56) References Cited

OTHER PUBLICATIONS

Result of Consultation received for European Patent Application No. 19724959.2, mailed on Sep. 4, 2020, 3 pages.
Result of Consultation received for European Patent Application No. 19181242.9, mailed on Dec. 1, 2020, 12 pages.
Rosa et al., "Stripe Generator—a Free Tool for the Web Design Community", Available online at: http://www.stripegenerator.com/, Mar. 28, 2019, 10 pages.
Search Report and Opinion received for Danish Patent Application No. PA201870366, mailed on Aug. 27, 2018, 9 pages.
Search Report and Opinion received for Danish Patent Application No. PA201870367, mailed on Aug. 27, 2018, 9 pages.
Search Report and Opinion received for Danish Patent Application No. PA201870368, mailed on Sep. 6, 2018, 7 pages.
Search Report and Opinion received for Danish Patent Application No. PA201870372, mailed on Sep. 14, 2018, 8 pages.
Search Report and Opinion received for Danish Patent Application No. PA201870372, mailed on Sep. 17, 2018, 10 pages.
Search Report and Opinion received for Danish Patent Application No. PA201870374, mailed on Aug. 27, 2018, 9 pages.
Search Report and Opinion received for Danish Patent Application No. PA201870375, mailed on Aug. 23, 2018, 8 pages.
Search Report and Opinion received for Danish Patent Application No. PA201870377, mailed on Sep. 4, 2018, 8 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion received for Netherlands Patent Application No. 2015364, issued on Jul. 4, 2017, 12 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Slashgear, "Samsung AR Emoji demo on the Galaxy S9", Available Online at <https://www.youtube.com/watch?v=GQwNKzY4C9Y>, Feb. 25, 2018, 3 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Summons to Attend Oral Proceedings received for European Patent Application No. 17853657.9, mailed on May 2, 2023, 8 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Summons to Attend Oral Proceedings received for European Patent Application No. 19204230.7, mailed on May 25, 2021, 10 pages.
Summons to Attend Oral Proceedings received for European Patent Application No. 19212057.4, mailed on Apr. 19, 2023, 9 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Summons to Attend Oral Proceedings received for European Patent Application No. 20176616.9, mailed on Dec. 17, 2021, 7 pages.
Summons to Oral Proceedings received for European Patent Application No. 19724959.2, mailed on Jul. 14, 2023, 6 pages.
Supplemental Notice of Allowance received for U.S. Appl. No. 14/833,014, mailed on Mar. 12, 2020, 2 pages.
Supplemental Notice of Allowance received for U.S. Appl. No. 15/713,490, mailed on May 30, 2019, 2 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Supplemental Notice of Allowance received for U.S. Appl. No. 16/833,436, mailed on Jul. 14, 2022, 2 pages.
Supplemental Notice of Allowance received for U.S. Appl. No. 17/746,179, mailed on Apr. 3, 2023, 2 pages.
Takahashi et al., "Neural network modeling of altered facial expression recognition in autism spectrum disorders based on predictive processing framework", Scientific reports, Online available at: https://www.nature.com/articles/s41598-021-94067-x, Jul. 26, 2021, 14 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Theunlockr, "Galaxy Watch Complete Walkthrough: The Best Watch They've Made So Far", Available online at: https://www.youtube.com/watch?v=xiEClfe1SN4, Sep. 11, 2018, 27 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages.
Vidstube, "Bitmoji Clockface on Fitbit Versa Sense/Versa 3/Versa 2", Available online at: https://www.youtube.com/watch?v=4V_xDnSLeHE>, Retrieved on Dec. 3, 2020, Jun. 30, 2019, 1 page.
Wikipedia, "Emoji", Online Avaiable at: https://web.archive.org/web/20140829025736/https://en.wikipedia.org/wiki/Emoji, 2014, 13 pages.
Woolsey Amanda, "How to Customize the Clock on the Apple Watch", Available online at: https://www.youtube.com/watch?v=t-3Bckdd9B4>, Retrieved on Dec. 11, 2020, Apr. 25, 2015, 1 page.
Zhang et al., "Facial Expression Retargeting from Human to Avatar Made Easy", IEEE Transactions on Visualization and Computer Graphics, Aug. 2020, 14 pages.
Zhao et al., "An Event-related Potential Comparison of Facial Expression Processing between Cartoon and Real Faces", Online available at: https://www.biorxiv.org/content/10.1101/333898v2, Jun. 18, 2018, 31 pages.
Zollhöfer et al., "State of the Art on Monocular 3D Face Reconstruction, Tracking, and Applications", In Computer graphics forum May 2018 (vol. 37, No. 2), online available at https://studios.disneyresearch.com/wp-content/uploads/2019/03/State-of-the-Art-on-Monocular-3D-Face-Reconstruction-Tracking-and-Applications-1.pdf., 2018, 28 pages.
Examiner's Answer to Appeal Brief received for U.S. Appl. No. 17/031,671, mailed on Dec. 8, 2023, 16 pages.
International Preliminary Report on Patentability received for PCT Patent Application No. PCT/US2022/029811, mailed on Nov. 30, 2023, 10 pages.
International Search Report and Written Opinion received for PCT Patent Application No. PCT/US2023/023273, mailed on Sep. 15, 2023, 19 pages.
Non-Final Office Action received for U.S. Appl. No. 18/197,242, mailed on Dec. 7, 2023, 24 pages.
Notice of Acceptance received for Australian Patent Application No. 2023201250, mailed on Nov. 21, 2023, 3 pages.
Supplemental Notice of Allowance received for U.S. Appl. No. 17/971,456, mailed on Dec. 4, 2023, 2 pages.
Board Decision received for Chinese Patent Application No. 202010295272.4, mailed on Dec. 14, 2023, 2 pages (1 page of English Translation and 1 page of Official Copy).
FF14Startup, How to create a character for beginners in FF14 and recommended races, Available online at: https://ff14startup.net/character-making-99/, Sep. 20, 2016, 16 pages (Official Copy Only) {See Communication Under Rule 37 CFR § 1.98(a) (3)}.
Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages (Official Copy Only) {See Communication Under Rule 37 CFR § 1.98(a) (3)}.
Non-Final Office Action received for U.S. Appl. No. 18/375,309, mailed on Jul. 29, 2024, 19 pages.

(56) References Cited

OTHER PUBLICATIONS

Notice of Acceptance received for Australian Patent Application No. 2023282284, mailed on Jul. 18, 2024, 3 pages.
Notice of Allowance received for Japanese Patent Application No. 2023-043407, mailed on Jul. 26, 2024, 4 pages (1 page of English Translation and 3 pages of Official Copy).
Notice of Allowance received for Korean Patent Application No. 10-2023-0189466, mailed on Jul. 22, 2024, 8 pages (2 pages of English Translation and 6 pages of Official Copy).
Office Action received for Korean Patent Application No. 10-2023-7037034, mailed on Jul. 22, 2024, 23 pages (11 pages of English Translation and 12 pages of Official Copy).
WPShopmart, "Top 20 Creative Animated Login Form in HTML & CSS", https://youtu.be/TDqT-7BnkD8?si=-R69GDvfR_IGrh2H, Dec. 6, 2019, 3 pages.
Notice of Allowance received for Korean Patent Application No. 10-2023-7032383, mailed on Aug. 29, 2024, 10 pages (2 pages of English Translation and 8 pages of Official Copy).
Notice of Allowance received for Korean Patent Application No. 10-2023-7039673, mailed on Aug. 21, 2024, 4 pages (1 page of English Translation and 3 pages of Official Copy).
Office Action received for Australian Patent Application No. 2023219926, mailed on Aug. 24, 2024, 5 pages.
Record of Oral Hearing received for U.S. Appl. No. 17/031,671, mailed on Aug. 27, 2024, 17 pages.
Applicant-Initiated Interview Summary received for U.S. Appl. No. 18/138,634, mailed on Feb. 9, 2024, 4 pages.
Applicant-Initiated Interview Summary received for U.S. Appl. No. 18/197,242, mailed on Feb. 22, 2024, 2 pages.
Decision on Appeal received for U.S. Appl. No. 16/259,771, mailed on Feb. 8, 2024, 18 pages.
Decision to Refuse received for European Patent Application No. 17853657.9, mailed on Feb. 2, 2024, 17 pages.
Decision to Refuse received for European Patent Application No. 19212057.4, mailed on Feb. 5, 2024, 18 pages.
Notice of Hearing received for Indian Patent Application No. 201814036470, mailed on Feb. 7, 2024, 4 pages.
Record of Oral Hearing received for U.S. Appl. No. 16/259,771, mailed on Feb. 4, 2024, 15 pages.
Communication for Board of Appeal received for European Patent Application No. 19204230.7, mailed on Feb. 16, 2024, 1 page.
Notice of Allowance received for U.S. Appl. No. 18/197,242, mailed on Mar. 6, 2024, 11 pages.
Office Action received for European Patent Application No. 22154034.7, mailed on Feb. 19, 2024, 8 pages.
Office Action received for Korean Patent Application No. 10-2023-7032383, mailed on Feb. 5, 2024, 16 pages (7 pages of English Translation and 9 pages of Official Copy).
Summons to Oral Proceedings received for European Patent Application No. 19204230.7, mailed on Feb. 19, 2024, 2 pages.
Applicant-Initiated Interview Summary received for U.S. Appl. No. 18/241,802, mailed on Jul. 17, 2024, 6 pages.
Corrected Notice of Allowance received for U.S. Appl. No. 18/197,242, mailed on Jul. 22, 2024, 2 pages.
Corrected Notice of Allowance received for U.S. Appl. No. 18/220,715, mailed on Jul. 23, 2024, 2 pages.
Intention to Grant received for European Patent Application No. 21728746.5, mailed on Jul. 12, 2024, 10 pages.
Invitation to Pay Search Fees received for European Patent Application No. 21727979.3, mailed on Jul. 10, 2024, 4 pages.
Notice of Allowance received for U.S. Appl. No. 18/197,242, mailed on Jul. 10, 2024, 12 pages.
Notice of Allowance received for U.S. Appl. No. 18/204,908, mailed on Jul. 24, 2024, 6 pages.
Office Action received for Chinese Patent Application No. 202010295272.4, mailed on Jun. 11, 2024, 12 pages (5 pages of English Translation and 7 pages of Official Copy).
Corrected Notice of Allowance received for U.S. Appl. No. 18/197,242, mailed on Nov. 6, 2024, 2 pages.
Corrected Notice of Allowance received for U.S. Appl. No. 18/230,465, mailed on Nov. 5, 2024, 2 pages.
Decision on Appeal received for U.S. Appl. No. 17/031,671, mailed on Nov. 1, 2024, 24 pages.
Notice of Allowance received for Chinese Patent Application No. 202110530629.7, mailed on Oct. 28, 2024, 2 pages (1 page of English Translation and 1 page of Official Copy).
Notice of Allowance received for U.S. Appl. No. 18/407,241, mailed on Nov. 14, 2024, 8 pages.
Office Action received for Chinese Patent Application No. 202010295272.4, mailed on Oct. 10, 2024, 9 pages (4 pages of English Translation and 5 pages of Official Copy).
Examiner's Answer to Appeal Brief received for U.S. Appl. No. 17/461,014, mailed on Jan. 29, 2024, 13 pages.
Minutes of the Oral Proceedings received for European Patent Application No. 19212057.4, mailed on Jan. 31, 2024, 6 pages.
Notice of Allowance received for Chinese Patent Application No. 202310124087.2, mailed on Jan. 25, 2024, 4 pages (1 page of English Translation and 3 pages of Official Copy).
Office Action received for Australian Patent Application No. 2023282284, mailed on Jan. 19, 2024, 6 pages.
Applicant-Initiated Interview Summary received for U.S. Appl. No. 17/031,765, mailed on Oct. 31, 2023, 5 pages.
Applicant-Initiated Interview Summary received for U.S. Appl. No. 18/119,789, mailed on Sep. 27, 2023, 3 pages.
Communication for Board of Appeal received for European Patent Application No. 19724959.2, mailed on Sep. 27, 2023, 14 pages.
Decision to Grant received for Japanese Patent Application No. 2023-083816, mailed on Aug. 9, 2023, 2 pages (1 page of English Translation and 1 page of Official Copy).
Final Office Action received for U.S. Appl. No. 17/031,765, mailed on Sep. 1, 2023, 37 pages.
Final Office Action received for U.S. Appl. No. 18/119,789, mailed on Aug. 30, 2023, 29 pages.
Krotov Ilya, "Bellus3D app experience", Available online at: https://www.youtube.com/watch?v=aSu688IY26c&t=45s, Aug. 17, 2021, 2 pages.
Notice of Acceptance received for Australian Patent Application No. 2023200039, mailed on Aug. 31, 2023, 3 pages.
Notice of Allowance received for Korean Patent Application No. 10-2023-0064928, mailed on Sep. 22, 2023, 7 pages (2 pages of English Translation and 5 pages of Official Copy).
Office Action received for Australian Patent Application No. 2023201250, mailed on Sep. 11, 2023, 3 pages.
Office Action received for Chinese Patent Application No. 202010295272.4, mailed on Aug. 28, 2023, 8 pages (4 pages of English Translation and 4 pages of Official Copy).
Office Action received for Chinese Patent Application No. 202310124087.2, mailed on Sep. 9, 2023, 24 pages (13 pages of English Translation and 11 pages of Official Copy).
Office Action received for European Patent Application No. 21728746.5, mailed on Aug. 21, 2023, 4 pages.
Rozario Hamlin, "How to Edit Photos on iPhone & iPad", Online available at: https://osxdaily.com/2020/01/23/how-to-edit-photos-on-iphone-ipad/, Jan. 23, 2020, 10 pages.
Supplemental Notice of Allowance received for U.S. Appl. No. 17/971,456, mailed on Oct. 16, 2023, 5 pages.
Examiner's Answer to Appeal Brief received for U.S. Appl. No. 18/119,789, mailed on Jan. 22, 2024, 45 pages.
Non-Final Office Action received for U.S. Appl. No. 18/138,634, mailed on Jan. 16, 2024, 14 pages.
Office Action received for European Patent Application No. 21728746.5, mailed on Jan. 11, 2024, 4 pages.
Corrected Notice of Allowance received for U.S. Appl. No. 18/197,242, mailed on Mar. 18, 2024, 2 pages.
International Search Report and Written Opinion received for PCT Patent Application No. PCT/US2023/031979, mailed on Mar. 12, 2024, 16 pages.
Invitation to Pay Additional Fees and Partial International Search Report received for PCT Patent Application No. PCT/US2023/031979, mailed on Jan. 19, 2024, 9 pages.
Notice of Allowance received for U.S. Appl. No. 18/220,715, mailed on Mar. 7, 2024, 11 pages.

(56) References Cited

OTHER PUBLICATIONS

Office Action received for Chinese Patent Application No. 202010295272.4, mailed on Feb. 5, 2024, 14 pages (6 pages of English Translation and 8 pages of Official Copy).
Office Action received for Korean Patent Application No. 10-2024-7004853, mailed on Mar. 4, 2024, 6 pages (2 pages of English Translation and 4 pages of Official Copy).
Non-Final Office Action received for U.S. Appl. No. 18/204,908, mailed on Jun. 5, 2024, 16 pages.
Notice of Allowance received for U.S. Appl. No. 18/220,715, mailed on Jun. 13, 2024, 10 pages.
Corrected Notice of Allowance received for U.S. Appl. No. 18/138,634, mailed on May 20, 2024, 5 pages.
Corrected Notice of Allowance received for U.S. Appl. No. 18/197,242, mailed on May 15, 2024, 2 pages.
Non-Final Office Action received for U.S. Appl. No. 18/241,802, mailed on May 17, 2024, 57 pages.
Notice of Hearing received for Indian Patent Application No. 201814036472, mailed on May 9, 2024, 2 pages.
Office Action received for European Patent Application No. 22729935.1, mailed on May 10, 2024, 7 pages.
Office Action received for Japanese Patent Application No. 2022-170806, mailed on May 13, 2024, 4 pages (2 pages of English Translation and 2 pages of Official Copy).
Corrected Notice of Allowance received for U.S. Appl. No. 18/230,465, mailed on Oct. 17, 2024, 2 pages.
Corrected Notice of Allowance received for U.S. Appl. No. 18/230,465, mailed on Oct. 24, 2024, 2 pages.
Corrected Notice of Allowance received for U.S. Appl. No. 18/241,802, mailed on Oct. 22, 2024, 9 pages.
Decision to Grant received for European Patent Application No. 23173355.1, mailed on Oct. 24, 2024, 3 pages.
Extended European Search Report received for European Patent Application No. 24203946.9, mailed on Oct. 24, 2024, 9 pages.
Notice of Allowance received for U.S. Appl. No. 18/197,242, mailed on Oct. 17, 2024, 12 pages.
Office Action received for European Patent Application No. 22154034.7, mailed on Oct. 11, 2024, 8 pages.
International Search Report and Written Opinion received for PCT Patent Application No. PCT/US2024/012658, mailed on Jun. 21, 2024, 22 pages.
Invitation to Pay Additional Fees and Partial International Search Report received for PCT Patent Application No. PCT/US2024/012658, mailed on Apr. 30, 2024, 13 pages.
Notice of Allowance received for U.S. Appl. No. 18/230,465, mailed on Sep. 16, 2024, 5 pages.
Office Action received for Chinese Patent Application No. 202080009772.5, mailed on Aug. 17, 2024, 28 pages (15 pages of English Translation and 13 pages of Official Copy).
Corrected Notice of Allowance received for U.S. Appl. No. 18/138,634, mailed on May 2, 2024, 5 pages.
Corrected Notice of Allowance received for U.S. Appl. No. 18/220,715, mailed on Apr. 25, 2024, 2 pages.
Decision to Grant received for Japanese Patent Application No. 2023-572180, mailed on Apr. 22, 2024, 3 pages (1 page of English Translation and 2 pages of Official Copy).
Office Action received for Chinese Patent Application No. 202110530629.7, mailed on Mar. 14, 2024, 13 pages (6 pages of English Translation and 7 pages of Official Copy).
Office Action received for European Patent Application No. 23168077.8, mailed on Apr. 25, 2024, 7 pages.
Supplemental Notice of Allowance received for U.S. Appl. No. 17/031,765, mailed on Apr. 19, 2024, 3 pages.
Supplemental Notice of Allowance received for U.S. Appl. No. 17/031,765, mailed on May 2, 2024, 3 pages.
Corrected Notice of Allowance received for U.S. Appl. No. 18/197,242, mailed on Apr. 4, 2024, 2 pages.
Corrected Notice of Allowance received for U.S. Appl. No. 18/220,715, mailed on Apr. 8, 2024, 2 pages.

Notice of Allowance received for U.S. Appl. No. 18/138,634, mailed on Apr. 18, 2024, 9 pages.
Supplemental Notice of Allowance received for U.S. Appl. No. 17/031,765, mailed on Apr. 9, 2024, 2 pages.
Advisory Action received for U.S. Appl. No. 17/031,765, mailed on Nov. 13, 2023, 5 pages.
Decision to Grant received for Japanese Patent Application No. 2023-146062, mailed on Nov. 13, 2023, 2 pages (1 page of English Translation and 1 page of Official Copy).
Notice of Allowance received for Korean Patent Application No. 10-2022-7029729, mailed on Nov. 9, 2023, 8 pages (2 pages of English Translation and 6 pages of Official Copy).
Office Action received for Japanese Patent Application No. 2022-170806, mailed on Nov. 17, 2023, 14 pages (7 pages of English Translation and 7 pages of Official Copy).
Intention to Grant received for European Patent Application No. 22729935.1, mailed on Nov. 22, 2024, 9 pages.
Notice of Allowance received for Korean Patent Application No. 10-2023-0189466, mailed on Nov. 5, 2024, 10 pages (2 pages of English Translation and 8 pages of Official Copy).
Notice of Allowance received for Korean Patent Application No. 10-2024-7004853, mailed on Nov. 14, 2024, 8 pages (2 pages of English Translation and 6 pages of Official Copy).
Office Action received for European Patent Application No. 23168077.8, mailed on Nov. 21, 2024, 8 pages.
Final Office Action received for U.S. Appl. No. 18/375,309, mailed on Dec. 4, 2024, 18 pages.
Intention to Grant received for European Patent Application No. 21728746.5, mailed on Dec. 6, 2024, 8 pages.
International Preliminary Report on Patentability received for PCT Patent Application No. PCT/US2023/023273, mailed on Dec. 5, 2024, 13 pages.
Notice of Allowance received for U.S. Appl. No. 18/241,802, mailed on Dec. 4, 2024, 12 pages.
Office Action received for Australian Patent Application No. 2023219926, mailed on Dec. 3, 2024, 4 pages.
Office Action received for Japanese Patent Application No. 2024-144411, mailed on Nov. 25, 2024, 4 pages (2 pages of English Translation and 2 pages of Official Copy).
Applicant-Initiated Interview Summary received for U.S. Appl. No. 18/375,309, mailed on Feb. 28, 2025, 4 pages.
Corrected Notice of Allowance received for U.S. Appl. No. 17/031,671, mailed on Mar. 19, 2025, 3 pages.
Decision on Appeal received for U.S. Appl. No. 17/461,014, mailed on Feb. 4, 2025, 12 pages.
Decision on Appeal received for U.S. Appl. No. 18/119,789, mailed on Feb. 20, 2025, 16 pages.
Decision to Grant received for European Patent Application No. 21728746.5, mailed on Feb. 6, 2025, 4 pages.
Examiner-Initiated Interview Summary received for U.S. Appl. No. 17/031,671, mailed on Jan. 6, 2025, 2 pages.
Intention to Grant received for European Patent Application No. 22154034.7, mailed on Feb. 26, 2025, 9 pages.
Non-Final Office Action received for U.S. Appl. No. 18/677,585, mailed on Dec. 27, 2024, 14 pages.
Notice of Allowance received for Japanese Patent Application No. 2024-144411, mailed on Jan. 6, 2025, 4 pages (1 page of English Translation and 3 pages of Official Copy).
Notice of Allowance received for Korean Patent Application No. 10-2023-0189466, mailed on Feb. 17, 2025, 10 pages (2 pages of English Translation and 8 pages of Official Copy).
Notice of Allowance received for U.S. Appl. No. 17/031,671, mailed on Jan. 29, 2025, 37 pages.
Notice of Allowance received for U.S. Appl. No. 18/677,585, mailed on Mar. 5, 2025, 9 pages.
Office Action received for Australian Patent Application No. 2024201007, mailed on Feb. 7, 2025, 2 pages.
Office Action received for Chinese Patent Application No. 202010330318.1, mailed on Mar. 6, 2025, 27 pages (15 pages of English Translation and 12 pages of Official Copy).
Office Action received for Chinese Patent Application No. 202080009772.5, mailed on Feb. 15, 2025, 24 pages (13 pages of English Translation and 11 pages of Official Copy).

(56) References Cited

OTHER PUBLICATIONS

Office Action received for Japanese Patent Application No. 2023-210355, mailed on Feb. 4, 2025, 6 pages (3 pages of English Translation and 3 pages of Official Copy).
Record of Oral Hearing received for U.S. Appl. No. 17/461,014, mailed on Feb. 12, 2025, 17 pages.
Record of Oral Hearing received for U.S. Appl. No. 18/119,789, mailed on Feb. 23, 2025, 14 pages.
Summons to Attend Oral Proceedings received for European Patent Application No. 20704768.9, mailed on Mar. 17, 2025, 9 pages.
Supplemental Notice of Allowance received for U.S. Appl. No. 17/031,671, mailed on Feb. 12, 2025, 4 pages.
Supplemental Notice of Allowance received for U.S. Appl. No. 17/031,671, mailed on Feb. 27, 2025, 3 pages.
Corrected Notice of Allowance received for U.S. Appl. No. 18/241,802, mailed on Mar. 28, 2025, 9 pages.
Corrected Notice of Allowance received for U.S. Appl. No. 18/677,585, mailed on Apr. 7, 2025, 5 pages.
Corrected Notice of Allowance received for U.S. Appl. No. 18/677,585, mailed on Mar. 31, 2025, 5 pages.
Decision to Grant received for European Patent Application No. 22729935.1, mailed on Mar. 27, 2025, 3 pages.
International Preliminary Report on Patentability received for PCT Patent Application No. PCT/US2023/031979, mailed on Mar. 20, 2025, 11 pages.
International Preliminary Report on Patentability received for PCT Patent Application No. PCT/US2023/033376, mailed on Apr. 3, 2025, 15 pages.
Non-Final Office Action received for U.S. Appl. No. 18/131,833, mailed on Apr. 3, 2025, 15 pages.
Notice of Allowance received for U.S. Appl. No. 17/461,014, mailed on Apr. 17, 2025, 7 pages.
Extended European Search Report received for European Patent Application No. 24215123.1, mailed on Apr. 8, 2025, 9 pages.
Intention to Grant received for European Patent Application No. 23168077.8, mailed on Apr. 7, 2025, 9 pages.
Notice of Acceptance received for Australian Patent Application No. 2023219926, mailed on Apr. 7, 2025, 3 pages.
Notice of Acceptance received for Australian Patent Application No. 2024201007, mailed on Apr. 7, 2025, 3 pages.
Office Action received for Chinese Patent Application No. 201910691865.X, mailed on Apr. 14, 2025, 14 pages (5 pages of English Translation and 9 pages of Official Copy).
Non-Final Office Action received for U.S. Appl. No. 18/375,309, mailed on Apr. 23, 2025, 21 pages.

\* cited by examiner

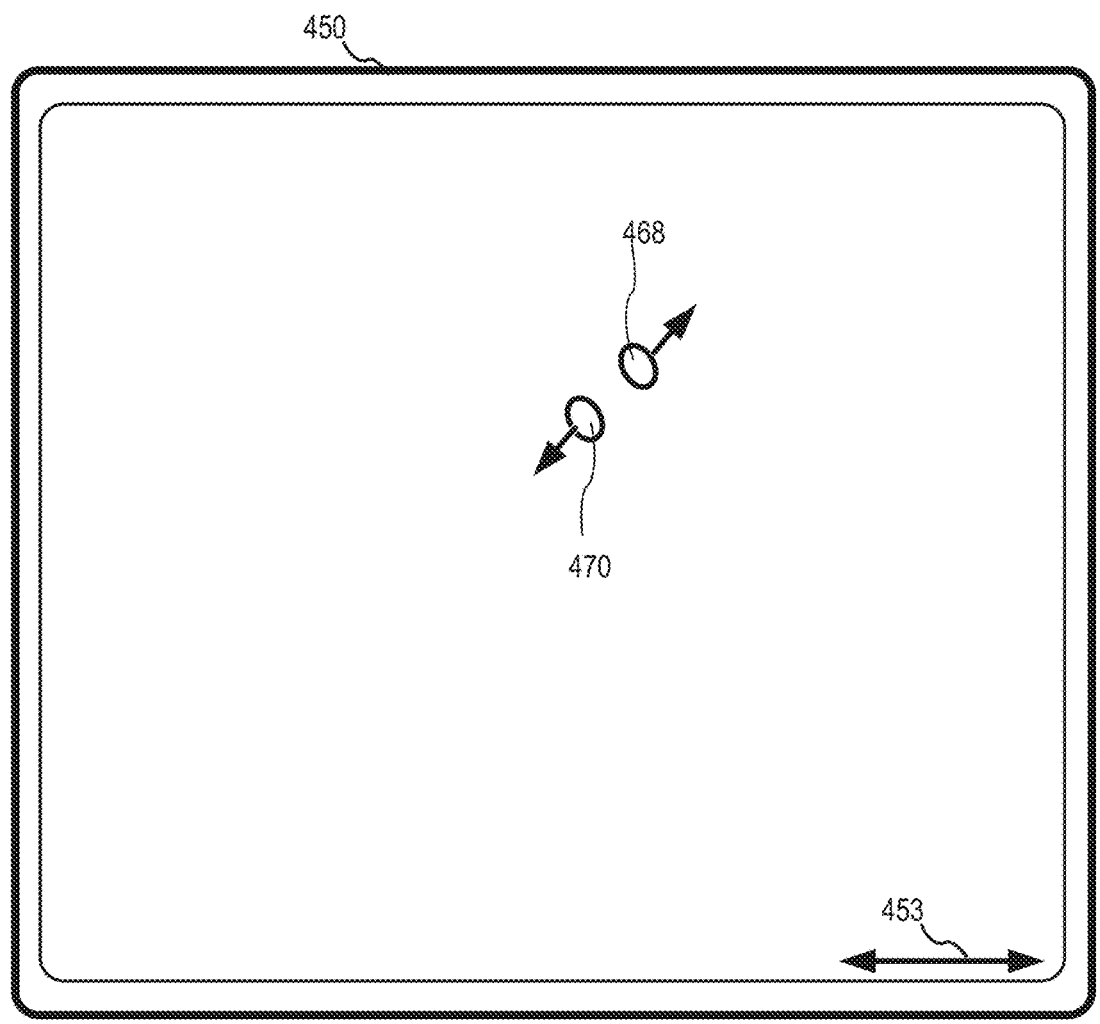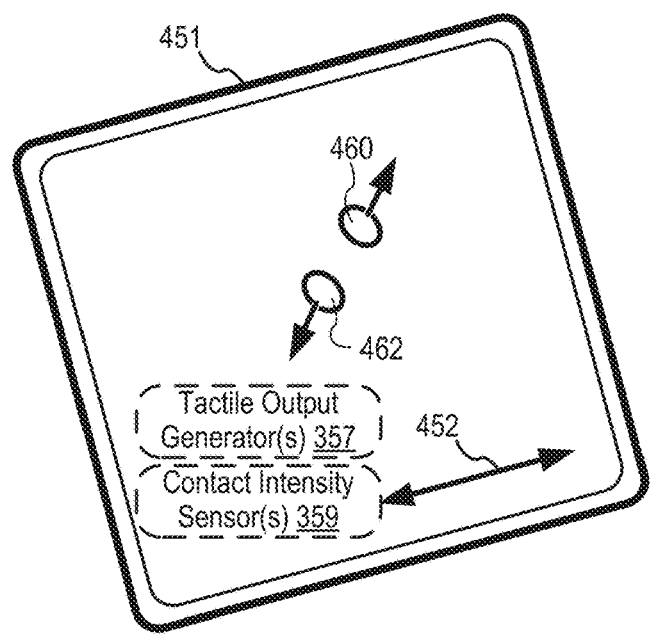
*FIG. 4B*

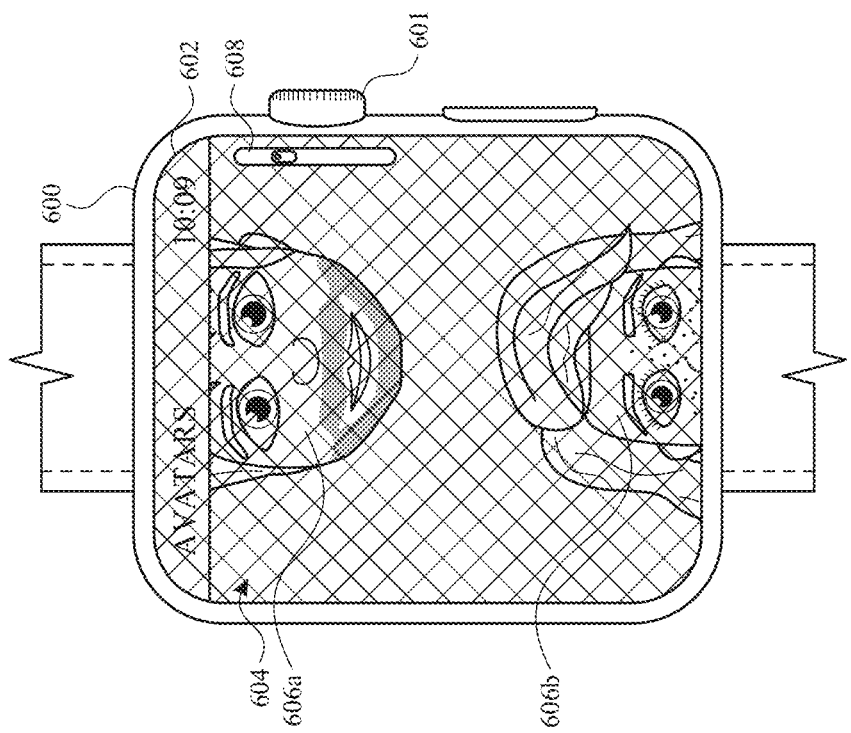
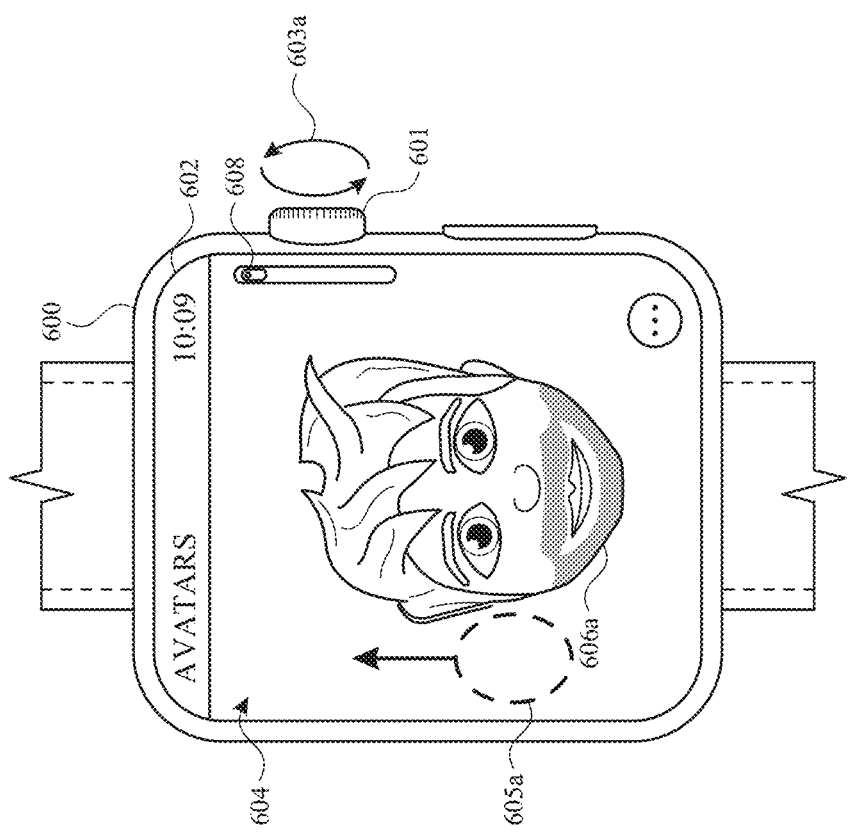
FIG. 6B
FIG. 6A

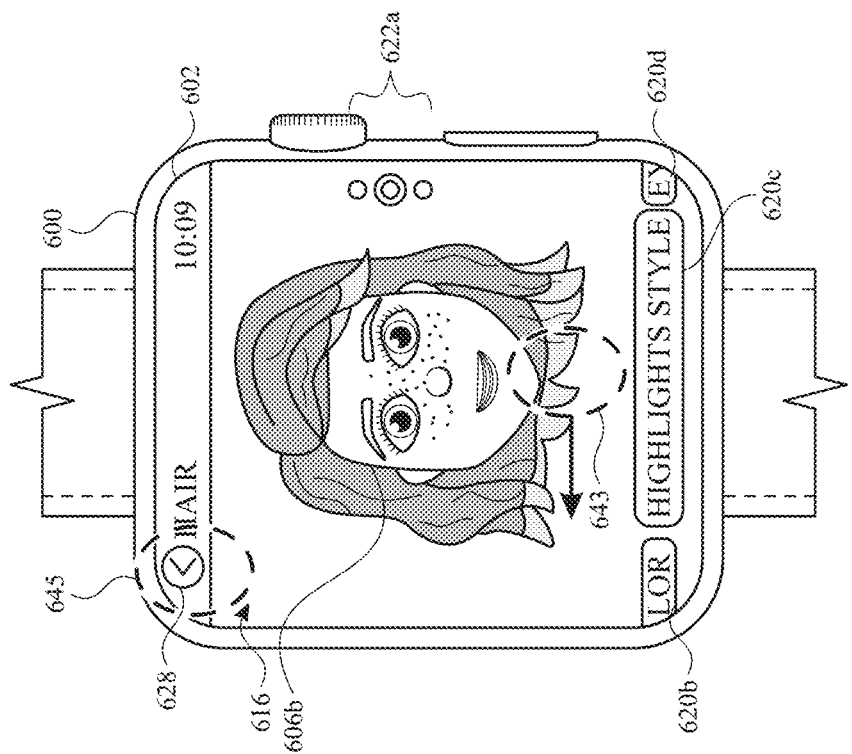
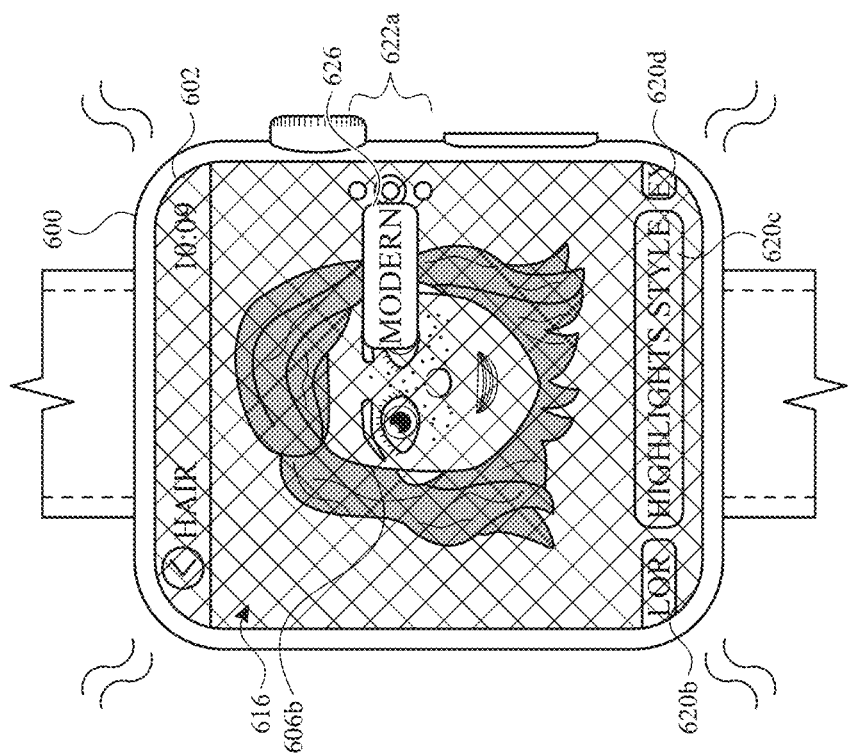
FIG. 6S
FIG. 6T

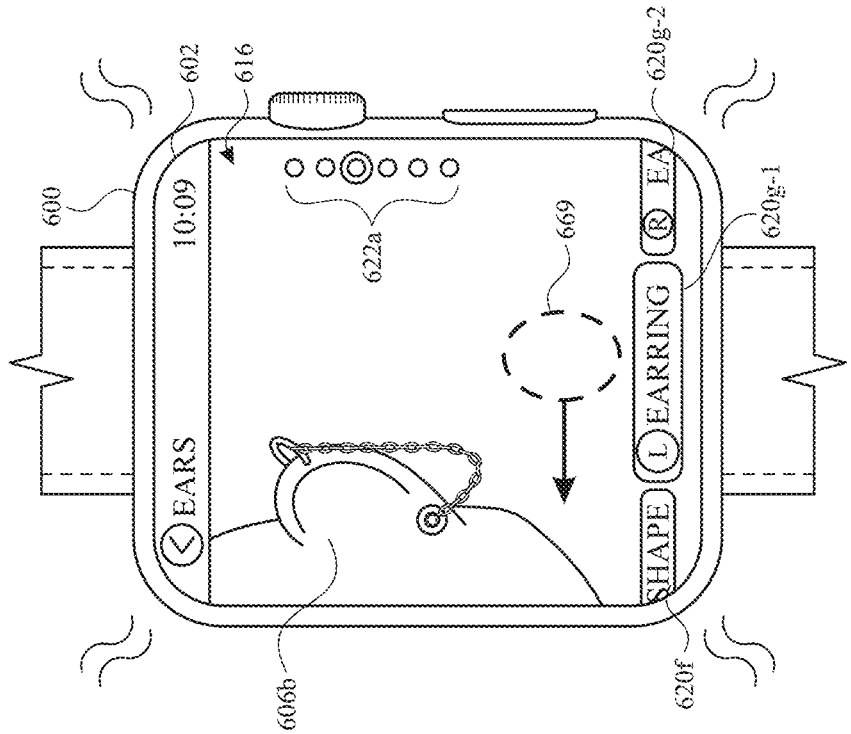
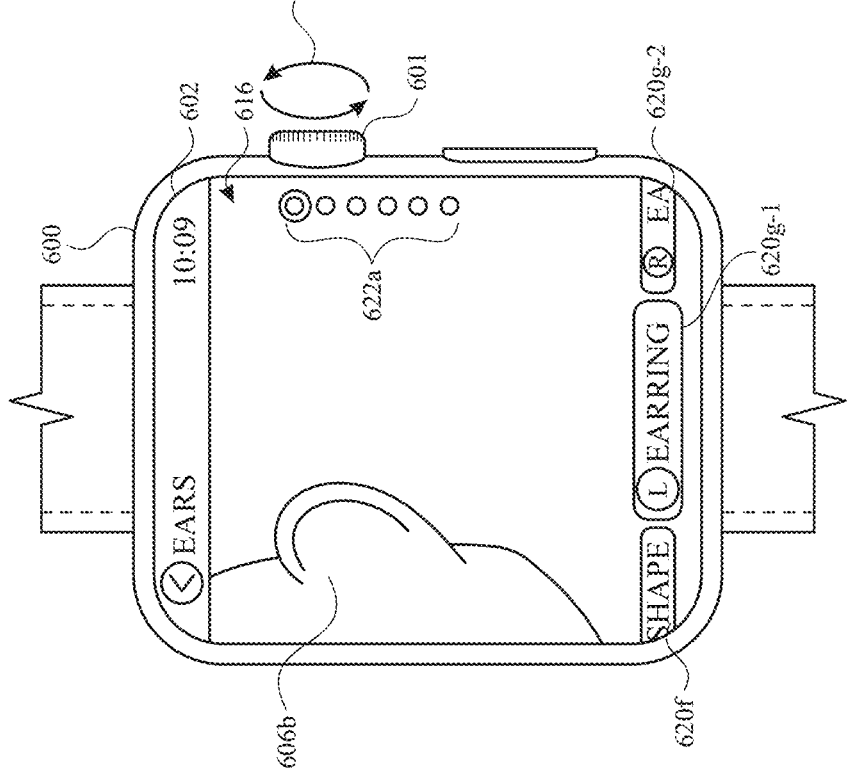
FIG. 6AD
FIG. 6AC

700

702
Display an avatar editing user interface that includes displaying a first view of an avatar, where:

704
The avatar includes a plurality of avatar features

706
Displaying the first view of the avatar includes displaying the avatar at a first size

708
While displaying the first view of the avatar, detect a request to enter an editing mode for a first feature of the plurality of avatar features

710
In response to detecting the request to enter the editing mode for the first feature of the plurality of avatar features, display a second view of the avatar, where:

712
Displaying the second view of the avatar includes changing the size of the avatar to a second size different from the first size and shifting the avatar so that the first feature is emphasized relative to other avatar features

802
Display an avatar editing user interface that includes concurrently displaying:

804
At least a portion of an avatar having a plurality of avatar features, where displaying at least the portion of the avatar includes displaying a respective avatar feature with a first characteristic option

806
A characteristic selection element corresponding to a set of characteristic options for the respective avatar feature, where the set of characteristic options includes the first characteristic option for the respective avatar feature

↓

808
While displaying at least the portion of the avatar and the characteristic selection element, detect a rotation of the rotatable input device

↓

810
In response to detecting the rotation of the rotatable input device:

812
Cease to display the respective avatar feature with the first characteristic option

↓

814
Display the respective avatar feature with a second characteristic option, where:

816
The second characteristic option is selected from the set of characteristic options based on the rotation of the rotatable input device

818
The second characteristic option is different from the first characteristic option

1016
In accordance with a determination that a second characteristic option, different from the first characteristic option, of the set of characteristic options for the first avatar feature of the virtual avatar is selected:

1018
Display a third characteristic selection element corresponding to a set of characteristic options for a third avatar feature of the virtual avatar, different from the second avatar feature of the virtual avatar.

1020
Display the graphical element that identifies the third avatar feature of the virtual avatar.

1022
While displaying the graphical element that identifies the third avatar feature of the virtual avatar, detect a third input corresponding to a selection of a third characteristic option of the set of characteristic options for the first avatar feature of the virtual avatar that is different from the second characteristic option of the set of characteristic options for the first avatar feature of the virtual avatar 1024
In response to detecting the third input, cease display of the graphical element that identifies the third avatar feature of the virtual avatar.

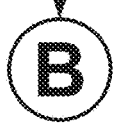

*FIG. 10B*

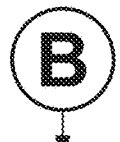

1026
While displaying the avatar editing user interface, including the third characteristic selection element corresponding to the set of characteristic options for the third avatar feature of the virtual avatar:

1028
Detect, via the one or more input devices, a second input corresponding to a request to display a characteristic selection element corresponding to a set of characteristic options for a feature different from the third avatar feature of the virtual avatar and different from the first avatar feature of the virtual avatar.

1030
In response to detecting the second input, display a fourth characteristic selection element corresponding to a set of options for a color of a second portion of a pair of glasses that is different from a first portion of the pair of glasses.

1032
Detect, via the one or more input devices, a fourth input corresponding to a request to display a characteristic selection element corresponding to a set of characteristic options for a feature different from the third avatar feature of the virtual avatar and different from the first avatar feature of the virtual avatar.

1034
In response to detecting the forth input, display a fifth characteristic selection element corresponding to a set of characteristic options for a fourth avatar feature of the virtual avatar that is different from the third avatar feature of the virtual avatar, wherein the fourth avatar feature of the virtual avatar includes a second feature of the second characteristic option that is different from the first feature of the second characteristic option.

*FIG. 10C*

EDITING FEATURES OF AN AVATAR

CROSS-REFERENCE TO RELATED APPLICATIONS

This application is a continuation of U.S. patent application Ser. No. 17/093,408, filed Nov. 9, 2020, entitled "EDITING FEATURES OF AN AVATAR," which claims the benefit of U.S. Provisional Application Ser. No. 63/077,922, filed Sep. 14, 2020, entitled "EDITING FEATURES OF AN AVATAR," and U.S. Provisional Application Ser. No. 63/023,178, filed May 11, 2020, entitled "EDITING FEATURES OF AN AVATAR," which are each hereby incorporated by reference in their entirety.

FIELD

The present disclosure relates generally to computer user interfaces, and more specifically to techniques for editing features of an avatar.

BACKGROUND

Avatars are used to represent the users of electronic devices. The avatars can represent the appearance of a user or can represent an idealized or completely fictional representation of the user. Avatars can then be associated with a user so that the appearance of the avatar to others triggers an association or link with the user. Avatars can be created and edited for such use, including use in multimedia communications.

BRIEF SUMMARY

Some techniques for editing features of an avatar using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for editing features of an avatar. Such methods and interfaces optionally complement or replace other methods for editing features of an avatar. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at a computer system that is in communication with a display generation component and one or more input devices: displaying, via the display generation component, an avatar editing user interface that includes displaying a first view of an avatar, where the avatar includes a plurality of avatar features and displaying the first view of the avatar includes displaying the avatar at a first size; while displaying the first view of the avatar, detecting, via the one or more input devices, a request to enter an editing mode for a first feature of the plurality of avatar features; and in response to detecting the request to enter the editing mode for the first feature of the plurality of avatar features, displaying, via the display generation component, a second view of the avatar, where displaying the second view of the avatar includes changing the size of the avatar to a second size different from the first size and shifting the avatar so that the first feature is emphasized relative to other avatar features.

Example non-transitory computer-readable storage media are described herein. An example non-transitory computer-readable storage medium stores one or more programs configured to be executed by one or more processors of a computer system with a display generation component and one or more input devices, the one or more programs including instructions for: displaying, via the display generation component, an avatar editing user interface that includes displaying a first view of an avatar, where the avatar includes a plurality of avatar features and displaying the first view of the avatar includes displaying the avatar at a first size; while displaying the first view of the avatar, detecting, via the one or more input devices, a request to enter an editing mode for a first feature of the plurality of avatar features; and in response to detecting the request to enter the editing mode for the first feature of the plurality of avatar features, displaying, via the display generation component, a second view of the avatar, where displaying the second view of the avatar includes changing the size of the avatar to a second size different from the first size and shifting the avatar so that the first feature is emphasized relative to other avatar features.

Example transitory computer-readable storage media are described herein. An example transitory computer-readable storage medium stores one or more programs configured to be executed by one or more processors of a computer system with a display generation component and one or more input devices, the one or more programs including instructions for: displaying, via the display generation component, an avatar editing user interface that includes displaying a first view of an avatar, where the avatar includes a plurality of avatar features and displaying the first view of the avatar includes displaying the avatar at a first size; while displaying the first view of the avatar, detecting, via the one or more input devices, a request to enter an editing mode for a first feature of the plurality of avatar features; and in response to detecting the request to enter the editing mode for the first feature of the plurality of avatar features, displaying, via the display generation component, a second view of the avatar, where displaying the second view of the avatar includes changing the size of the avatar to a second size different from the first size and shifting the avatar so that the first feature is emphasized relative to other avatar features.

Example computer systems are described herein. An example computer system includes a display generation component; one or more input devices; one or more processors; and memory storing one or more programs configured to be executed by the one or more processors, the one or more programs including instructions for: displaying, via the display generation component, an avatar editing user interface that includes displaying a first view of an avatar, where the avatar includes a plurality of avatar features and displaying the first view of the avatar includes displaying the avatar at a first size; while displaying the first view of the avatar, detecting, via the one or more input devices, a request to enter an editing mode for a first feature of the plurality of avatar features; and in response to detecting the request to enter the editing mode for the first feature of the plurality of avatar features, displaying, via the display generation component, a second view of the avatar, where displaying the second view of the avatar includes changing the size of the avatar to a second size different from the first size and shifting the avatar so that the first feature is emphasized relative to other avatar features.

An example computer system includes a display generation component; one or more input devices; means for displaying, via the display generation component, an avatar editing user interface that includes displaying a first view of an avatar, where the avatar includes a plurality of avatar features and displaying the first view of the avatar includes displaying the avatar at a first size; means for, while displaying the first view of the avatar, detecting, via the one or more input devices, a request to enter an editing mode for a first feature of the plurality of avatar features; and means for, in response to detecting the request to enter the editing mode for the first feature of the plurality of avatar features, displaying, via the display generation component, a second view of the avatar, where displaying the second view of the avatar includes changing the size of the avatar to a second size different from the first size and shifting the avatar so that the first feature is emphasized relative to other avatar features.

An example method includes, at a computer system that is in communication with a display generation component and a rotatable input device: displaying, via the display generation component, an avatar editing user interface that includes concurrently displaying: at least a portion of an avatar having a plurality of avatar features, where displaying at least the portion of the avatar includes displaying a respective avatar feature with a first characteristic option; and a characteristic selection element corresponding to a set of characteristic options for the respective avatar feature, where displaying the set of characteristic options includes the first characteristic option for the respective avatar feature; while displaying at least the portion of the avatar and the characteristic selection element, detecting a rotation of the rotatable input device; and in response to detecting the rotation of the rotatable input device: ceasing to display the respective avatar feature with the first characteristic option; and displaying, via the display generation component, the respective avatar feature with a second characteristic option, where the second characteristic option is selected from the set of characteristic options based on the rotation of the rotatable input device and the second characteristic option is different from the first characteristic option.

An example non-transitory computer-readable storage medium stores one or more programs configured to be executed by one or more processors of a computer system with a display generation component and a rotatable input device, the one or more programs including instructions for: displaying, via the display generation component, an avatar editing user interface that includes concurrently displaying: at least a portion of an avatar having a plurality of avatar features, where displaying at least the portion of the avatar includes displaying a respective avatar feature with a first characteristic option; and a characteristic selection element corresponding to a set of characteristic options for the respective avatar feature, where displaying the set of characteristic options includes the first characteristic option for the respective avatar feature; while displaying at least the portion of the avatar and the characteristic selection element, detecting a rotation of the rotatable input device; and in response to detecting the rotation of the rotatable input device: ceasing to display the respective avatar feature with the first characteristic option; and displaying, via the display generation component, the respective avatar feature with a second characteristic option, where the second characteristic option is selected from the set of characteristic options based on the rotation of the rotatable input device and the second characteristic option is different from the first characteristic option.

An example transitory computer-readable storage medium stores one or more programs configured to be executed by one or more processors of a computer system with a display generation component and a rotatable input device, the one or more programs including instructions for: displaying, via the display generation component, an avatar editing user interface that includes concurrently displaying: at least a portion of an avatar having a plurality of avatar features, where displaying at least the portion of the avatar includes displaying a respective avatar feature with a first characteristic option; and a characteristic selection element corresponding to a set of characteristic options for the respective avatar feature, where displaying the set of characteristic options includes the first characteristic option for the respective avatar feature; while displaying at least the portion of the avatar and the characteristic selection element, detecting a rotation of the rotatable input device; and in response to detecting the rotation of the rotatable input device: ceasing to display the respective avatar feature with the first characteristic option; and displaying, via the display generation component, the respective avatar feature with a second characteristic option, where the second characteristic option is selected from the set of characteristic options based on the rotation of the rotatable input device and the second characteristic option is different from the first characteristic option.

An example computer system includes a display generation component; a rotatable input device; one or more processors; and memory storing one or more programs configured to be executed by the one or more processors, the one or more programs including instructions for: displaying, via the display generation component, an avatar editing user interface that includes concurrently displaying: at least a portion of an avatar having a plurality of avatar features, where displaying at least the portion of the avatar includes displaying a respective avatar feature with a first characteristic option; and a characteristic selection element corresponding to a set of characteristic options for the respective avatar feature, where displaying the set of characteristic options includes the first characteristic option for the respective avatar feature; while displaying at least the portion of the avatar and the characteristic selection element, detecting a rotation of the rotatable input device; and in response to detecting the rotation of the rotatable input device: ceasing to display the respective avatar feature with the first characteristic option; and displaying, via the display generation component, the respective avatar feature with a second characteristic option, where the second characteristic option is selected from the set of characteristic options based on the rotation of the rotatable input device and the second characteristic option is different from the first characteristic option.

An example computer system includes a display generation component; a rotatable input device; means for displaying, via the display generation component, an avatar editing user interface that includes concurrently displaying: at least a portion of an avatar having a plurality of avatar features, where displaying at least the portion of the avatar includes displaying a respective avatar feature with a first characteristic option; and a characteristic selection element corresponding to a set of characteristic options for the respective avatar feature, the set of characteristic options includes the first characteristic option for the respective avatar feature; means for, while displaying at least the portion of the avatar and the characteristic selection element, detecting a rotation of the rotatable input device; and means for, in response to detecting the rotation of the rotatable input device: ceasing to display the respective avatar feature with the first characteristic option; and displaying, via the display generation component, the respective avatar feature with a second characteristic option, where the second characteristic option is selected from the set of characteristic options based on the rotation of the rotatable input device and the second characteristic option is different from the first characteristic option.

An example method includes, at a computer system that is in communication with a display generation component and one or more input devices: displaying, via the display generation component, an avatar editing user interface that includes a first characteristic selection element corresponding to a set of characteristic options for a first avatar feature of a virtual avatar; while displaying the avatar editing user interface, detecting, via the one or more input devices, an input corresponding to a request to display a characteristic selection element corresponding to a set of characteristic options for a feature different from the first avatar feature of the virtual avatar; and in response to detecting the input: in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

An example non-transitory computer-readable storage medium stores one or more programs configured to be executed by one or more processors of a computer system with a display generation component and one or more input devices, the one or more programs including instructions for: displaying, via the display generation component, an avatar editing user interface that includes a first characteristic selection element corresponding to a set of characteristic options for a first avatar feature of a virtual avatar; while displaying the avatar editing user interface, detecting, via the one or more input devices, an input corresponding to a request to display a characteristic selection element corresponding to a set of characteristic options for a feature different from the first avatar feature of the virtual avatar; and in response to detecting the input: in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

An example transitory computer-readable storage medium stores one or more programs configured to be executed by one or more processors of a computer system with a display generation component and one or more input devices, the one or more programs including instructions for: displaying, via the display generation component, an avatar editing user interface that includes a first characteristic selection element corresponding to a set of characteristic options for a first avatar feature of a virtual avatar; while displaying the avatar editing user interface, detecting, via the one or more input devices, an input corresponding to a request to display a characteristic selection element corresponding to a set of characteristic options for a feature different from the first avatar feature of the virtual avatar; and in response to detecting the input: in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

An example computer system includes a display generation component; one or more input devices; one or more processors; and memory storing one or more programs configured to be executed by the one or more processors, the one or more programs including instructions for: displaying, via the display generation component, an avatar editing user interface that includes a first characteristic selection element corresponding to a set of characteristic options for a first avatar feature of a virtual avatar; while displaying the avatar editing user interface, detecting, via the one or more input devices, an input corresponding to a request to display a characteristic selection element corresponding to a set of characteristic options for a feature different from the first avatar feature of the virtual avatar; and in response to detecting the input: in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

An example computer system includes a display generation component; one or more input devices; means for displaying, via the display generation component, an avatar editing user interface that includes a first characteristic selection element corresponding to a set of characteristic options for a first avatar feature of a virtual avatar; means, while displaying the avatar editing user interface, for detecting, via the one or more input devices, an input corresponding to a request to display a characteristic selection element corresponding to a set of characteristic options for a feature different from the first avatar feature of the virtual avatar; and means for, in response to detecting the input: in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for editing features of an avatar, thereby increasing the effectiveness, efficiency, and user satisfaction with such devices. Such methods and interfaces may complement or replace other methods for editing features of an avatar.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for editing features of an avatar using an electronic device in accordance with some embodiments.

FIG. 8 is a flow diagram illustrating a method for editing features of an avatar using an electronic device in accordance with some embodiments.

FIGS. 10A-10C are flow diagrams illustrating methods for editing features of an avatar using an electronic device in accordance with some embodiments.

DESCRIPTION OF EMBODIMENTS

Figure 1A:
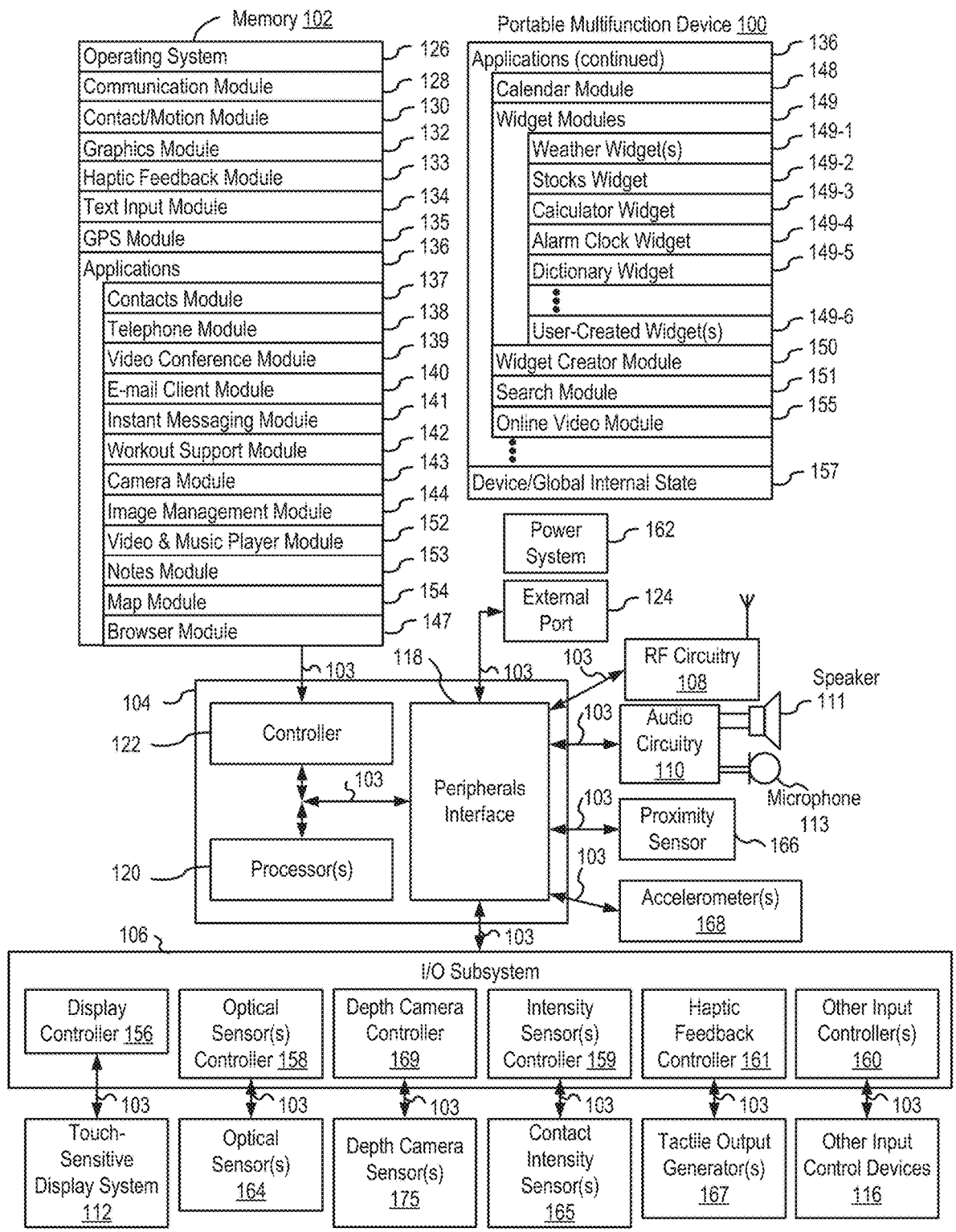
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for editing features of an avatar. For example, while programs already exist for creating and editing avatars, these programs are inefficient and difficult to use compared to the techniques below, in particular when display size is limited. Such techniques can reduce the cognitive burden on a user who edits features of an avatar, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6AH illustrate exemplary user interfaces for editing features of an avatar. FIGS. 7 and 8 are flow diagrams illustrating methods of editing features of an avatar in accordance with some embodiments. The user interfaces in FIGS. 6A-6AH are used to illustrate the processes described below, including the processes in FIGS. 7 and 8. FIGS. 9A-9M illustrate exemplary user interfaces for editing features of an avatar using an electronic device. FIGS. 10A-10C are flow diagrams illustrating methods for editing features of an avatar using an electronic device in accordance with some embodiments. The user interfaces in FIGS. 9A-9M are used to illustrate the processes described below, including the processes in FIGS. 10A-10C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth™, Bluetooth™ Low Energy (BTLE), Wireless Fidelity (Wi-Fi™) (e.g., IEEE 802.11a, IEEE 802.11b, IEEE 802.11g, IEEE 802.11n, and/or IEEE 802.11ac), voice over Internet Protocol (VoIP), Wi-MAX™, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
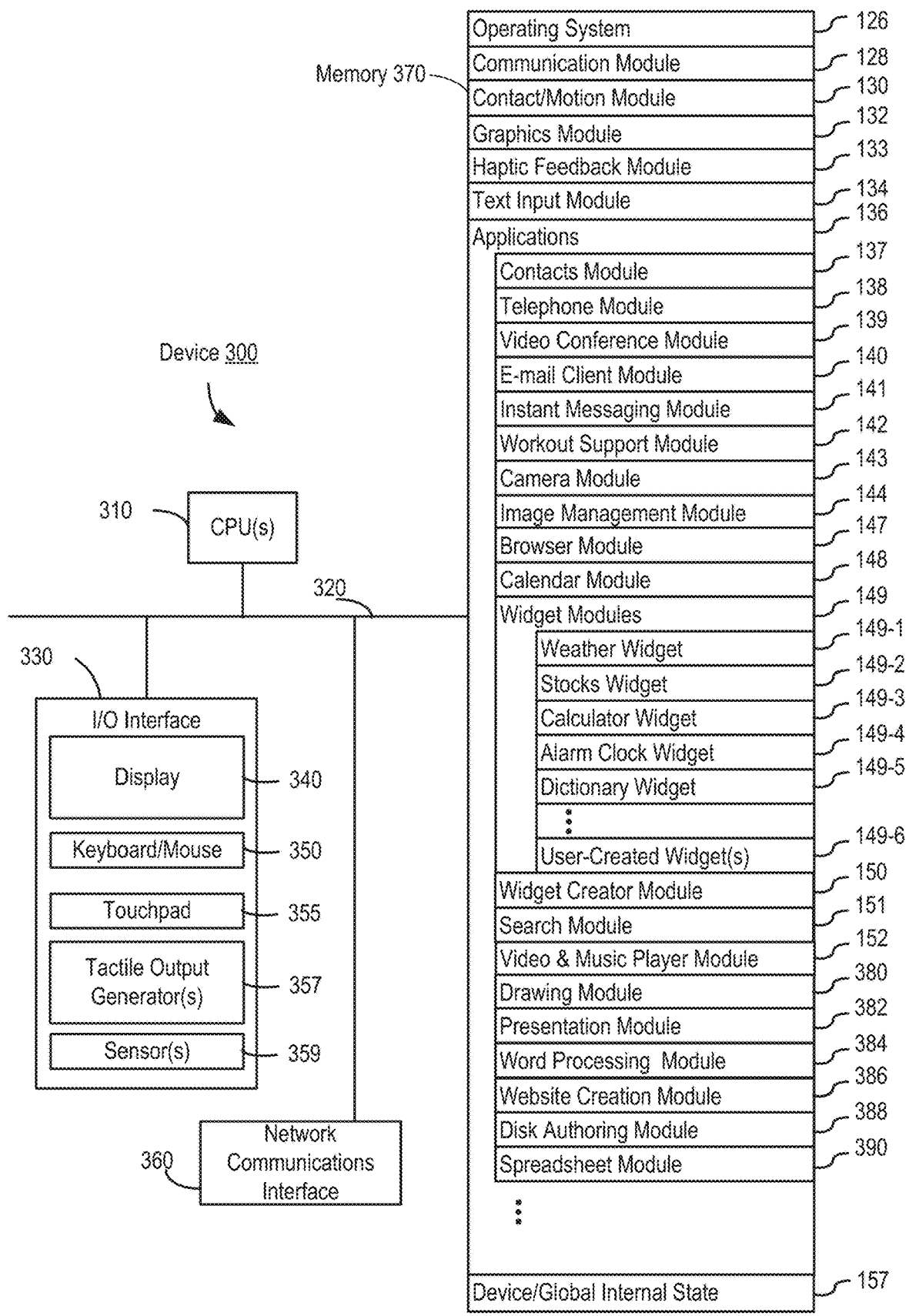
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
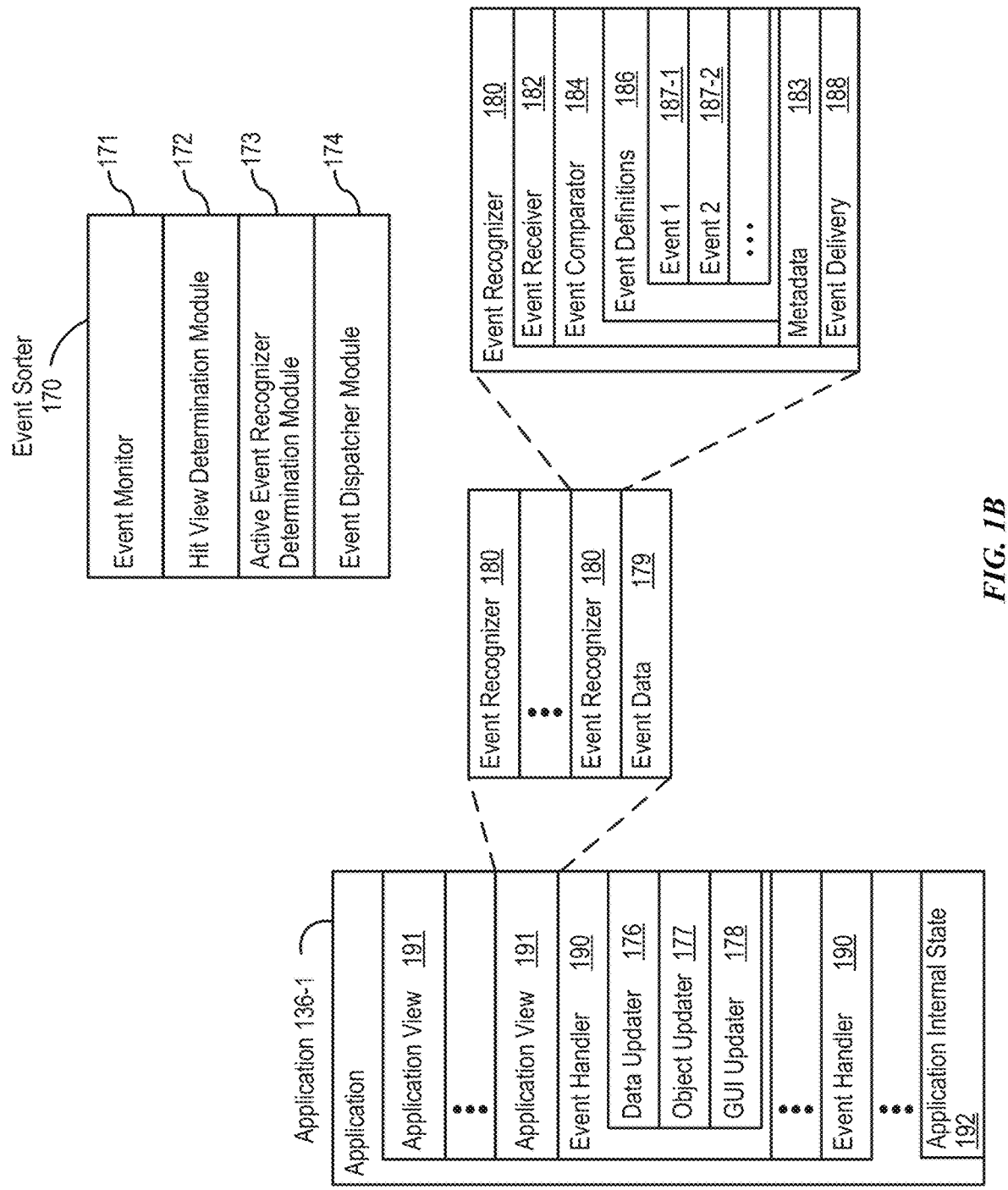
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
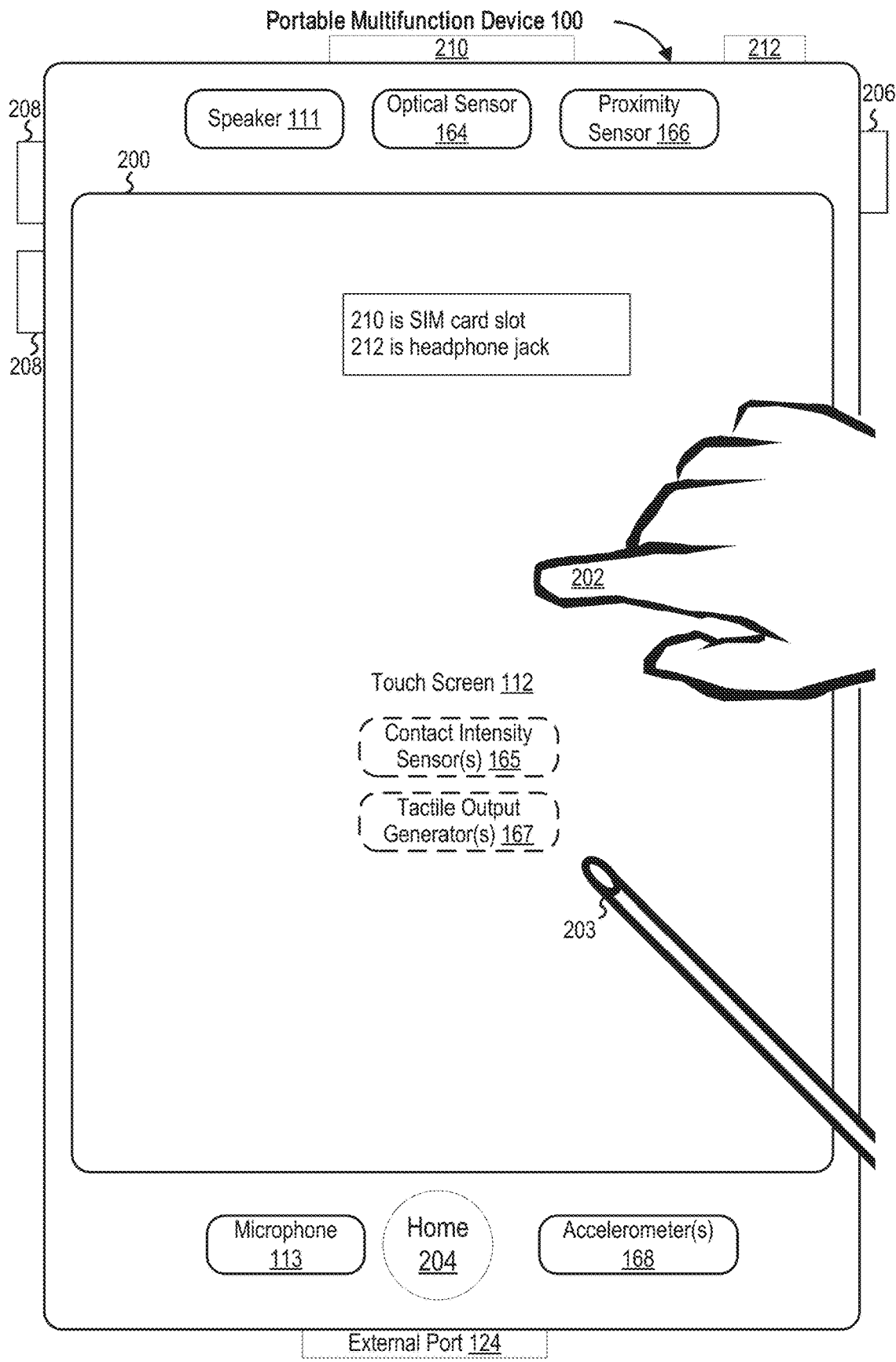
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
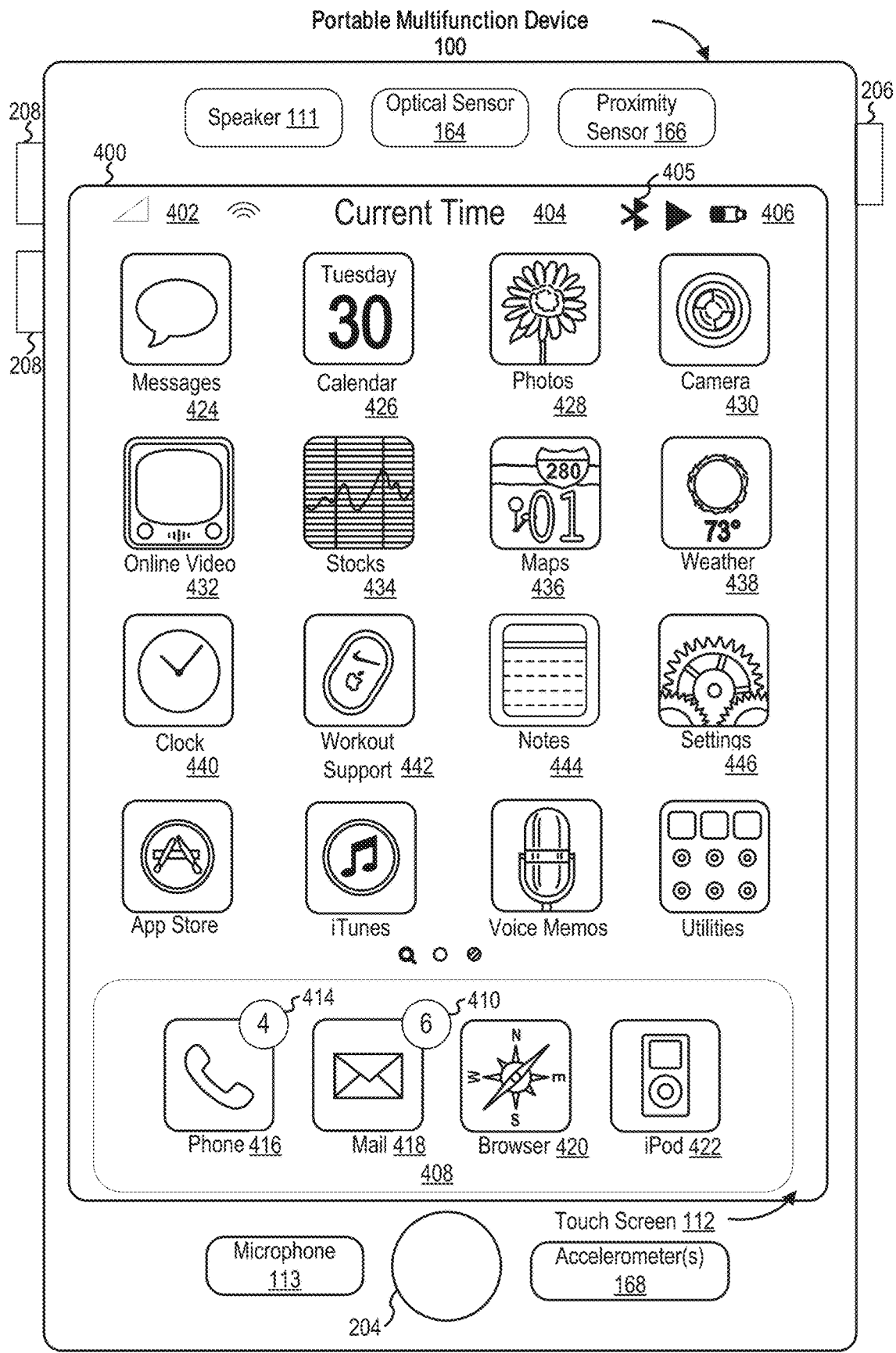
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi™ signals;
Time 404;
Bluetooth™ indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
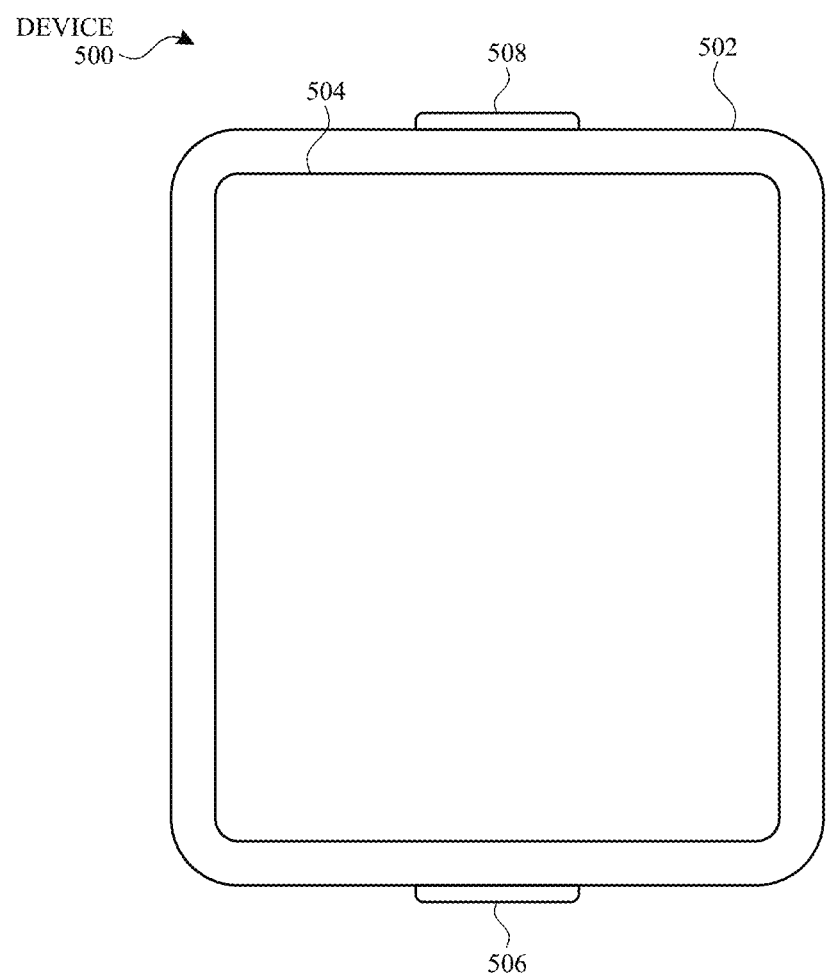
FIG. 5A illustrates a personal electronic device in accordance with some embodiments.
Figure 6C:
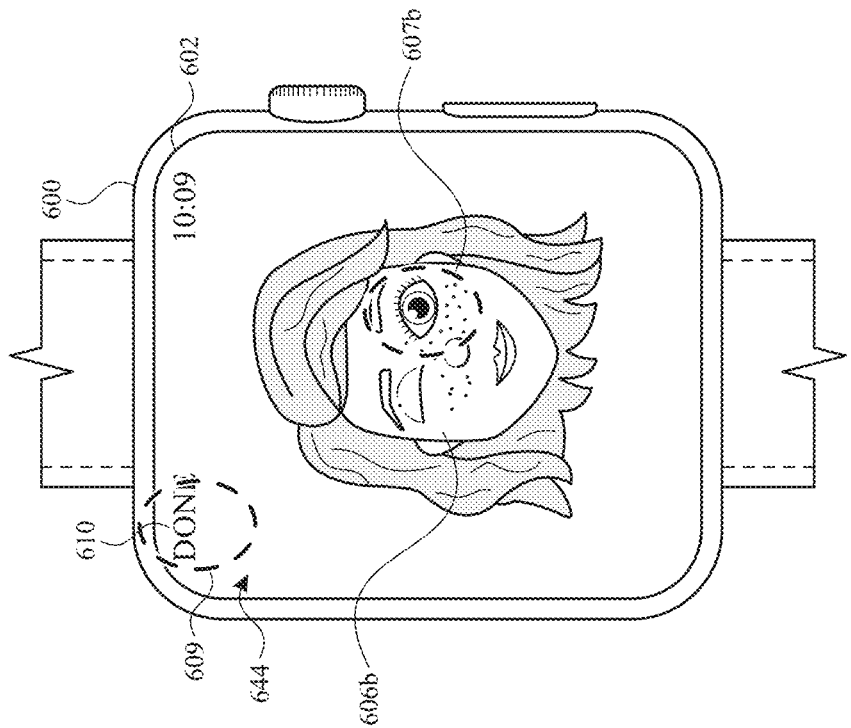
FIGS. 6A-6AH illustrate exemplary user interfaces for editing features of an avatar in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
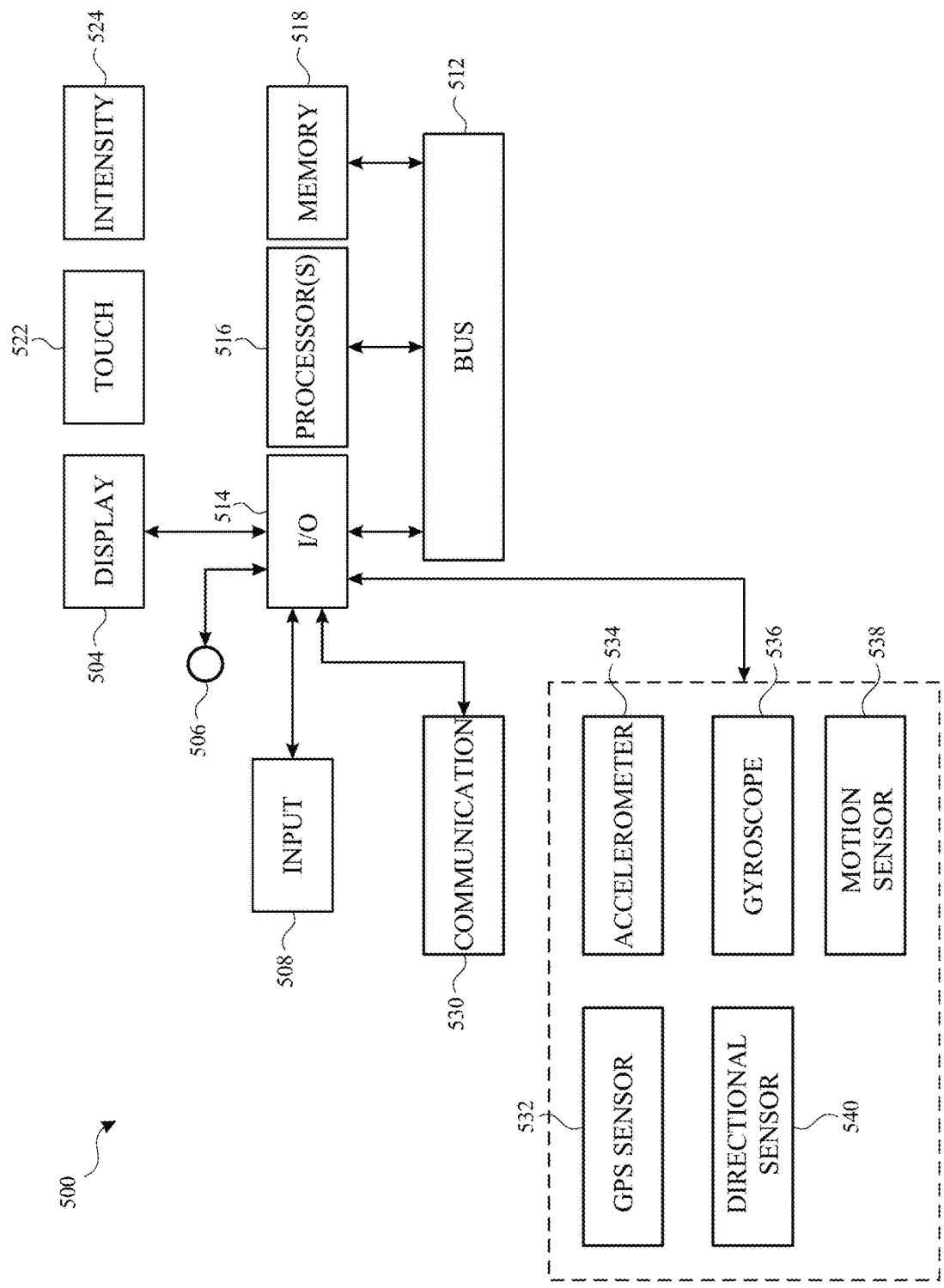
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi™, Bluetooth™, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7, 8, and 10A-10C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AH illustrate exemplary user interfaces for editing an avatar, in accordance with some embodiments. The user interfaces in these figures are used to illustrate the processes described below, including the processes in FIGS. 7 and 8.

FIG. 6A illustrates a device 600 including a display 602 (e.g., integrated with a touch-sensitive surface). In some embodiments, device 600 includes one or more features of device 100, 300, or 500. As shown in FIG. 6A, device 600 displays, via display 602, avatar selection user interface 604 that includes an avatar 606*a*. In some embodiments, avatar 606*a* was previously created using an avatar editing user interface (e.g., such as the avatar editing user interface described below with respect to FIGS. 6G-6AG) and added to avatar selection user interface 604. In some embodiments, if no avatar has previously been created or added to avatar selection user interface 604, then avatar selection user interface 604 does not display an avatar and instead displays an affordance for adding an avatar to the avatar selection user interface 604 (e.g., as shown in FIG. 6F).

In some embodiments, avatar 606*a* is a representation of a user that can be graphically depicted (e.g., a graphical representation of the user). In some embodiments, avatar 606*a* is non-photorealistic (e.g., is cartoonish). In some embodiments, avatar 606*a* includes an avatar face having one or more avatar features (e.g., hair, eyes, ears, mouth, nose, brows). In some embodiments, avatar 606*a* can be selected and customized by a user, for example, to achieve a desired appearance (e.g., to look like the user). Features of avatar 606*a* can be created or changed using an avatar editing user interface (e.g., such as the avatar editing user interface described below with respect to FIGS. 6G-6AG).

As shown in FIG. 6A, avatar selection user interface 604 includes scrollbar 608. In the embodiment illustrated in FIG. 6A, scrollbar 608 includes an indicator (e.g., a pill) indicating that avatar 606*a* is at the top of a scrollable list of avatars (e.g., avatar 606*a* is the first or only avatar in a set of avatars). In some embodiments, in response to detecting an input corresponding to a request to display a different avatar in avatar selection user interface 604, avatar selection user interface 604 scrolls to display another avatar (e.g., as shown in FIG. 6C) or an affordance for adding an avatar to avatar selection user interface 604 (e.g., as shown in FIG. 6F). In some embodiments, the input corresponding to the request to display a different avatar is a rotation 603*a* of rotatable input device 601 (e.g., a rotation of a watch crown). In some embodiments, the input corresponding to the request to display a different avatar is a swipe gesture 605*a* on display 602 (e.g., an upward swipe).

FIG. 6B illustrates device 600 displaying, on display 602, a transition from avatar 606*a* to avatar 606*b* in avatar selection user interface 604. In some embodiments, the transition is displayed in response to detecting an input corresponding to a request to display a different avatar in avatar selection user interface 604 (e.g., rotation 603*a* of rotatable input device 601 or swipe gesture 605*a* on display 602, as shown in FIG. 6A). In some embodiments, the transition includes an animation of avatar 606*a* moving from a center region of display 602 toward an edge of display 602 (e.g., the top edge of the display) and avatar 606*b* moving from an opposite edge of display 602 (e.g., the bottom edge of the display) toward the center region of display 602. In some embodiments, avatar selection user interface 604 is dimmed or blurred during the transition from avatar 606*a* to avatar 606*b*. As shown in FIG. 6B, the indicator in scrollbar 608 moves downward during the transition from avatar 606a to avatar 606b to indicate avatar 606b is not at the top of the scrollable list of avatars.

FIG. 6C illustrates device 600 displaying, on display 602, avatar 606b in avatar selection user interface 604. In some embodiments, avatar 606b was previously created using an avatar editing user interface (e.g., such as the avatar editing user interface described below with respect to FIGS. 6G-6AG) and added to avatar selection user interface 604. In some embodiments, avatar 606b is displayed in avatar selection user interface 604 after creating a new avatar using an avatar editing user interface (e.g., such as the avatar editing user interface described below with respect to FIGS. 6G-6AG). In some embodiments, avatar 606b is displayed in avatar selection user interface 604 in response to a request to display a different avatar in the avatar selection user interface 604 (e.g., rotation 603a of rotatable input device 601 or swipe gesture 605a on display 602, as shown in FIG. 6A). In some embodiments, avatar 606b is at the top of a scrollable list of avatars (e.g., avatar 606b is the first or only avatar in a set of avatars) and is displayed upon entering the avatar selection user interface 604.

In some embodiments, avatar 606b is a representation of a user that can be graphically depicted (e.g., a graphical representation of the user). In some embodiments, avatar 606b is non-photorealistic (e.g., is cartoonish). In some embodiments, avatar 606b includes an avatar face having one or more avatar features (e.g., hair, eyes, ears, mouth, nose, brows). In some embodiments, avatar 606b can be selected and customized by a user, for example, to achieve a desired appearance (e.g., to look like the user). Features of avatar 606b can be created or changed using an avatar editing user interface (e.g., such as the avatar editing user interface described below with respect to FIGS. 6G-6AG).

Figure 6D:
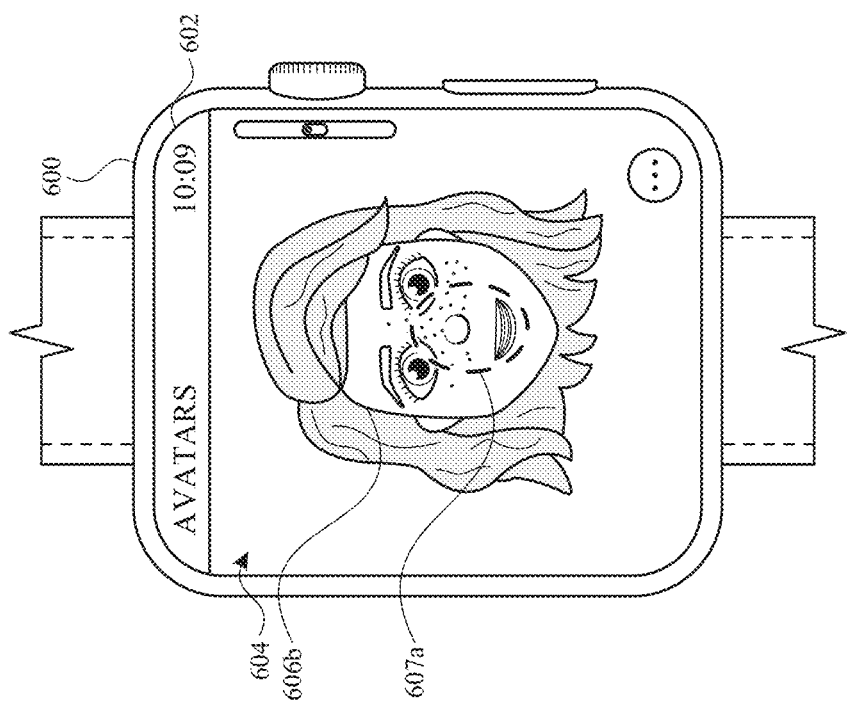
Figure 6F:
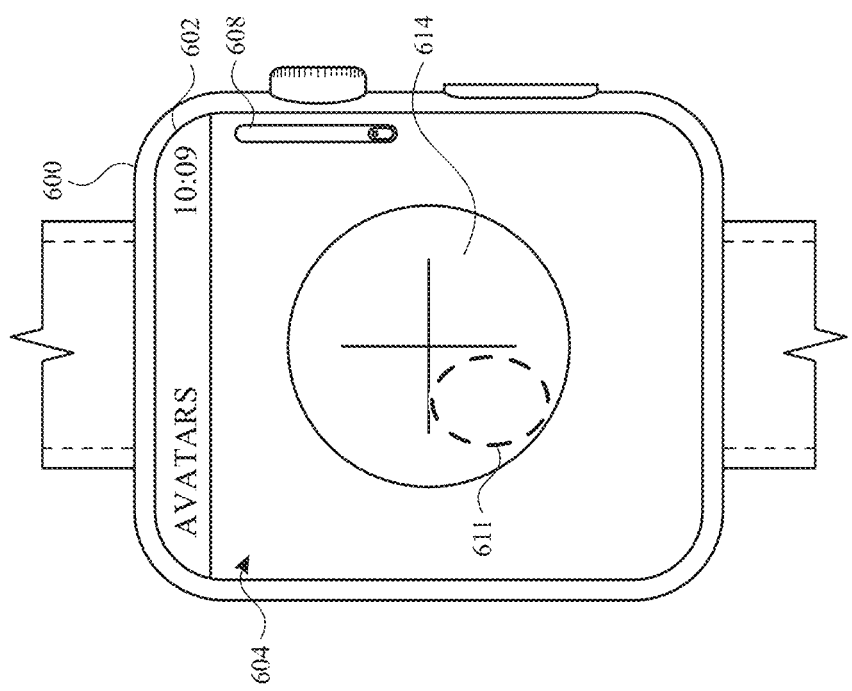

FIG. 6D illustrates device 600 displaying, on display 602, a different pose of avatar 606b in avatar viewing user interface 644. In some embodiments, avatar 606b is displayed with a different pose in response to detecting a tap gesture 607a on display 602 (e.g., at a location corresponding to avatar 606b), as shown FIG. 6C. In some embodiments, the different poses of avatar 606b include different facial expressions (e.g., smiling, frowning, winking, laughing) and/or different head positions (e.g., turning the head of avatar 606b to look up, down, left, or right). In some embodiments, after displaying avatar 606b with a first pose (e.g., a winking pose, as shown in FIG. 6D), avatar 606b is displayed with a second, different pose (e.g., a smiling pose) in response to detecting a subsequent tap gesture 607b on display 602 (e.g., at a location corresponding to avatar 606b). In some embodiments, while avatar viewing user interface 644 is displayed, in response to detecting additional tap gestures on display 602, avatar 606b is displayed with additional poses in a set of predefined poses (e.g., each time a tap gesture is detected, avatar 606b will cycle to a next pose in a set of predefined poses). In some embodiments, changing the pose of avatar 606b includes displaying an animation of the avatar transitioning between poses (e.g., transitioning gradually between a plurality of intermediate states while transitioning from the first pose to the second pose). In some embodiments, displaying the animation includes applying a physics model to at least one feature of avatar 606b (e.g., the hair of the avatar) to animate the at least one feature (e.g., the hair moves according to a model of how hair would react to movement of the avatar as the avatar transitions between poses).

In some embodiments, after displaying avatar 606b with a first pose (e.g., a winking pose, as shown in FIG. 6D) in avatar viewing user interface 644, avatar 606b is automatically (e.g., without user input) displayed with a second, different pose (e.g., a smiling pose) after a predetermined amount of time has elapsed (e.g., avatar 606b automatically changes from the winking pose to a smiling pose after five seconds). In some embodiments, avatar 606b will continue to cycle through additional poses in a set of predefined poses until a tap gesture 609 is detected at a location on display 602 corresponding to done affordance 610.

Figure 6E:
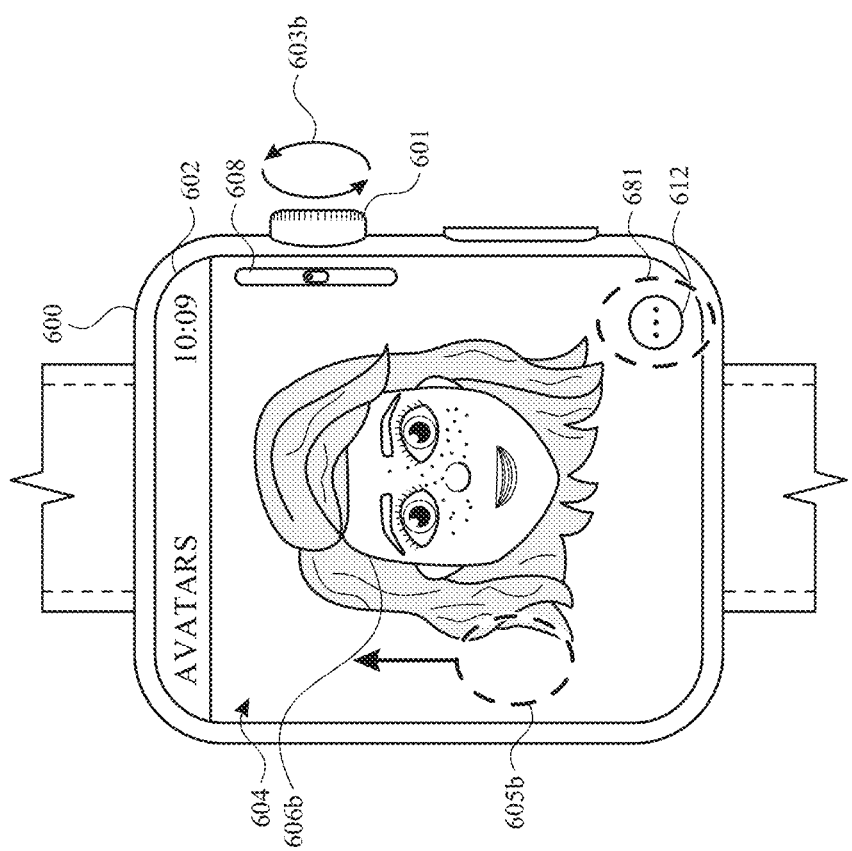
Figure 6H:
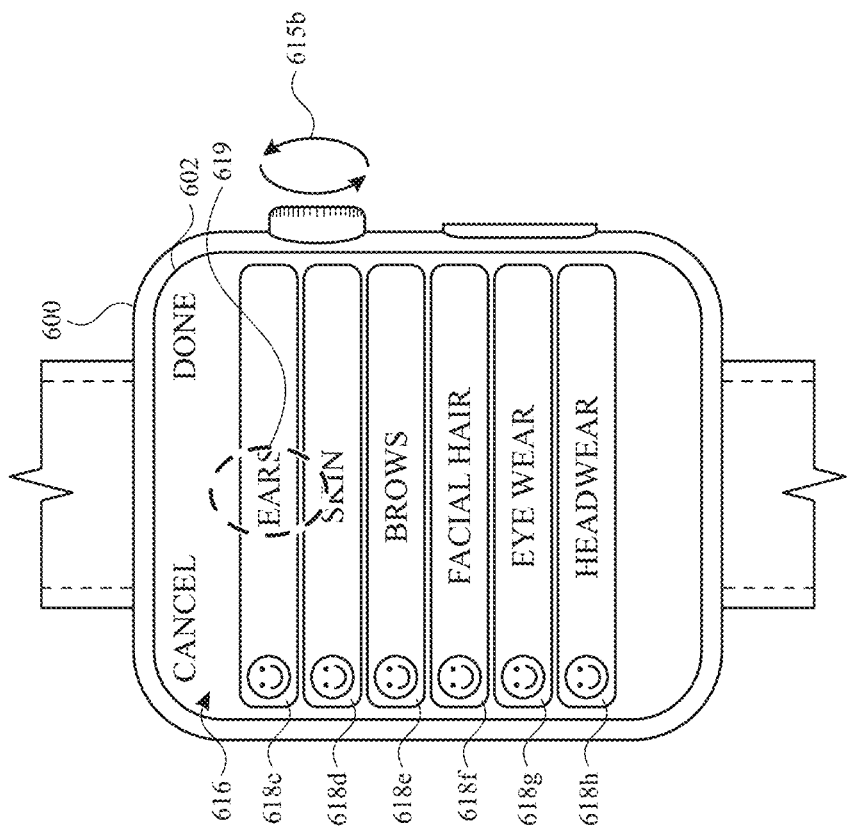

In some embodiments, in response to detecting tap gesture 609 on done affordance 610, avatar 606b is displayed with a default pose in avatar selection user interface 604, as shown in FIG. 6E. In some embodiments, in response to detecting tap gesture 609 on done affordance 610, the current pose of avatar 606b in avatar viewing user interface 644 is maintained in the avatar selection user interface 604.

As shown in FIG. 6E, scrollbar 608 includes an indicator in a center region of the scrollbar to indicate that the scrollable list of avatars can be scrolled up or down. In some embodiments, in response to detecting an input corresponding to a request to display a different avatar in the avatar selection user interface 604, avatar selection user interface 604 scrolls to display another avatar (e.g., as shown in FIG. 6A) or an affordance for adding an avatar to device 600 (e.g., as shown in FIG. 6F). In some embodiments, the input corresponding to the request to display a different avatar is a rotation 603b of rotatable input device 601 (e.g., a rotation of a watch crown). In some embodiments, the input corresponding to the request to display a different avatar is a swipe gesture 605b on display 602 (e.g., an upward swipe gesture).

In some embodiments, if avatar 606b is the last avatar in the scrollable list of avatars (e.g., at the bottom of the list of avatars, or the only avatar in the list of avatars) and an input is detected requesting that an avatar below avatar 606b be displayed (e.g., an upward swipe gesture or a clockwise rotation of the rotatable input device), affordance 614 for adding a new avatar to avatar selection user interface 604 is displayed, as shown in FIG. 6F. In some embodiments, if avatar 606b is the first avatar in the scrollable list of avatars (e.g., at the top of the list of avatars, or the only avatar in the list of avatars) and an input is detected requesting that an avatar above avatar 606b be displayed (e.g., an downward swipe gesture or a counter-clockwise rotation of the rotatable input device), affordance 614 for adding a new avatar to avatar selection user interface 604 is displayed, as shown in FIG. 6F.

FIG. 6F illustrates device 600 displaying, on display 602, affordance 614 for adding a new avatar to avatar selection user interface 604. In some embodiments, when affordance 614 for adding a new avatar to avatar selection user interface 604 is displayed, scrollbar 608 includes an indicator at the bottom of the scrollbar 608 (e.g., affordance 614 is at the bottom of a scrollable list of avatars). In some embodiments, when affordance 614 for adding a new avatar to avatar selection user interface 604 is displayed, scrollbar 608 includes an indicator at the top of the scrollbar 608 (e.g., affordance 614 is at the top of a scrollable list of avatars).

Figure 6G:
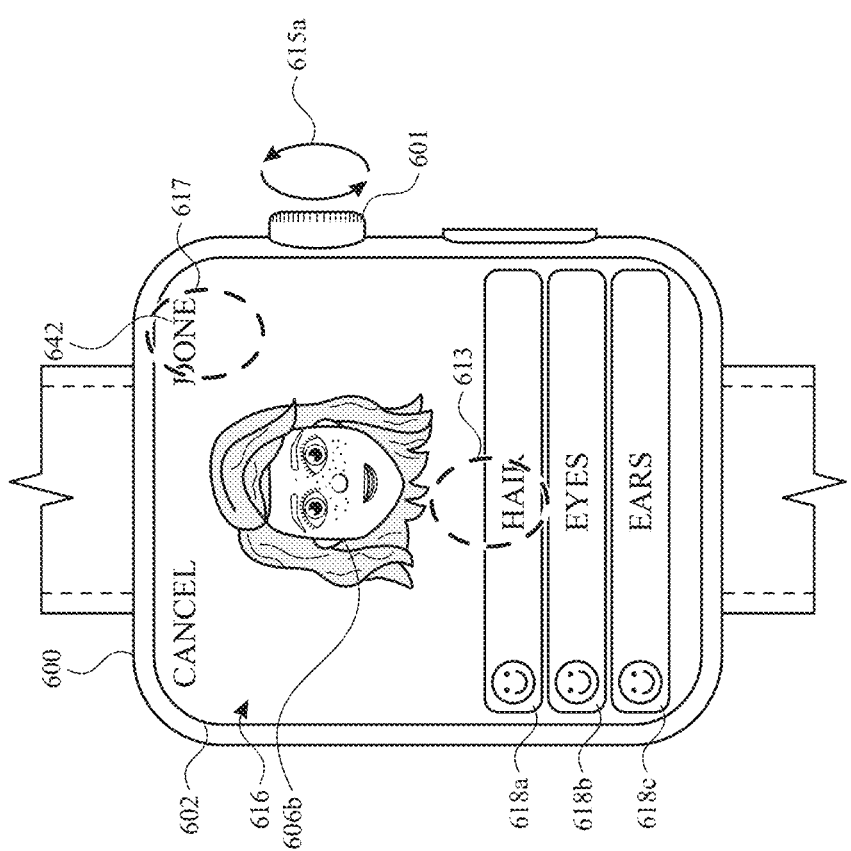

In response to detecting tap gesture 611 on display 602 at a location corresponding to affordance 614 for adding a new avatar to avatar selection user interface 604, avatar editing user interface 616 is displayed (e.g., as shown in FIG. 6G). When avatar editing user interface 616 is displayed in response to tap gesture 611, avatar editing user interface 616 is initially populated with a default avatar, instead of a previously created avatar (e.g., instead of avatar 606a or 606b). The default avatar can then be customized, if desired, using the avatar editing user interface 616, as further described below with respect to FIGS. 6G-6AG. After (optionally) customizing the new avatar in avatar editing user interface 616, the new avatar can be added to the avatar selection user interface 604.

Returning to FIG. 6E, avatar selection user interface 604 further includes edit affordance 612. In response to detecting tap gesture 681 on display 602 at a location corresponding to edit affordance 612, avatar editing user interface 616 is displayed, as shown in FIG. 6G. In contrast to tap gesture 611 on affordance 614 for adding a new avatar to avatar selection user interface 604 (as shown in FIG. 6F), tap gesture 681 on edit affordance 612 results in avatar editing user interface 616 being populated with avatar 606b as currently displayed in avatar selection user interface 604 (e.g., the features of avatar 606b in the avatar editing user interface 616 correspond to the current features of 606b as displayed in avatar selection user interface 604).

FIG. 6G illustrates device 600 displaying, on display 602, avatar editing user interface 616. Avatar editing user interface 616 is displayed in response to detecting tap gesture 681 on edit affordance 612 (as shown in FIG. 6E) or tap gesture 611 on affordance 614 for adding a new avatar to avatar selection user interface 604 (as shown in FIG. 6F). In some embodiments, displaying avatar editing user interface 616 includes displaying avatar 606b (e.g., in response to selecting avatar 606b for editing by selecting edit affordance 612, as shown in FIG. 6E). In some embodiments, displaying avatar editing user interface 616 includes displaying a default avatar (e.g., in response to selecting affordance 614 for adding a new avatar to avatar selection user interface 604, as shown in FIG. 6F).

As shown in FIG. 6G, avatar 606b is displayed at a first size above a list of avatar feature categories (e.g., primary avatar feature categories). In some embodiments, the primary avatar feature categories include a hair category 618a, an eyes category 618b, and an ears category 618c. In some embodiments, the list of primary avatar feature categories is a scrollable list. In response to detecting rotation 615a of rotatable input device 601 (e.g., rotation of a watch crown), additional primary avatar feature categories are displayed, as shown in FIG. 6H. In some embodiments, additional primary avatar feature categories include a skin category 618d, a brows category 618e, a facial hair category 618f, an eye wear category 618g, and a headwear category 618h. In some embodiments, the primary avatar feature categories are not limited to the categories shown in FIGS. 6G and 6H. Additional, fewer, or different primary avatar feature categories may be used in avatar editing user interface 616.

As shown in FIG. 6H, in some embodiments, in response to detecting rotation 615a of rotatable input device 601 (as shown in FIG. 6G), avatar 606b ceases to be displayed. In some embodiments, avatar 606b scrolls off a top edge of avatar editing user interface 616 as additional primary avatar feature categories scroll up from a bottom edge of avatar editing user interface 616 in response to detecting rotation 615a of rotatable input device 601 (e.g., avatar 606b and the primary avatar feature categories scroll together). In some embodiments, avatar 606b continues to be displayed above the additional primary avatar feature categories as the additional primary avatar feature categories scroll up from a bottom edge of avatar editing user interface 616 in response to detecting rotation 615a of rotatable input device 601 (e.g., the primary avatar feature categories scroll independently from the avatar 606b).

Figure 6J:
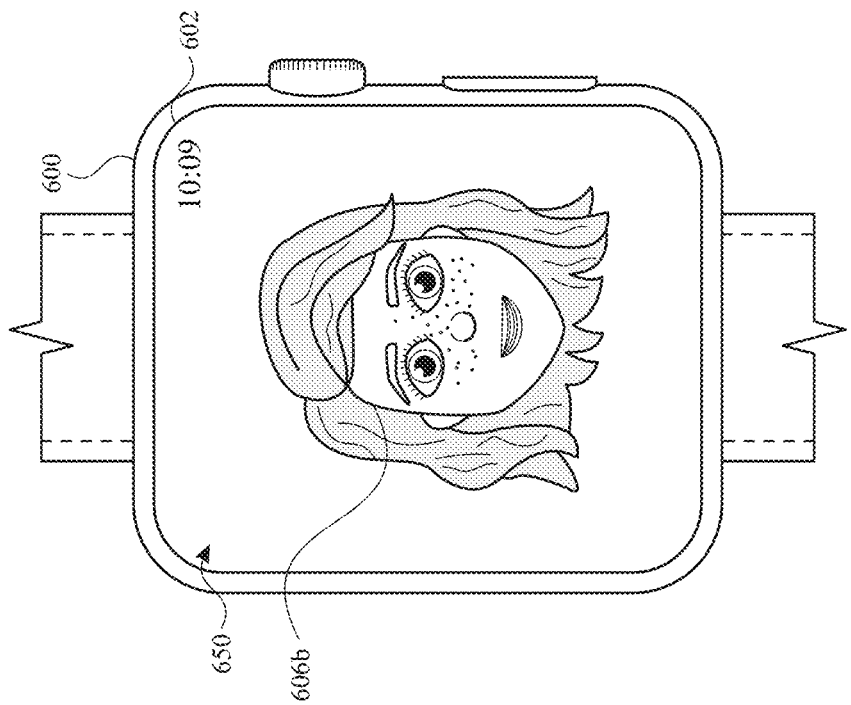
Figure 6I:
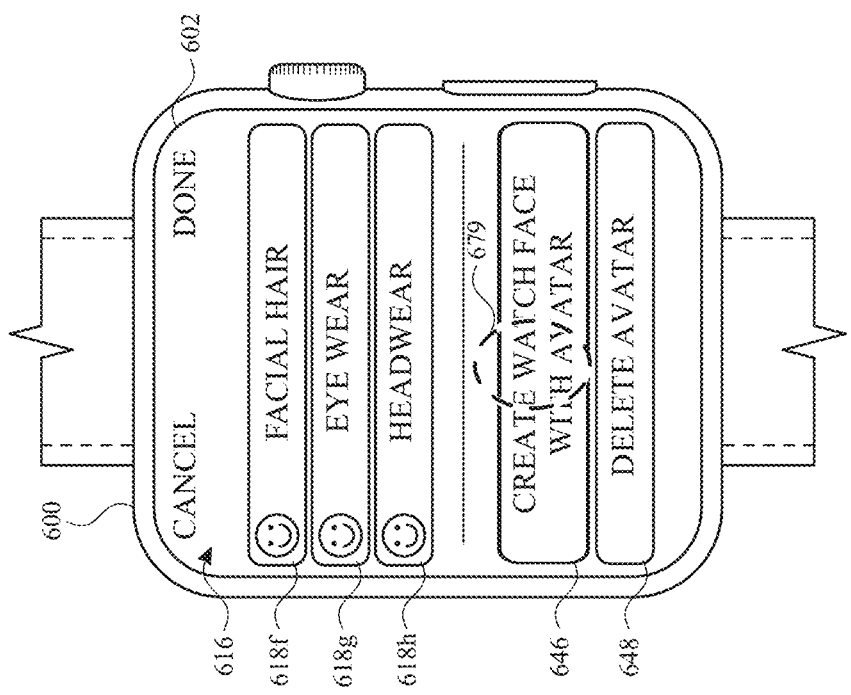

As shown in FIG. 6I, in some embodiments, in response to detecting further rotation 615b of rotatable input device 601 (as shown in FIG. 6H), additional options are displayed. The additional options include an option 646 to create a watch face that includes avatar 606b and an option 648 to delete avatar 606b from the avatar selection user interface 604. In response to detecting a tap gesture 679 on display 602 corresponding to a location of option 646 to create a watch face, avatar 606b is added to watch face 650, as shown in FIG. 6J.

Returning to FIG. 6G, in response detecting a tap gesture at a location corresponding to a primary avatar feature category, avatar editing user interface 616 changes to an editing mode for a characteristic of the selected primary avatar feature. In the editing mode, different options for a characteristic of the selected primary avatar feature can be selected in avatar editing user interface 616. For example, in response to detecting tap gesture 613 on display 602 at a location corresponding to hair category 618a, options for a hairstyle characteristic of avatar 606b are displayed, and can be selected, in avatar editing user interface 616, as shown in FIG. 6K.

Figure 6K:
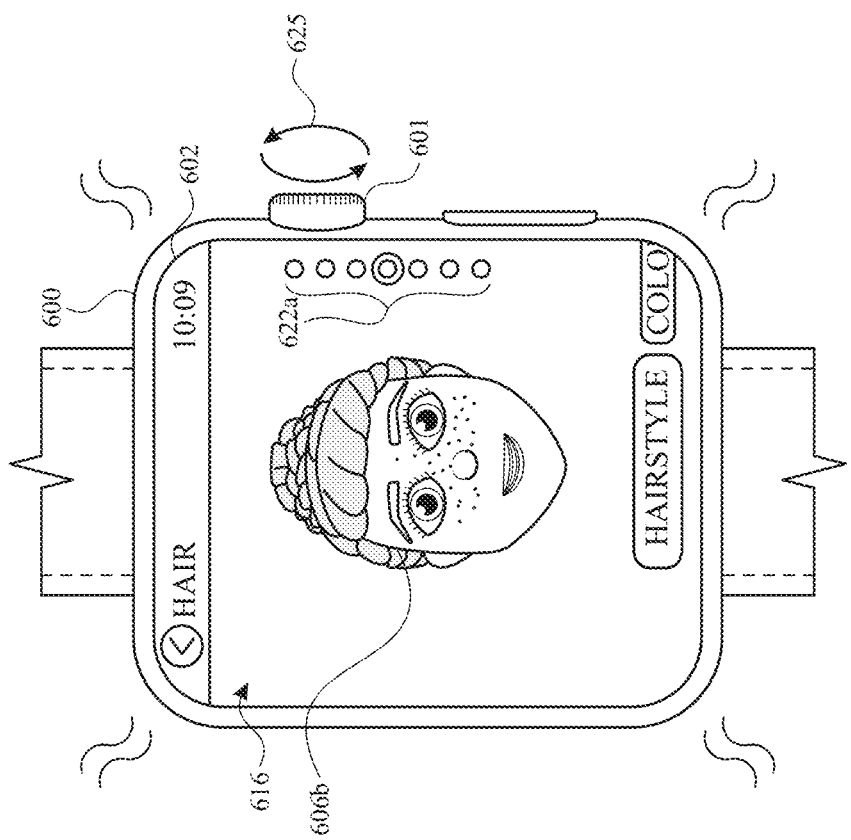

FIG. 6K illustrates device 600 displaying, on display 602, avatar editing user interface 616 with selectable options for a hairstyle characteristic of avatar 606b. The hairstyle characteristic may be referred to as a hairstyle category or a hairstyle subcategory. The characteristic of avatar 606b currently selected for editing is indicated by a platter in the lower center of display 602 (e.g., platter 620a). In some embodiments, the background of platters 620a-620b (e.g., the boxes under the text of the platters) is a same color as the background of avatar editing user interface 616 and/or transparent such that the background of platter 620a is not visible when the platter 620a is overlaying the background of avatar editing user interface 616.

In some embodiments, the selectable options for the hairstyle characteristic of avatar 606b are displayed in response to detecting tap gesture 613 on display 602 at a location corresponding to hair category 618a, as shown in FIG. 6G. In addition, in response to detecting tap gesture 613 on display 602 at the location corresponding to hair category 618a, the list of primary avatar feature categories ceases to be displayed and avatar 606b is displayed at a second size (e.g., a zoomed in view) larger than the first size of avatar 606b as displayed in FIG. 6G. In some embodiments, displaying avatar 606b at the second size includes displaying an animation of avatar 606b transitioning from the first size as shown in FIG. 6G to the second size as shown in FIG. 6K.

As shown in FIG. 6K, avatar editing user interface 616 includes a first type of characteristic selection element 622a. Characteristic selection element 622a indicates a number of options that can be selected for the hairstyle characteristic (e.g., there are seven different hairstyles available as indicated by the seven indicators in the characteristic selection element 622a). For characteristics of avatar 606b having different selectable styles or shapes, indicators in the first type of characteristic selection element 622a have a uniform size and color. The indicator in the characteristic selection element 622a corresponding to the currently displayed characteristic (e.g., the third option) is highlighted (e.g., with a circle, a different color, or a larger indicator than unselected options) to indicate that the corresponding characteristic is currently selected and displayed on avatar 606b.

Figure 6L:
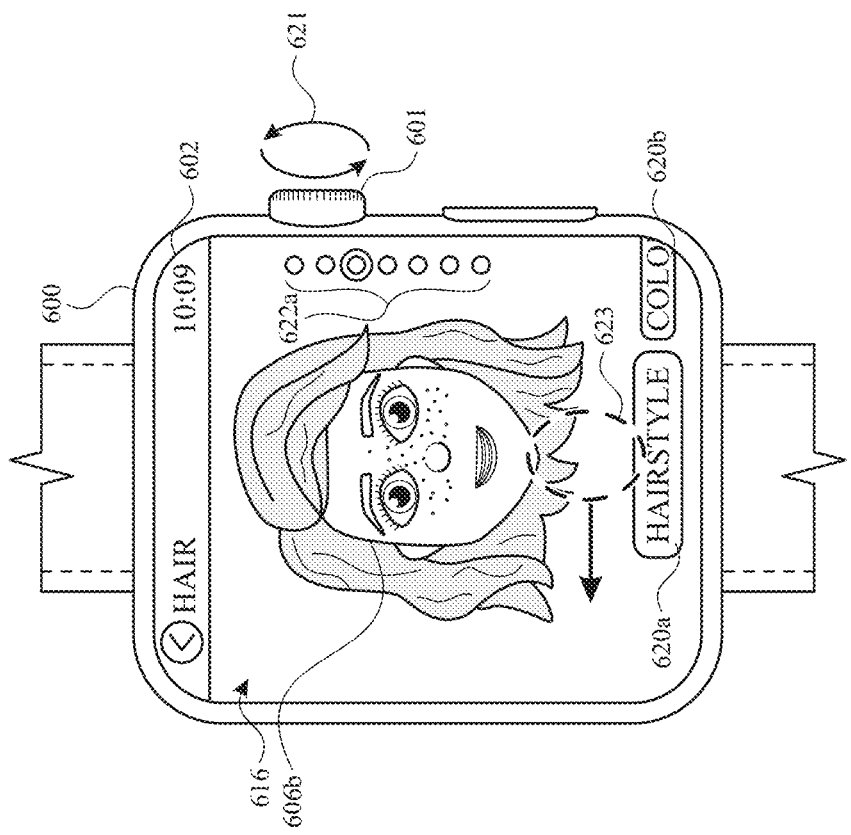
Figure 6N:
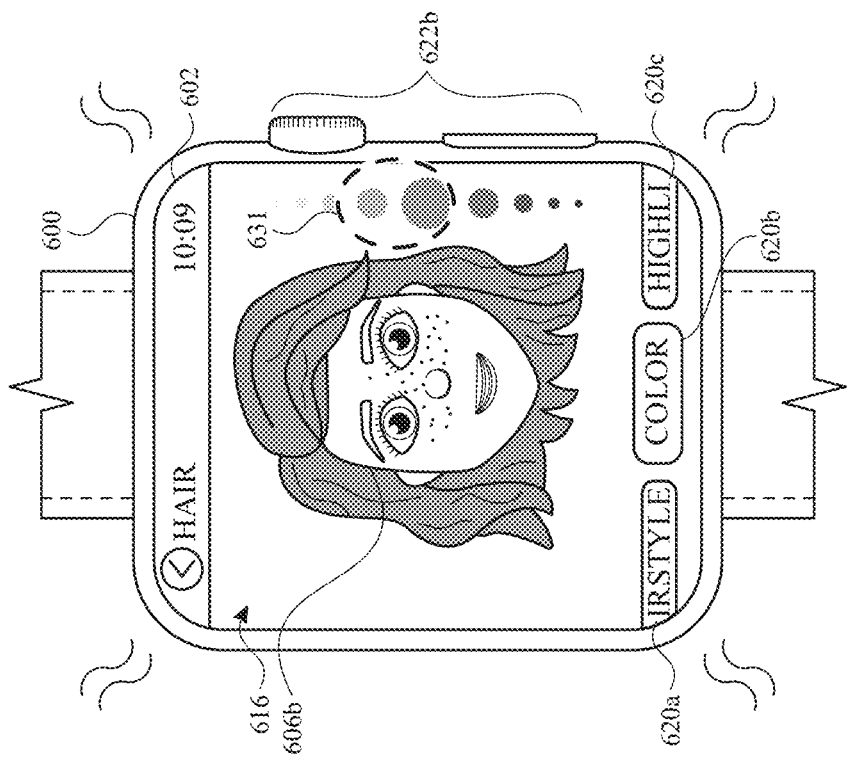

In response to detecting rotation 621 of rotatable input device 601, a different option for the hairstyle characteristic is selected. In some embodiments, when an option for a characteristic is selected, the corresponding avatar feature is automatically displayed with the selected characteristic option. For example, as shown in FIG. 6L, in response to detecting rotation 621 of rotatable input device 601 (as shown in FIG. 6K), the hairstyle of avatar 606b is changed to a different hairstyle corresponding to the selected characteristic option. The selected characteristic option is indicated by characteristic selection element 622a (e.g., the indicator in characteristic selection element 622a corresponding to the currently displayed hairstyle option is highlighted). In some embodiments, in response to detecting rotation 621 of rotatable input device 601 (as shown in FIG. 6K), a tactile output (e.g., a vibration) is generated by one or more tactile output generators to indicate that a different option has been selected for a characteristic of avatar 606b.

In response to detecting an additional rotation 625 (as shown in FIG. 6L) of the rotatable input device 601 in an opposite direction of rotation 621 (as shown in FIG. 6K), the previously selected option in characteristic selection element 622a is selected and the hairstyle of avatar 606b is changed back to the hairstyle as shown in FIG. 6K.

Returning to FIG. 6K, in response to detecting swipe gesture 623 on display 602, an editing mode for a second characteristic is displayed in avatar editing user interface 616. In some embodiments, the second characteristic is a characteristic of the previously selected primary avatar feature category (e.g., a second characteristic of the avatar's hair, such as hair color). In some embodiments, the second characteristic is a characteristic for a different primary avatar feature (e.g., corresponding to the next primary avatar feature category in the list of primary avatar feature categories described in reference to FIGS. 6G-6I).

Figure 6M:
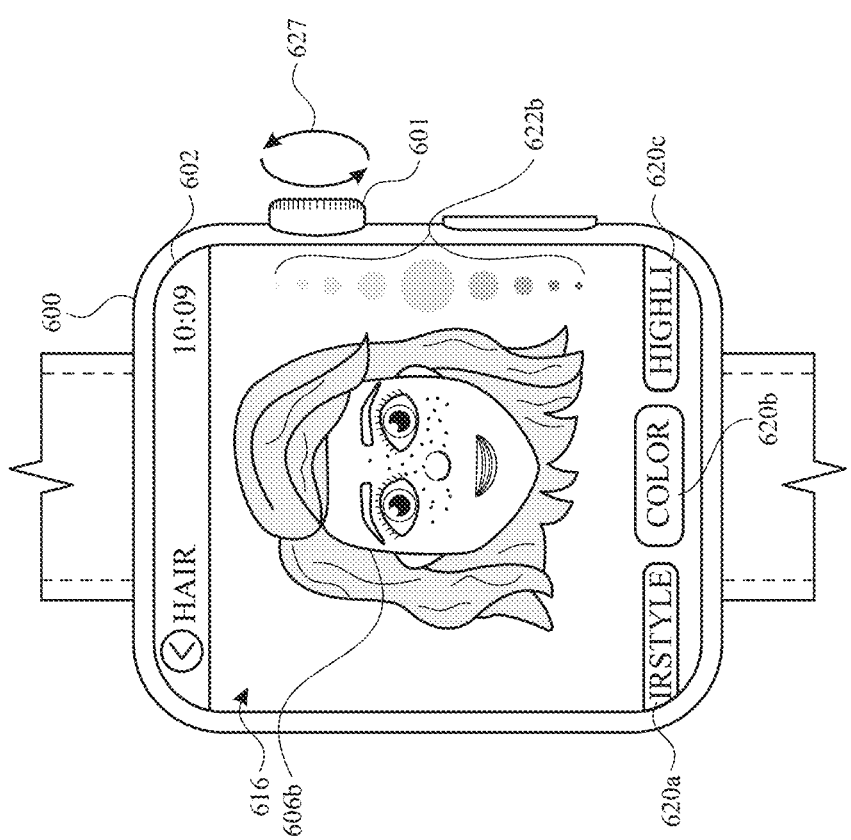
Figure 6P:
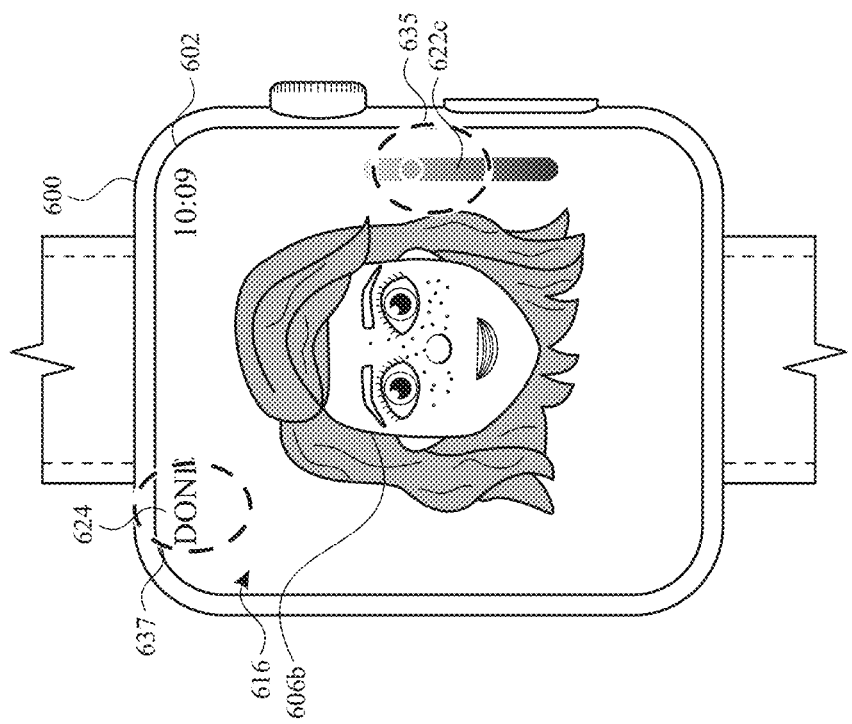

FIG. 6M illustrates device 600 displaying, on display 602, avatar editing user interface 616 with selectable options for a hair color characteristic of avatar 606b. The hair color characteristic may also be referred to as a hair color category or a hair color subcategory. In some embodiments, the selectable options for hair color characteristic are displayed in response to detecting swipe gesture 623 (as shown in FIG. 6K). In some embodiments, a different pose of avatar 606b is displayed in avatar editing user interface 616 in response to detecting swipe gesture 623 on display 602 (as shown in FIG. 6K). In some embodiments, avatar 606b is displayed in avatar editing user interface 616 in FIG. 6M at the same size and/or location as in FIG. 6K in response to detecting swipe gesture 623 on display 602 (as shown in FIG. 6K) (e.g., avatar 606b is not zoomed or shifted when a category, subcategory, or characteristic is selected or when the category, subcategory, or characteristic is changed). In addition, in response to detecting swipe gesture 623 (as shown in FIG. 6K), platter 620a corresponding to the hairstyle characteristic is shifted to the left on display 602, and platter 620b corresponding to the hair color characteristic is shifted to the center on display 602. The platter in the center of display 602 (e.g., platter 620b as shown in FIG. 6M) indicates the characteristic of avatar 606b currently selected for editing (e.g., the hair color characteristic). Platters to the left and right of center (e.g., platters 620a and 620c as shown in FIG. 6M) indicate characteristics that can be selected for editing in response to detecting a swipe gesture to the left or right on display 602.

As shown in FIG. 6M, a second type of characteristic selection element 622b is displayed (e.g., replaces the first type of characteristic selection element 622a shown in FIG. 6K). The second type of characteristic selection element 622b indicates a plurality of colors that can be selected for the hair of avatar 606b. For characteristics of avatar 606b having different selectable colors, indicators in the second type of characteristic selection element 622b have different sizes and colors. This is in contrast to the uniform indicators in the first type of characteristic selection element 622a for characteristics of avatar 606b having different styles or shapes (e.g., as shown FIGS. 6K-6L). The indicator in the characteristic selection element 622b corresponding to the currently displayed characteristic is displayed with a size larger than other indicators in the characteristic selection element 622b to indicate the corresponding characteristic is currently selected and displayed on avatar 606b.

In some embodiments, replacing the first type of characteristic selection element 622a with the second type of characteristic selection element 622b includes displaying an animation of the indicators in the characteristic selection elements transitioning from indicators with uniform size and color to indicators with different sizes and colors (e.g., the indicators in the first type of characteristic selection element 622a morph into the indicators in the second type of characteristic selection element 622b).

In response to detecting rotation 627 of rotatable input device 601, a different option for the hair color characteristic is selected. In some embodiments, when an option for a characteristic is selected, the corresponding avatar feature is automatically (e.g., without additional user input) displayed with the selected characteristic option. For example, as shown in FIG. 6N, in response to detecting rotation 627 of rotatable input device 601 (as shown in FIG. 6M), the hair color of avatar 606b is changed to a different hair color corresponding to the selected characteristic option. The selected characteristic option is indicated by characteristic selection element 622b (e.g., the indicator in characteristic selection element 622b corresponding to the currently displayed hair color option is displayed with a larger size than other indicators in characteristic selection element 622b). In some embodiments, the indicators in characteristic selection element 622b scroll and change size in response to detecting rotation 627 of rotatable input device 601 (e.g., the color indicators shift up or down, and the sizes of the color indicators change so that the color in the center of the characteristic selection element 622b has a consistent size). In some embodiments, in response to detecting rotation 627 of rotatable input device 601 (as shown in FIG. 6M), a tactile output (e.g., a vibration) is generated by one or more tactile output generators to indicate that a different option has been selected for a characteristic of avatar 606b.

Figure 6O:
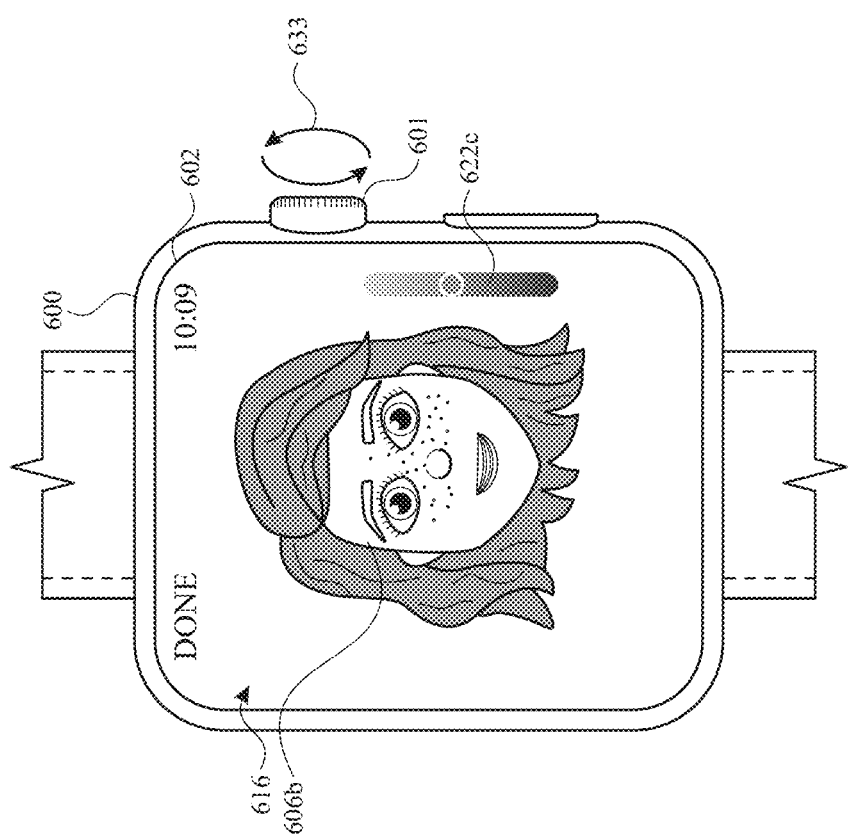
Figure 6R:
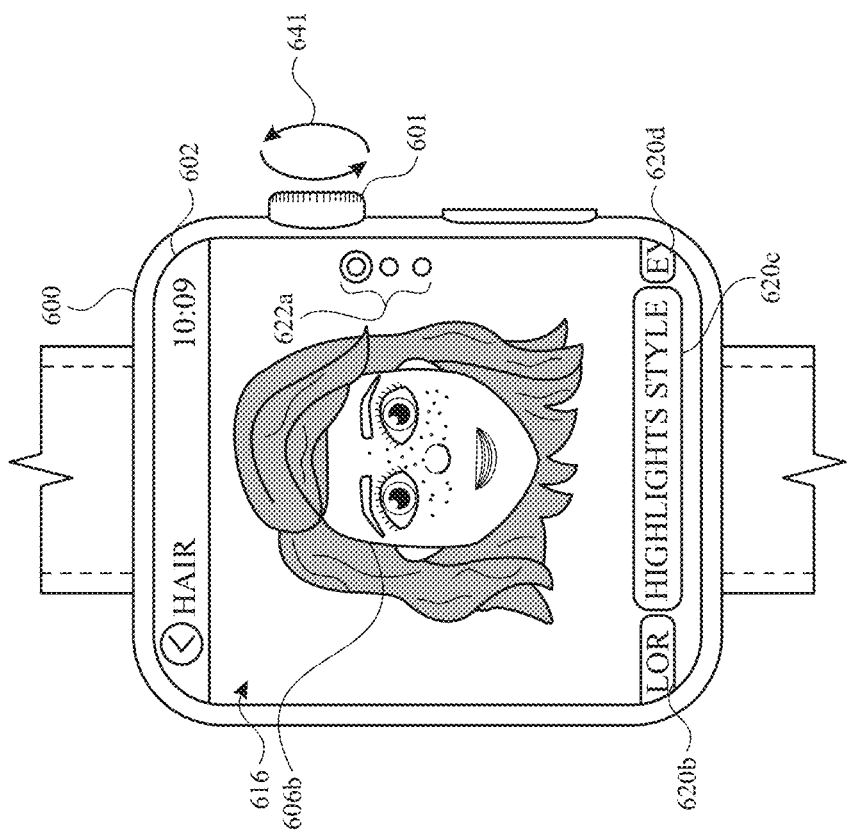

In response to detecting input 631 on display 602 (e.g., a tap gesture or a long press gesture) at a location corresponding to the second type of characteristic selection element 622b (as shown in FIG. 6N), a third type of characteristic selection element 622c is displayed, as shown in FIG. 6O. The third type of characteristic selection element 622c is a fine adjustment slider for making relatively minor changes to a selected color characteristic. The third type of characteristic selection element 622c includes a continuous gradient of colors instead of discrete color options used for second type of characteristic selection element. In some embodiments, the range of colors in the continuous gradient of colors is based on a selected color option (e.g., different ranges of colors are displayed based on which color option is selected).

In some embodiments, the second type of characteristic selection element 622b (as shown in FIG. 6N) is replaced with the third type of characteristic selection element 622c, as shown in FIG. 6O. In some embodiments, replacing the second type of characteristic selection element 622b with the third type of characteristic selection element 622c includes displaying an animation of a selected color in the second type of characteristic selection element 622b (e.g., the largest indicator) transforming into the fine adjustment slider in the third type of characteristic selection element 622c, while other indicators in the second type of characteristic selection element 622b (e.g., non-selected colors) cease to be displayed.

In response to detecting rotation 633 of rotatable input device 601, a different option for the hair color characteristic is selected. The selected option is a color in the continuous gradient of colors in the third type of characteristic selection element 622c. This allows the color selected in the second type of characteristic selection element 622b (as shown in FIG. 6N) to be changed in smaller increments than provided by the second type of characteristic selection element 622b. In some embodiments, when a color in the third type of characteristic selection element 622c is selected, the corresponding avatar feature is automatically (e.g., without additional user input) displayed with the selected color. For example, as shown in FIG. 6P, in response to detecting rotation 633 of rotatable input device 601 (as shown in FIG. 6O), the hair color of avatar 606b is changed to a different hair color in the continuous gradient of colors included in the third type of characteristic selection element 622c. In some embodiments, the third type of characteristic selection element 622c includes an indicator (e.g., a circle) indicating the currently selected color in the continuous gradient of colors. In some embodiments, no tactile output (e.g., no vibration) is generated in response to detecting rotation 633 of rotatable input device 601 (as shown in FIG. 6M). This distinguishes the selection of a color in the third type of characteristic selection element 622c from the selection of a color in the second type of characteristic selection element 622b.

Figure 6Q:
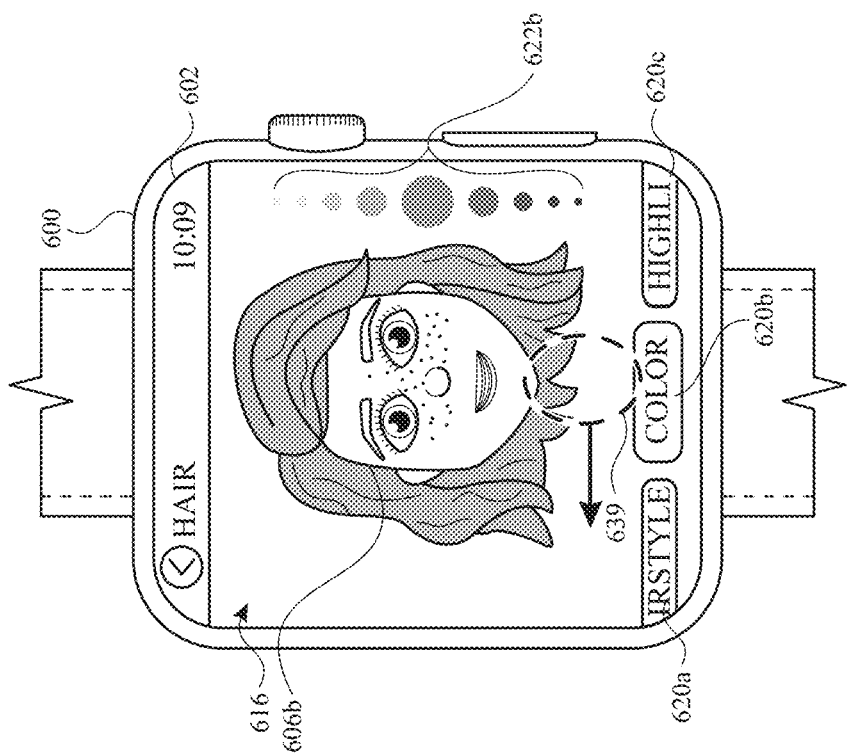
Figure 6V:
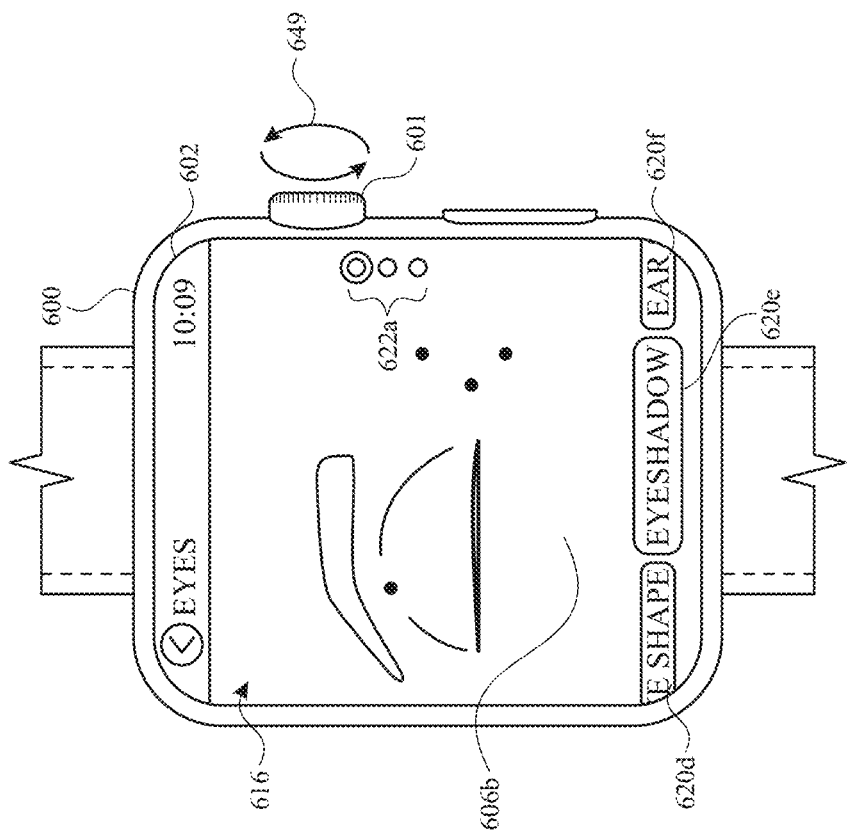

In some embodiments, in response to detecting input 635 on display 602 (e.g., a tap gesture or a long press gesture) at a location corresponding to the third type of characteristic selection element 622c (as shown in FIG. 6P) or in response to detecting tap gesture 637 on display 602 at a location corresponding to a done affordance 624 (as shown in FIG. 6P), avatar editing user interface 616 is (e.g., again) displayed with the second type of characteristic selection element 622b, as shown in FIG. 6Q. In some embodiments, the third type of characteristic selection element 622c (as shown in FIG. 6P) is replaced with the second type of characteristic selection element 622b, as shown in FIG. 6Q. In some embodiments, replacing the third type of characteristic selection element 622c with the second type of characteristic selection element 622b includes displaying an animation of a the third type of characteristic selection element 622c transforming into the second type of characteristic selection element 622b (e.g., the fine adjustment slider compresses into the color encircled in the fine adjustment slider and then the encircled color is transformed into the largest color indicator in the second type of characteristic selection element 622b as the other color indicators in the second type of characteristic selection element 622b fade into view).

In addition, as shown in FIG. 6Q, the color selected using the third type of characteristic selection element (e.g., in response to rotation 633 of rotatable input device 601 as shown in FIG. 6P) is maintained as the selected characteristic option for avatar 606b after returning to avatar editing user interface 616 with the second type of characteristic selection element 622b. In some embodiments, the third type of characteristic selection element 622c is a fine adjustment slider for making minor changes to a selected color characteristic. In some embodiments, the third type of characteristic selection element 622c includes a continuous gradient of colors instead of, e.g., discrete color options used for second type of characteristic selection element 622b. In some embodiments, the range of colors in the continuous gradient of colors is based on a selected color option (e.g., different ranges of colors are displayed based on which color option is selected).

As shown in FIG. 6Q, a swipe gesture 639 is detected on display 602. In response to detecting swipe gesture 639, an editing mode for a third characteristic is displayed in avatar editing user interface 616 (e.g., as shown in FIG. 6R). In some embodiments, the third characteristic is a characteristic of the previously selected primary avatar feature category (e.g., a third characteristic of the avatar's hair, such as hair highlights). In some embodiments, the third characteristic is a characteristic for a different primary avatar feature (e.g., corresponding to the next primary avatar feature category in the list of primary avatar feature categories described in reference to FIGS. 6G-6I).

FIG. 6R illustrates device 600 displaying, on display 602, avatar editing user interface 616 with selectable options for a hair highlights style characteristic of avatar 606b. The hair highlights style characteristic may also be referred to as a hair highlights style category or a hair highlights style subcategory. The selectable options for hair highlights style characteristic are displayed in response to detecting swipe gesture 639 (as shown in FIG. 6Q). In some embodiments, a different pose of avatar 606b is displayed in avatar editing user interface 616 in response to detecting swipe gesture 639 (as shown in FIG. 6Q). In addition, in response to detecting swipe gesture 639 (as shown in FIG. 6Q), platter 620b corresponding to the hair color characteristic is shifted to the left on display 602, and platter 620c corresponding to the hair highlights style characteristic is shifted to the center on display 602. The platter in the lower center of display 602 (e.g., platter 620c as shown in FIG. 6R) indicates the characteristic of avatar 606b currently selected for editing (e.g., the hair highlights style characteristic). Platters to the left and right of center (e.g., platters 620b and 620d as shown in FIG. 6R) indicate characteristics that can selected for editing in response to detecting a swipe gesture to the right and left on display 602, respectively.

As shown in FIG. 6R, in response to detecting swipe gesture 639 (as shown in FIG. 6Q), the first type of characteristic selection element 622a is displayed (e.g., replaces the second type of characteristic selection element 622b (as shown in FIG. 6Q)). In some embodiments, replacing the first type of characteristic selection element 622a with the second type of characteristic selection element 622b includes displaying an animation of the indicators in the characteristic selection elements transitioning from indicators with uniform size and color to indicators with different sizes and colors (e.g., the indicators in the first type of characteristic selection element 622a morph into the indicators in the second type of characteristic selection element 622b).

In response to detecting rotation 641 of rotatable input device 601, a different option for the hair highlights style characteristic is selected. In some embodiments, when an option for a characteristic is selected, a name of the selected option is temporarily displayed. For example, as shown in FIG. 6S, in response to detecting rotation 641 of rotatable input device 601 (as shown in FIG. 6R), a name 626 of the selected hair highlights style is displayed (e.g., "Modern") for a predetermined amount of time (e.g., a non-zero amount of time). In some embodiments, while displaying the name 626 of a selected characteristic option, other elements of avatar editing user interface 616 are dimmed or blurred. In some embodiments, in response to detecting rotation 641 of rotatable input device 601 (as shown in FIG. 6R), a tactile output (e.g., a vibration) is generated by one or more tactile output generators to indicate that a different option has been selected for a characteristic of avatar 606*b*.

As shown in FIG. 6T, after the name 626 of the selected hair highlights style is displayed (e.g., for the predetermined amount of time), the hair highlights style characteristic of avatar 606*b* is changed to the highlights style corresponding to the selected characteristic option.

In response to detecting swipe gesture 643 on display 602, an editing mode for a third characteristic is displayed in avatar editing user interface 616. In some embodiments, the third characteristic is a characteristic of the previously selected primary avatar feature category. In some embodiments, the third characteristic is a characteristic for a different primary avatar feature (e.g., corresponding to the next primary avatar feature category (e.g., eyes) in the list of primary avatar feature categories described in reference to FIGS. 6G-6I).

Figure 6U:
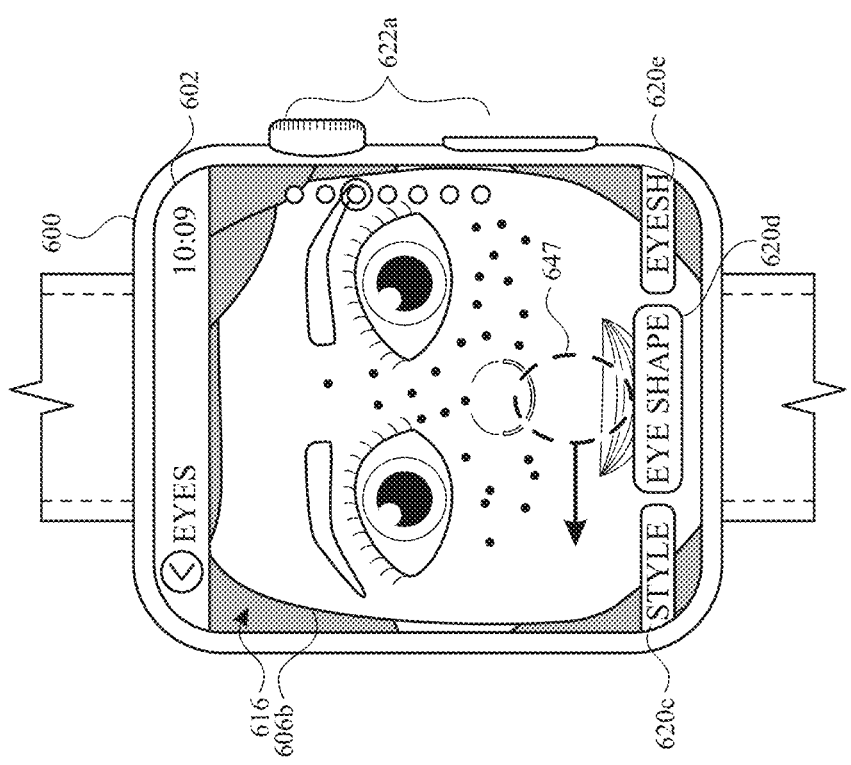

FIG. 6U illustrates device 600 displaying, on display 602, avatar editing user interface 616 with selectable options for an eye shape characteristic of avatar 606*b*. The eye shape characteristic may also be referred to as an eye shape category or an eye shape subcategory. In some embodiments, the selectable options for the eye shape characteristic are displayed in response to detecting swipe gesture 643 (as shown in FIG. 6T). In some embodiments, a different pose of avatar 606*b* is displayed in avatar editing user interface 616 in response to detecting swipe gesture 643 (as shown in FIG. 6T). In addition, in response to detecting swipe gesture 643 (as shown in FIG. 6T), platter 620*c* corresponding to the hair highlights style characteristic is shifted to the left on display 602, and platter 620*d* corresponding to the eye shape characteristic is shifted to the center on display 602. In some embodiments, the background of platters 620*c*-620*e* (e.g., the boxes under the text of the platters) is a same color as the background of avatar editing user interface 616 and/or transparent such that the background of platters 620*c*-620*e* are not visible when the platters 620*c*-620*e* are overlaying the background of avatar editing user interface 616. In some embodiments, such as shown in FIG. 6U, the background of platters 620*c*-620*e* are visible due to the platters 620*c*-620*e* at least partially overlaying features of avatar 606*b* (e.g., and not overlaying the background of avatar editing user interface 616).

As shown in FIG. 6U, when avatar editing user interface 616 with selectable options for an eye shape characteristic of avatar 606*b* is displayed, avatar 606*b* is displayed at a third size (e.g., a further zoomed in view) larger than the second size of avatar 606*b* as displayed in FIG. 6T. In some embodiments, displaying avatar 606*b* at the third size includes displaying an animation of avatar 606*b* transitioning from the second size as shown in FIG. 6T to the third size as shown in FIG. 6U. In some embodiments, avatar 606*b* is displayed at the third size to emphasize the characteristic of avatar 606*b* that has been selected for editing (e.g., the eyes of avatar are displayed at a larger size to emphasize that a characteristic of the eyes has been selected for editing).

FIG. 6V illustrates device 600 displaying, on display 602, avatar editing user interface 616 with selectable options for an eyeshadow characteristic of avatar 606*b*. The eyeshadow characteristic may also be referred to as a eyeshadow category or a eyeshadow subcategory. In some embodiments, the selectable options for the eyeshadow characteristic are displayed in response to detecting swipe gesture 647 on display 602 (as shown in FIG. 6U). As shown in FIG. 6V, when avatar editing user interface 616 with selectable options for the eyeshadow characteristic of avatar 606*b* is displayed, avatar 606*b* is displayed at a fourth size (e.g., a further zoomed in view) larger than the third size of avatar 606*b* as displayed in FIG. 6U. In addition, avatar 606*b* is shifted (e.g., translated) such that an eye of avatar 606*b* is emphasized (e.g., displayed more towards the center of display 602) relative to other features of avatar 606*b*. In some embodiments, displaying avatar 606*b* at the fourth size and shifting avatar 606*b* to emphasize an eye includes displaying an animation of avatar 606*b* transitioning from the view as shown in FIG. 6U to the view as shown in FIG. 6V.

In response to detecting rotation 649 of rotatable input device 601, a different option for the eyeshadow characteristic is selected. In some embodiments, when an option for a characteristic is selected, the corresponding avatar feature is automatically displayed with the selected characteristic option. For example, as shown in FIG. 6W, in response to detecting rotation 649 of rotatable input device 601 (as shown in FIG. 6V), a first style of eyeshadow is applied to avatar 606*b*. In some embodiments, in response to detecting rotation 649 of rotatable input device 601 (as shown in FIG. 6V), a tactile output (e.g., a vibration) is generated by one or more tactile output generators to indicate that a different option has been selected for a characteristic of avatar 606*b*.

Figure 6X:
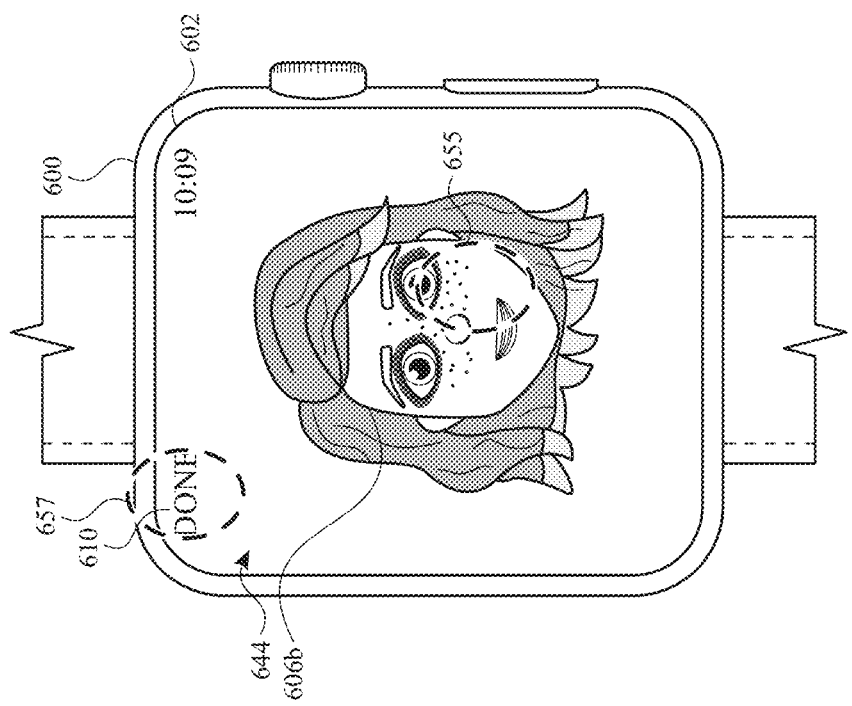
Figure 6W:
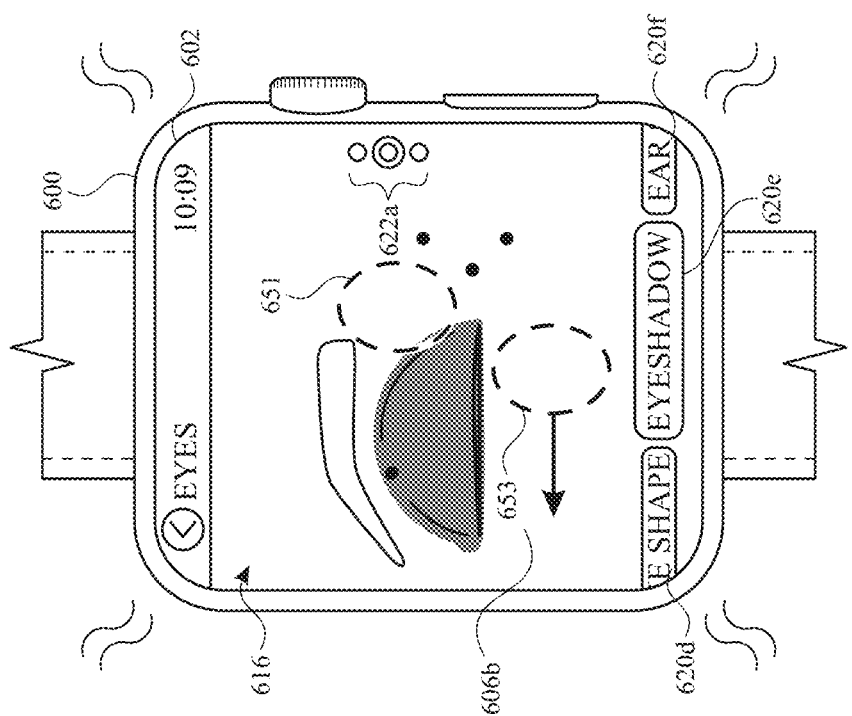
Figure 6Z:
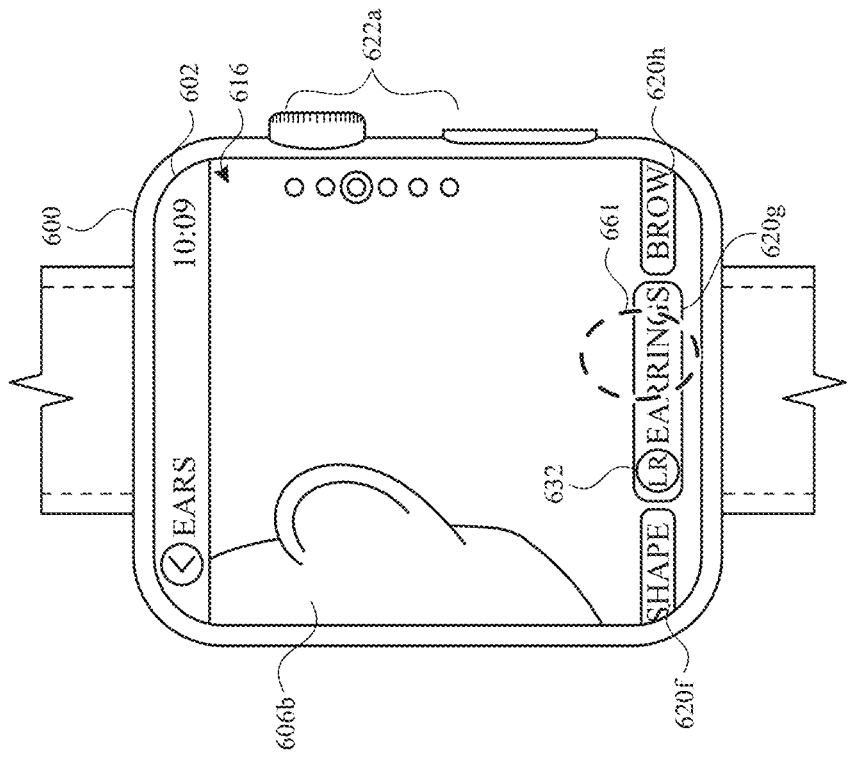

FIG. 6X illustrates device 600 displaying, on display 602, a zoomed out view (e.g., a full face view) of avatar 606*b* in avatar viewing user interface 644. In some embodiments, avatar 606*b* is displayed in the zoomed out view in response to detecting a tap gesture 651 on display 602 (e.g., at a location corresponding to avatar 606*b*), as shown FIG. 6W. In some embodiments, the zoomed out view allows different features of avatar 606*b* which have been edited to be viewed together.

In some embodiments, avatar 606*b* is displayed with a different pose in response to detecting tap gesture 651 on display 602 (e.g., at a location corresponding to avatar 606*b*), as shown FIG. 6W. In some embodiments, the different poses of avatar 606*b* include different facial expressions (e.g., smiling, frowning, winking, laughing) and/or different head positions (e.g., turning the head of avatar 606*b* to look up, down, left, or right). In some embodiments, after displaying the zoomed out view of avatar 606*b* as shown in FIG. 6X, avatar 606*b* is displayed with a different pose (e.g., a smiling pose) in response to detecting tap gesture 655 on display 602 (e.g., at a location corresponding to avatar 606*b*). In some embodiments, while avatar viewing user interface 644 is displayed, in response to detecting additional tap gestures on display 602, avatar 606*b* is displayed with additional poses in a set of predefined poses (e.g., each time a tap gesture is detected, avatar 606*b* will cycle to a next pose in a set of predefined poses). In some embodiments, changing the pose of avatar 606*b* includes displaying an animation of the avatar transitioning between poses (e.g., transitioning gradually between a plurality of intermediate states while transitioning from a first pose to a second pose). In some embodiments, displaying the animation includes applying a physics model to at least one feature of avatar 606*b* (e.g., the hair of the avatar) to animate the at least one feature (e.g., the hair moves according to a model of how hair would react to movement of the avatar as the avatar transitions between poses).

In some embodiments, after displaying the zoomed out view of avatar 606*b* in avatar viewing user interface 644, avatar 606*b* is automatically displayed with a different pose (e.g., a smiling pose) after a predetermined amount of time has elapsed (e.g., avatar 606*b* automatically changes from to a smiling pose after five seconds). In some embodiments, avatar 606b will continue to cycle through additional poses in a set of predefined poses until a tap gesture 657 is detected at a location on display 602 corresponding to done affordance 610. In some embodiments, in response to detecting tap gesture 657 on done affordance 610, avatar editing user interface 616 is (e.g., again) displayed on display 602, as shown in FIG. 6W.

Returning to FIG. 6T, in some embodiments, a tap gesture 645 is detected on display 602 at a location corresponding to back affordance 628. In response to detecting tap gesture 645 on display 602 at the location corresponding to back affordance 628, avatar editing user interface 616 as shown in FIG. 6G is displayed. When avatar editing user interface 616 as shown in FIG. 6G is displayed, avatar 606b is displayed at the first size above the list of primary avatar feature categories. In some embodiments, displaying avatar 606b at the first size includes displaying an animation of avatar 606b transitioning from the second size as shown in FIG. 6T to the first size as shown in FIG. 6G.

From the avatar editing user interface 616 as shown in FIGS. 6G-6I, a different primary avatar feature category can be selected. For example, in response to detecting tap gesture 619 on display 602 at a location corresponding to ears category 618c (as shown in FIG. 6H), options for an ear shape characteristic of avatar 606b can be selected in avatar editing user interface 616, as shown in FIG. 6Y.

Figure 6Y:
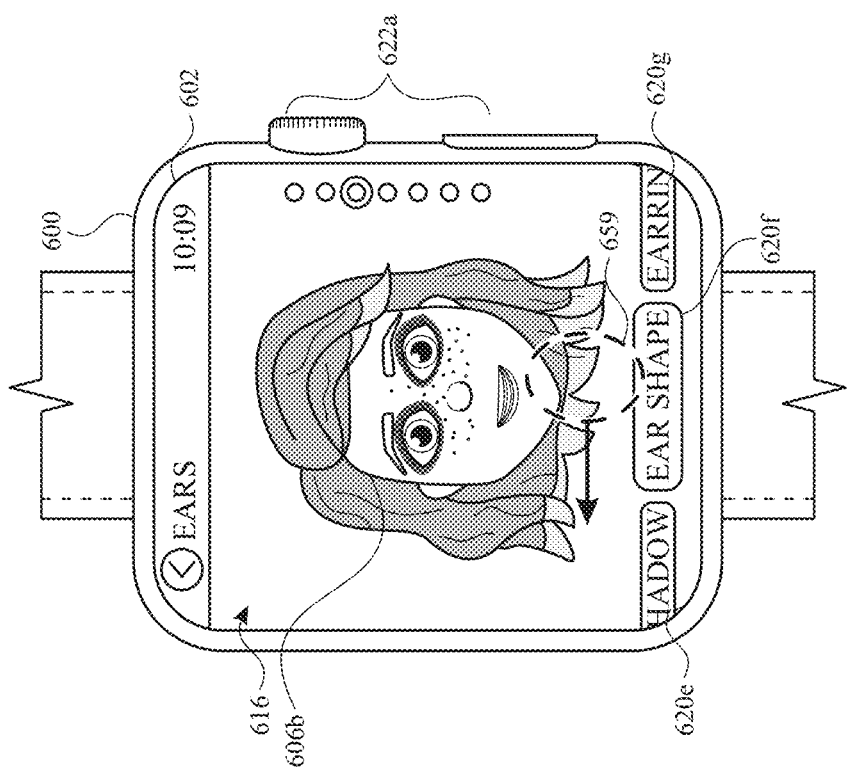
Figure 6A:
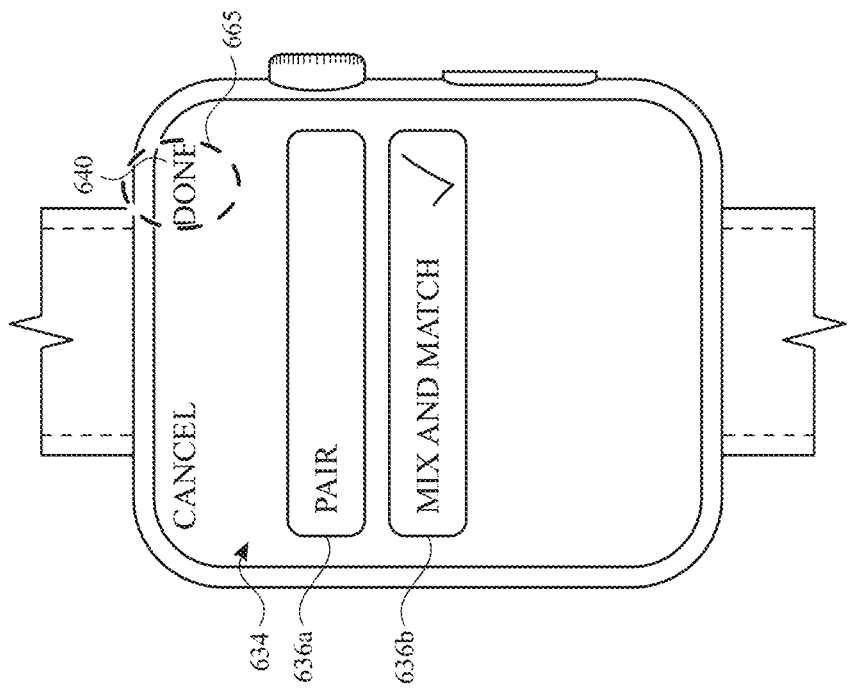
Figure 6A:
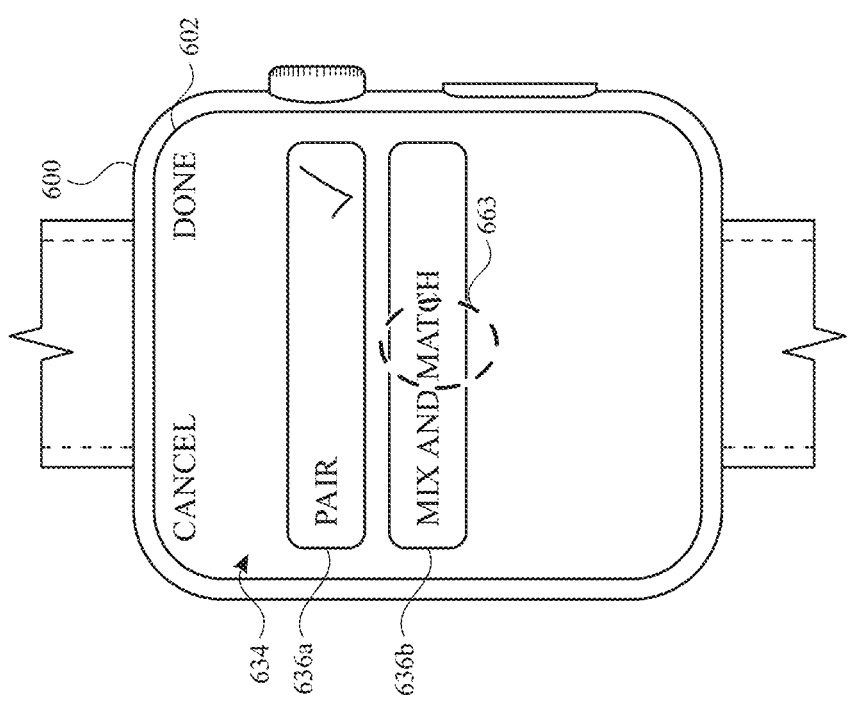
Figure 6A:
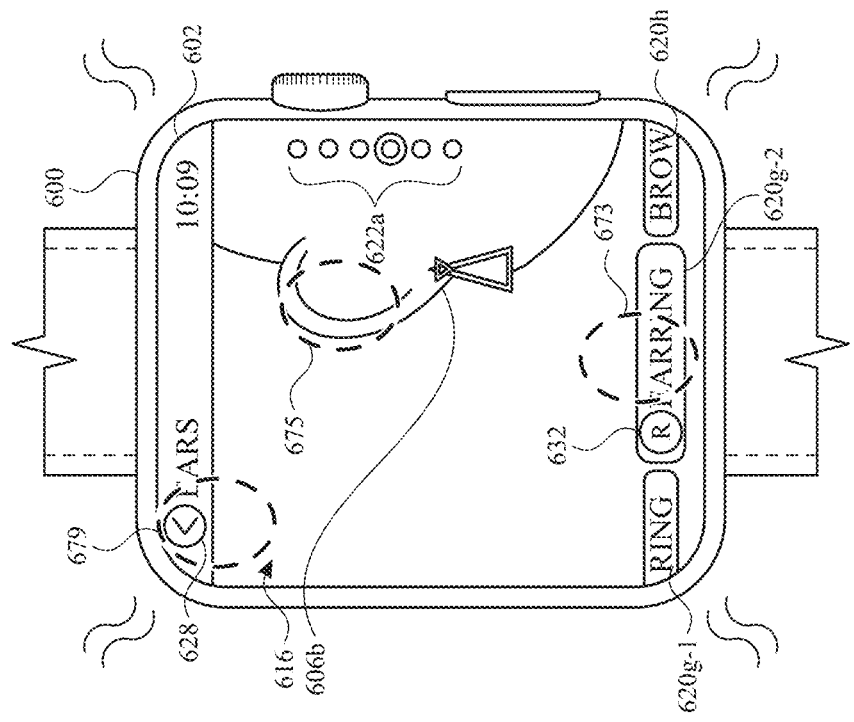
Figure 6A:
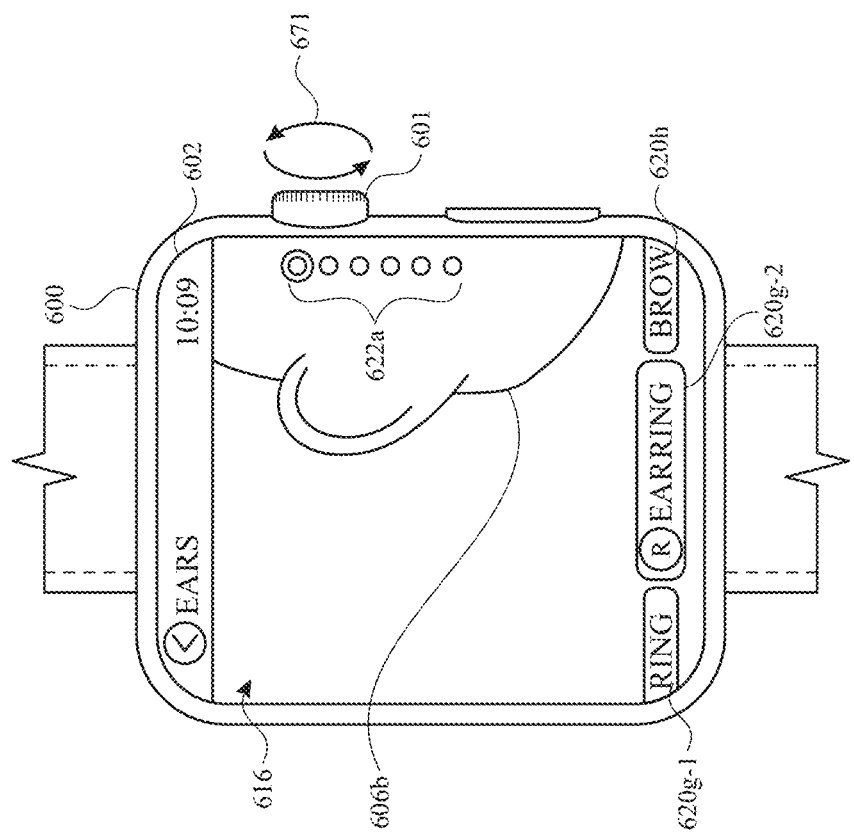
Figure 6A:
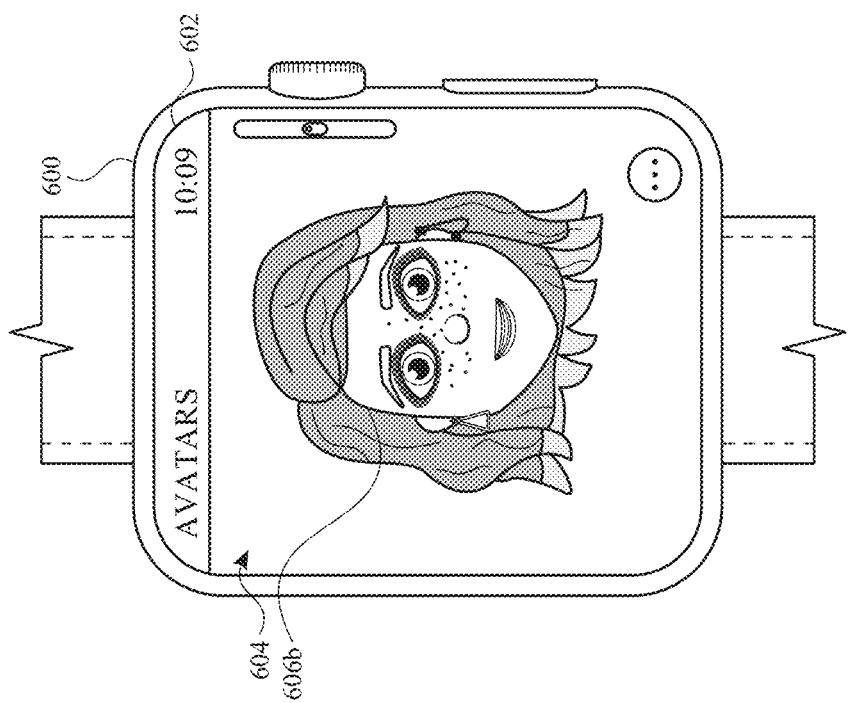
Figure 6A:
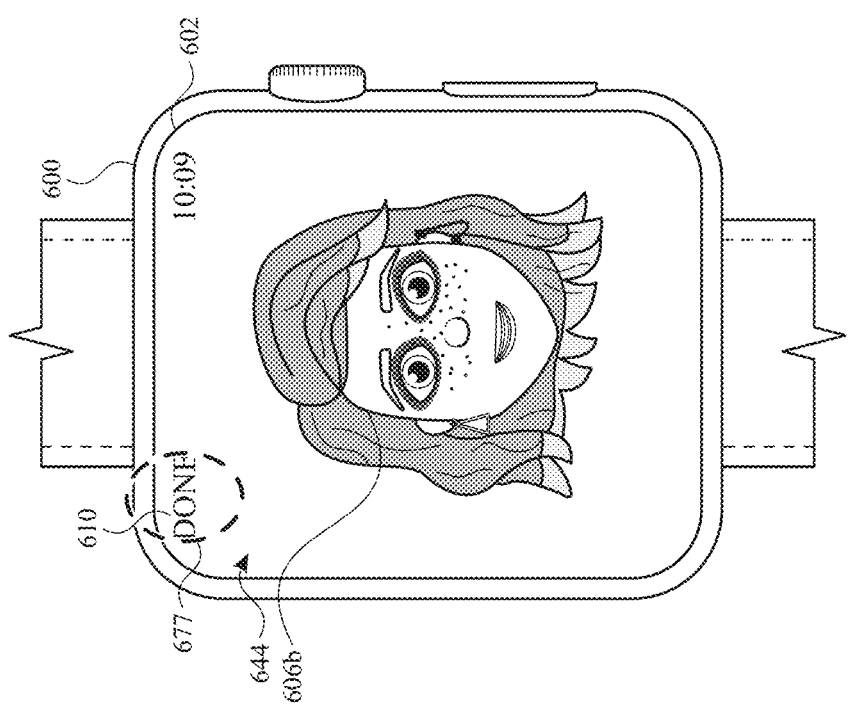

FIG. 6Y illustrates device 600 displaying, on display 602, avatar editing user interface 616 with selectable options for an ear shape characteristic of avatar 606b. The ear shape characteristic may also be referred to as an ear shape category or an ear shape subcategory. In some embodiments, the selectable options for the ear shape characteristic are displayed in response to detecting swipe gesture 653 on display 602 (as shown in FIG. 6W). In some embodiments, the selectable options for the ear shape characteristic are displayed in response to detecting tap gesture 619 on display 602 at a location corresponding to ears category 618c (as shown in FIG. 6H). As shown in FIG. 6Y, when avatar editing user interface 616 with selectable options for the ear shape characteristic of avatar 606b is displayed, avatar 606b is displayed at the same second size (e.g., a zoomed in view) as displayed in FIG. 6K for editing the hairstyle characteristic. In some embodiments, displaying avatar 606b at the second size includes displaying an animation of avatar 606b transitioning from the view as shown in FIG. 6W to the view as shown in FIG. 6Y.

FIG. 6Z illustrates device 600 displaying, on display 602, avatar editing user interface 616 with selectable options for an earrings characteristic of avatar 606b. The earrings characteristic may also be referred to as an earrings category or an earrings subcategory. In some embodiments, the selectable options for the earrings characteristic are displayed in response to detecting swipe gesture 659 on display 602 (as shown in FIG. 6Y). As shown in FIG. 6Z, when avatar editing user interface 616 with selectable options for the earrings characteristic of avatar 606b is displayed, avatar 606b is displayed at a fifth size (e.g., a further zoomed in view) larger than the second size of avatar 606b as displayed in FIG. 6Y. In addition, avatar 606b is shifted such that an ear (e.g., only one ear) of avatar 606b is emphasized relative to other features of avatar 606b. In some embodiments, displaying avatar 606b at the fifth size and shifting avatar 606b to emphasize an ear includes displaying an animation of avatar 606b transitioning from the view as shown in FIG. 6Y to the view as shown in FIG. 6Z. In some embodiments, one or more features of avatar 606b (e.g., hair) are not displayed to allow the feature being edited (e.g., ears) to be visible without obstructions.

As shown in FIG. 6Z, platter 620g corresponding to the earrings characteristic includes an indication 632 (e.g., an "LR" icon, a different color or textured platter background, a different font or font color) that the earrings characteristic can be split into multiple sub-characteristics (e.g., left earring and right earring). In response to detecting input 661 on display 602 (e.g., a tap gesture, a long press gesture) at a location corresponding to platter 620g, an interface 634 for splitting a characteristic (or feature) into multiple sub-characteristics (or sub-features) is displayed, as shown in FIG. 6AA.

FIG. 6AA illustrates device 600 displaying, on display 602, interface 634 for splitting a characteristic (or feature) into multiple sub-characteristics (or sub-features). Interface 634 includes a first option 636a (e.g., a "pair" option) that, when selected, causes edits to a characteristic (or feature) to be carried out on a pair of features (e.g., editing a characteristic option for a right ear will result in the same edit being made for the left ear). Interface 634 includes a second option 636b (e.g., a "mix and match" option) that, when selected, causes edits to a characteristic (or feature) to not be carried out on a pair of features, and instead, each feature is edited separately (e.g., a different characteristic option can be selected for each ear).

In response to detecting tap gesture 663 on display 602 (as shown in FIG. 6AA) at a location corresponding to the second option 636b, the option is selected, as shown in FIG. 6AB. In response to detecting tap gesture 665 on display 602 (as shown in FIG. 6AB) at a location corresponding to the done affordance 640, interface 634 ceases to be displayed and avatar editing user interface 616 is displayed with separate platters 620g-1 and 620g-2 corresponding to the sub-characteristics (or sub-features), as shown in FIG. 6AC.

In response to detecting rotation 667 of rotatable input device 601 (as shown in FIG. 6AC), a different option for the left earring characteristic is selected, as shown in FIG. 6AD. In some embodiments, when an option for a characteristic is selected, the corresponding avatar feature is automatically displayed with the selected characteristic option. For example, as shown in FIG. 6AD, in response to detecting rotation 667 of rotatable input device 601 (as shown in FIG. 6AC), a first style of earring is applied to the left ear of avatar 606b. In some embodiments, in response to detecting rotation 667 of rotatable input device 601 (as shown in FIG. 6AC), a tactile output (e.g., a vibration) is generated by one or more tactile output generators to indicate that a different option has been selected for a characteristic of avatar 606b.

FIG. 6AE illustrates device 600 displaying, on display 602, avatar editing user interface 616 with selectable options for the right earring characteristic of avatar 606b. In some embodiments, the selectable options for the right earring characteristic are displayed in response to detecting swipe gesture 669 on display 602 (as shown in FIG. 6AD) after the second option 636b (e.g., the "mix and match" option) in interface 634 has been selected. As shown in FIG. 6AE, when avatar editing user interface 616 with selectable options for the right earring characteristic of avatar 606b is displayed, the size of avatar 606b is maintained at the fifth size and avatar 606b is shifted such that the right ear of avatar 606b is emphasized relative to other features of avatar 606b. In some embodiments, displaying avatar 606b to emphasize the left ear includes displaying an animation of avatar 606b transitioning from the view as shown in FIG. 6AD to the view as shown in FIG. 6AE.

In response to detecting rotation 671 of rotatable input device 601 (as shown in FIG. 6AE), a different option for the right earring characteristic is selected, as shown in FIG. 6AF. In some embodiments, when an option for a characteristic is selected, the corresponding avatar feature is automatically displayed with the selected characteristic option. For example, as shown in FIG. 6AF, in response to detecting rotation 671 of rotatable input device 601 (as shown in FIG. 6AE), a second style of earring is applied to the right ear of avatar 606*b*. Notably, the style of earring applied to the right ear of avatar 606*b* is different from the style of earring applied to the left ear of avatar 606*b* (as shown in FIG. 6AD). In some embodiments, in response to detecting rotation 671 of rotatable input device 601 (as shown in FIG. 6AE), a tactile output (e.g., a vibration) is generated by one or more tactile output generators to indicate that a different option has been selected for a characteristic of avatar 606*b*.

As shown in FIG. 6AF, platter 620*g*-2 corresponding to the right earring characteristic includes an indication 632 (e.g., an "R" icon, a different color or textured platter background, a different font or font color) that the earrings characteristic can be combined into a single sub-characteristics (e.g., pair of earrings). In response to detecting input 673 on display 602 (e.g., a tap gesture, a long press gesture) at a location corresponding to platter 620*g*-2, interface 634 for splitting (or combining) a characteristic (or feature) into multiple sub-characteristics (or sub-features) is displayed, as shown in FIG. 6AA.

FIG. 6AG illustrates device 600 displaying, on display 602, a zoomed out view (e.g., a full face view) of avatar 606*b* in avatar viewing user interface 644. In some embodiments, avatar 606*b* is displayed in the zoomed out view in response to detecting tap gesture 675 on display 602 (e.g., at a location corresponding to avatar 606*b*), as shown FIG. 6AF. In some embodiments, the zoomed out view allows different features of avatar 606*b* which have been edited to be viewed together (e.g., the different earrings on the left and right ears can be viewed at the same time). In some embodiments, in response to detecting tap gesture 677 on done affordance 610, avatar editing user interface 616 is displayed (e.g., again) on display 602, as shown in FIG. 6AF.

Returning to FIG. 6AF, in some embodiments, tap gesture 679 is detected on display 602 at a location corresponding to back affordance 628. In response to detecting tap gesture 679 on display 602 at the location corresponding to back affordance 628, avatar editing user interface 616 as shown in FIG. 6G is displayed. When avatar editing user interface 616 as shown in FIG. 6G is displayed, avatar 606*b* is displayed at the first size above the list of primary avatar feature categories. In some embodiments, displaying avatar 606*b* at the first size includes displaying an animation of avatar 606*b* transitioning from the fifth size as shown in FIG. 6AF to the first size as shown in FIG. 6G.

FIG. 6AH illustrates device 600 displaying, on display 602, avatar selection user interface 604 including edits made to avatar 606*b* using avatar editing user interface 616 as described in reference to FIGS. 6K-6AG. Avatar selection user interface 604 is displayed in response to detecting tap gesture 617 on done affordance 642, as shown in FIG. 6G. In some embodiments, edits made to avatar 606*b* using avatar editing user interface 616 as described in reference to FIGS. 6K-6AG are synchronized across multiple devices. For example, after detecting tap gesture 617 on done affordance 642, as shown in FIG. 6G, information associated with avatar 606*b* is transmitted to a second device (e.g., via a server). In some embodiments, the second device is associated with a same user identity as device 600. After receiving the information associated with avatar 606*b* at the second device, avatar 606*b*, including edits made using avatar editing user interface 616, is viewable on the second device.

FIG. 7 is a flow diagram illustrating a method for editing features of an avatar using an computer system, in accordance with some embodiments. Method 700 is performed at a computer system (e.g., 100, 300, 500, 600, a smartwatch, a smartphone) with a display generation component (e.g., 602) and one or more input devices (e.g., a touch-sensitive surface). Some operations in method 700 are, optionally, combined, the orders of some operations are, optionally, changed, and some operations are, optionally, omitted.

As described below, method 700 provides an intuitive way for editing features of an avatar. The method reduces the cognitive burden on a user when editing features of an avatar, thereby creating a more efficient human-machine interface. For battery-operated computing devices, enabling a user to edit features of an avatar faster and more efficiently conserves power and increases the time between battery charges.

The computer system displays (702), via the display generation component, an avatar editing user interface (e.g., 616) that includes displaying a first view of an avatar (e.g., avatar 606*b* as shown in FIG. 6G; avatar 606*b* as shown in FIG. 6K; avatar 606*b* as shown in FIG. 6U) (e.g., a zoomed out view). The avatar includes (704) a plurality of avatar features (e.g., hair, facial features (lips, eyes, ears, nose), accessories (e.g., earrings, sunglasses, hats)). Displaying the first view of the avatar includes displaying (706) the avatar at a first size (e.g., avatar 606*b* as shown in FIG. 6G; avatar 606*b* as shown in FIG. 6K; avatar 606*b* as shown in FIG. 6U).

While displaying the first view of the avatar, the computer system detects (708), via the one or more input devices, a request to enter an editing mode for a first feature of the plurality of avatar features (e.g., 613, 619, 623, 639, 643, 647, 653, 659, 669) (e.g., a left/right swipe while in the editing mode or a selection from a list of primary avatar feature categories).

In response to detecting the request to enter the editing mode for the first feature of the plurality of avatar features, the computer system displays (710), via the display generation component, a second view of the avatar (e.g., avatar 606*b* as shown in FIG. 6K; avatar 606*b* as shown in FIG. 6U; avatar 606*b* as shown in FIG. 6V; avatar 606*b* as shown in FIG. 6Y; avatar 606*b* as shown in FIG. 6Z) (e.g., a zoomed in view). In some embodiments, displaying the second view includes displaying an animation from the first view to the second view (e.g., transitioning gradually between a plurality of intermediate states while transitioning from the first view to the second view). Displaying the second view of the avatar includes (712) changing the size of the avatar to a second size different from the first size (e.g., zooming in or out based on the selected feature of the avatar) and shifting the avatar so that the first feature is emphasized relative to other avatar features (e.g., moving the first feature toward a center of a region occupied by the avatar while other feature of the avatar are moved toward the edges of the region occupied by the avatar and/or cease to be displayed in the user interface). In some embodiments, the second size is larger than the first size.

Changing the size of the avatar to a second size that is different than the first size and shifting the avatar so that the first feature is emphasized relative to other avatar features provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting, via the one or more input devices, the request to enter the editing mode for the first feature of the plurality of avatar features, the computer system displays, via the display generation component, a set of one or more options (e.g., 622a, 622b, 622c) (e.g., color, shape, style) that, when selected, are applied to the first feature of the avatar. Displaying a set of one or more options that, when selected, are applied to the first feature of the avatar provides visual feedback to the user about whether options are available to be applied to the first feature and the quantity options that are available. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects, via the one or more input devices, a request to enter an editing mode for a second feature (e.g., different from the first feature) of the plurality of features (e.g., 613, 619, 623, 639, 643, 647, 653, 659, 669) (e.g., a left/right swipe while in the editing mode or a selection from a list of feature categories for editing). In response to detecting the request to enter the editing mode for the second feature of the plurality of avatar features, the computer system displays, via the display generation component, a third view of the avatar (e.g., avatar 606b as shown in FIG. 6K; avatar 606b as shown in FIG. 6M; avatar 606b as shown in FIG. 6R; avatar 606b as shown in FIG. 6U; avatar 606b as shown in FIG. 6V; avatar 606b as shown in FIG. 6W; avatar 606b as shown in FIG. 6Y; avatar 606b as shown in FIG. 6Z; avatar 606b as shown in FIG. 6AE). In some embodiments, displaying the third view of the avatar includes changing the size of the avatar to the second size (e.g., the same amount of zoom as for the first feature) and shifting the avatar so that the second feature is emphasized relative to other avatar features (e.g., moving the second feature toward a center of a region occupied by the avatar while other features of the avatar are moved toward the edges of the region occupied by the avatar and/or cease to be displayed in the user interface). Changing the size of the avatar to the second size and shifting the avatar so that the second feature is emphasized relative to other avatar features provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects, via the one or more input devices, a request to enter an editing mode for a third feature (e.g., different from the first feature and the second feature) of the plurality of features (e.g., 613, 619, 623, 639, 643, 647, 653, 659, 669) (e.g., a left/right swipe while in the editing mode or a selection from a list of feature categories for editing). In response to detecting the request to enter the editing mode for the third feature of the plurality of avatar features, the computer system displays, via the display generation component, a fourth view of the avatar (e.g., avatar 606b as shown in FIG. 6K; avatar 606b as shown in FIG. 6M; avatar 606b as shown in FIG. 6R; avatar 606b as shown in FIG. 6U; avatar 606b as shown in FIG. 6V; avatar 606b as shown in FIG. 6W; avatar 606b as shown in FIG. 6Y; avatar 606b as shown in FIG. 6Z; avatar 606b as shown in FIG. 6AE). In some embodiments, displaying the fourth view of the avatar includes changing the size of the avatar to a third size larger than the second size (e.g., zooming in on the third feature more than the first feature and/or the second feature) and shifting the avatar so that the third feature is emphasized relative to other avatar features. Changing the size of the avatar to a third size larger than the second size and shifting the avatar so that the third feature is emphasized relative to other avatar features provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects, via the one or more input devices, a request to enter an editing mode for a fourth feature (e.g., different from the first feature, the second feature, and the third feature) of the plurality of features (e.g., 613, 619, 623, 639, 643, 647, 653, 659, 669) (e.g., a left/right swipe while in the editing mode or a selection from a list of feature categories for editing). In response to detecting the request to enter the editing mode for the fourth feature of the plurality of avatar features, the computer system displays, via the display generation component, a fifth view of the avatar (e.g., avatar 606b as shown in FIG. 6K; avatar 606b as shown in FIG. 6M; avatar 606b as shown in FIG. 6R; avatar 606b as shown in FIG. 6U; avatar 606b as shown in FIG. 6V; avatar 606b as shown in FIG. 6W; avatar 606b as shown in FIG. 6Y; avatar 606b as shown in FIG. 6Z; avatar 606b as shown in FIG. 6AE). In some embodiments, displaying the fifth view of the avatar includes changing the size of the avatar to a fourth size larger than the first size (e.g., zooming in on the fourth feature) and shifting the avatar so that the fourth feature is emphasized relative to other avatar features. In some embodiments, the fourth size is different from the third size. Changing the size of the avatar to a fourth size larger than the first size and shifting the avatar so that the fourth feature is emphasized relative to other avatar features provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting a request to enter the editing mode for a fifth feature of the plurality of avatar features (e.g., 613, 619, 623, 639, 643, 647, 653, 659, 669) (e.g., a left/right swipe while in the editing mode or a selection from a list of feature categories for editing), the computer system displays, via the display generation component, a sixth view of the avatar (e.g., avatar 606b as shown in FIG. 6K; avatar 606b as shown in FIG. 6M; avatar 606b as shown in FIG. 6R; avatar 606b as shown in FIG. 6U; avatar 606b as shown in FIG. 6V; avatar 606b as shown in FIG. 6W; avatar 606b as shown in FIG. 6Y; avatar 606b as shown in FIG. 6Z; avatar 606b as shown in FIG. 6AE). In some embodiments, displaying the sixth view of the avatar includes changing the size of the avatar to the first size (e.g., displaying the avatar at the original size without zooming). Changing the size of the avatar to the first size provides visual feedback to the user confirming the selection of one of the features for editing and allows the user to more easily edit the feature. Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, a request to enter an editing mode for a respective feature is received by the computer system (e.g., 613, 619, 623, 639, 643, 647, 653, 659, 669) (e.g., a left/right swipe while in the editing mode or a selection from a list of feature categories for editing). In response to receiving the request, in accordance with a determination that the request is a request to edit a sixth feature, the computer system displays the avatar at a seventh size. In accordance with a determination that the request is a request to edit a seventh feature (e.g., different from the sixth feature), the computer system displays the avatar at an eighth size (e.g., different from the seventh size). In accordance with a determination that the request is a request to edit an eighth feature, the computer system displays the avatar at a ninth size (e.g., different from the sixth size and/or the seventh size; the same as the sixth size; the same as the seventh size). Displaying the avatar at different sizes in accordance with which feature was selected for editing provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system concurrently displays, with the first view of the avatar, a feature selection region (e.g., a region with avatar feature categories 618a-618c; a region with platters 620a-620h) (e.g., a region listing avatar features that can be modified). In some embodiments, the feature selection region is configured to scroll horizontally. In some embodiments, the feature selection region includes at least one feature category in a set of feature categories (e.g., a primary category such as skin, hairstyle, eyes, etc.; a secondary category such as skin color, freckles, etc.). In some embodiments, the at least one feature category in the set of feature categories is or are selectable (e.g., via a swipe gesture, via a tap gesture) to enter an editing mode for the selected feature category. Concurrently displaying a feature selection region with the first view of the avatar provides visual feedback to the user as to how the avatar currently appears, and allows the user to select a feature category to be edited while viewing the feature as it currently appears. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects, via the one or more input devices, a request (e.g., 615a) (e.g., a swipe gesture, a rotation of a crown, a rotation of a rotatable input device that is physically connected to the computer system (e.g., to a housing of the computer system); in some embodiments, the rotatable input device has an axis of rotation that is parallel to a surface of the display generation component (e.g., the rotatable input device is attached to a side of the computer system)) to view an additional feature category in the set of feature categories. In response to detecting the request to view the additional feature category, the computer system expands a size of the feature selection region on the display generation component and ceases to display the avatar (e.g., as shown in FIG. 6H) (e.g., the avatar is scrolled off screen and only features available to be edited are displayed). Expanding the size of the feature selection region on the display generation component and ceasing to display the avatar provides improved visual feedback by displaying additional feature categories which can be selected for editing. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a selection of the feature category in the set of feature categories (e.g., 619) (e.g., a tap gesture on one of the feature categories). In some embodiments, in response to detecting the selection of the feature category, the computer system reduces the size of the feature selection region on the display generation component and displays the second view of the avatar (e.g., as shown in FIG. 6Y). In some embodiments, the feature selection region ceases to be displayed when the size of the feature selection region is reduced. In some embodiments, the second view of the avatar fades into view. Reducing the size of the feature selection region on the display generation component and displaying the second view of the avatar in response to detecting the selection of the feature category provides visual feedback to the user confirming the selection of one of the features for editing and allows the user to more easily edit the feature, particularly a small feature, and particularly when display size is limited (e.g., by devoting more area of the display to the view of the selected feature). Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system displays, via the display generation component, a first feature category (e.g., 620a-620h) (e.g., text with a category or characteristic name; text describing the category or characteristic), and in accordance with a determination that the first feature category overlays at least a portion of the avatar, the computer system displays a graphical element behind the feature category (e.g., 620a-620h) (e.g., a platter under the text describing the feature category is visible). In some embodiments, the graphical element includes a blur material that is visible when the feature category overlays the avatar. In some embodiments, in accordance with a determination that the first feature category does not overlay at least a portion of the avatar, the computer system forgoes displaying the graphical element behind the feature category (e.g., the platter under the text describing the feature category is the same color as the background and is not visible when the feature category does not overlay the avatar). Displaying a graphical element behind the feature category provides improved visual feedback to the user by enhancing the contrast between feature category and the portion of the avatar that the feature category overlays. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, changing the size of the avatar to the second size includes, in accordance with a determination that the first feature is in a first feature category (e.g., the eyes category), changing the size of the avatar to a first zoomed size (e.g., as shown in FIG. 6U) (e.g., the second size is the first zoomed size). In some embodiments, changing the size of the avatar to the second size includes, in accordance with a determination that the first feature is in a second feature category (e.g., the hair category), changing the size of the avatar to a second zoomed size different from the first zoomed size (e.g., as shown in FIG. 6K) (e.g., the second size is the second zoomed size) (e.g., the hair category zooms in less than the eyes category). Displaying the avatar at different sizes in accordance with which feature was selected for editing provides visual feedback to the user confirming the selection of one of the features for editing and allows the user to more easily edit the feature, particularly a small feature, and particularly when display size is limited (e.g., instead of having to manually zoom and position the avatar via additional inputs). Providing improved visual feedback to the user and reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the avatar is displayed with a first pose (e.g., facial expression, direction the avatar is looking) and the computer system detects, via the one or more input devices, an input (e.g., 607a, 607b, 651, 655, 675) (e.g., a tap gesture) corresponding to a location of the avatar on the display generation component. In some embodiments, the input is detected while displaying the first view of the avatar. In some embodiments, the input is detected while displaying the second view of the avatar (e.g., in the editing mode). In response to detecting the input corresponding to the location of the avatar on the display generation component, the computer system displays the avatar with a second pose (e.g., as shown in FIG. 6D) (e.g., the avatar changes facial expression in response to the tap gesture on the avatar). In some embodiments, the avatar is displayed with multiple different (e.g., predetermined) poses in response to additional tap gestures (e.g., 607b) (e.g., in response to a second input corresponding to a location of the avatar, the avatar is displayed in a third pose different from the second pose). In some embodiments, the avatar automatically cycles through multiple different poses in response to a tap gesture (e.g., 607a, 607b, 651, 655, 675) (e.g., additional predetermined poses are displayed without further input). Displaying the avatar with a second pose in response to detecting an input corresponding to the location of the avatar on the display generation component provides improved visual feedback by enabling a user to see different portions of a three-dimensional avatar on a two-dimensional screen. Reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the second view of the avatar includes displaying the avatar with a first pose (e.g., facial expression, direction the avatar is looking) and the computer system detects, via the one or more input devices, a request (e.g., 623, 639, 643, 647, 653, 659, 669) (e.g., while displaying the second view of the avatar corresponding to the editing mode for the first feature) to enter an editing mode for a second feature (e.g., a different category or subcategory than the first feature) of the plurality of avatar features. In some embodiments, in response to detecting the request to enter the editing mode for the second feature of the plurality of avatar features, the computer system displays, via the display generation component, the avatar with a second pose different from the first pose (e.g., the avatar changes facial expression or looks in a different direction in response to entering the editing mode for the second feature). In some embodiments, the avatar changes poses as different features are selected for editing. Displaying the avatar with a second pose in response to detecting a request to enter an editing mode for a second feature enables a user to see different portions of a three-dimensional avatar on a two-dimensional screen without additional user inputs. Reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the avatar with the second pose includes displaying an animation of the avatar transitioning from the first pose to the second pose (e.g., transitioning gradually between a plurality of intermediate states while transitioning from the first pose to the second pose). Displaying an animation of the avatar transitioning from a first pose to a second pose enables a user to see different portions of a three-dimensional avatar on a two-dimensional screen without additional user inputs. Reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the animation includes applying a physics model to at least one feature of the plurality of avatar features (e.g., the hair of the avatar) to animate the at least one feature (e.g., the hair moves according to a model of how hair would react to movement of the avatar as the avatar transitions between poses). Applying a physics model to at least one feature of a plurality of avatar features provides an indication of how the avatar will move when animated after being edited without requiring additional inputs by the user. Reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the second view of the avatar, the computer system detects, via the one or more input devices, an input (e.g., 651, 675) (e.g., a tap gesture) corresponding to a location of the avatar on the display generation component. In response to detecting the input, the computer system displays, via the display generation component, a sixth view of the avatar (e.g., as shown in FIG. 6W; as shown in FIG. 6AG). In some embodiments, displaying the sixth view of the avatar includes changing the size of the avatar to a size smaller than the second size (e.g., zooming out on the avatar). Changing the size of the avatar to a size smaller than the second size provides improved visual feedback to the user by allowing multiple features of the avatar to by viewed at the same time (e.g., zooming out so that an edited feature can be viewed in combination with other features). Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the sixth view of the avatar, the computer system displays the avatar with a third pose and, after displaying the avatar with the third pose, the computer system displays the avatar with a fourth pose (e.g., the avatar changes facial expression when zooming out on the avatar). In some embodiments, the fourth pose is displayed automatically without detecting further user input. Displaying the avatar with a third pose (and optionally additionally poses) while displaying the sixth view of the avatar enables a user to see different portions of a three-dimensional avatar on a two-dimensional screen without additional user inputs. Reducing user inputs enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to displaying the avatar editing user interface, the computer system displays, via the display generation component, an avatar selection user interface (e.g., 604) that includes displaying a first avatar in a set of avatars (e.g., 606a, 606b). In some embodiments, the computer system detects, via the one or more input devices, an input (e.g., 605a, 605b) (e.g., a swipe gesture, a rotation of the crown, a rotation of the rotatable input device). In some embodiments, in response to detecting the input and in accordance with a determination that the first avatar is at an end of the set of avatars (e.g., first in the set, last in the set, only avatar in the set), the computer system displays, via the display generation component, an affordance (e.g., 614) for adding a new avatar to the set of avatars. In some embodiments, in response to detecting the input and in accordance with a determination that the first avatar is not at an end of the set of avatars, the computer system displays, via the display generation component, a second avatar (e.g., 606a, 606b) in the set of avatars, where the second avatar is different from the first avatar. Displaying the affordance for adding a new avatar to the set of avatars in accordance with a determination that the displayed avatar is at an end of a set of avatars provides the user with more control of the computer system by helping the user view one or more previously created avatars before deciding whether to add a new avatar to the set of avatars. Providing additional control of the computer system enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to displaying the avatar editing user interface, the computer system displays, via the display generation component, an avatar selection user interface (e.g., 604) that includes displaying a seventh view of the avatar (e.g., 606b as shown in FIG. 6E) (e.g., a view of the avatar in which the avatar is displayed at a size that is larger than in the avatar editing user interface), and detects, via the one or more input devices, a request to display the avatar editing user interface (e.g., 681) (e.g., a tap gesture on an edit icon). In some embodiments, in response to detecting the request to display the avatar editing user interface, the computer system displays, via the display generation component, the avatar editing user interface (e.g., 616) that includes displaying the first view of the avatar (e.g., 606b as shown in FIG. 6G) (e.g., the larger view of the avatar in the avatar selection interface is reduced in size to fit in the avatar editing user interface). Displaying the first view of the avatar in response to detecting the request to display the avatar editing user interface provides visual feedback to the user confirming the request was detected. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the request to enter the editing mode for the first feature includes a swipe gesture on the display generation component (e.g., 623, 639, 643, 647, 653, 659, 669) (e.g., feature categories are arranged horizontally, and a user can swipe to enter an editing mode for another feature category (e.g., swipe from hair style category to hair color category)).

Note that details of the processes described above with respect to method 700 (e.g., FIG. 7) are also applicable in an analogous manner to the methods described below. For example, method 700 optionally includes one or more of the characteristics of the various methods described below with reference to methods 800 and 1000. For brevity, these details are not repeated below.

FIG. 8 is a flow diagram illustrating a method for editing features of an avatar using an computer system, in accordance with some embodiments. Method 800 is performed at a computer system (e.g., 100, 300, 500, 600, a smartwatch, a smartphone) with a display generation component (e.g., 602) and a rotatable input device (e.g., 601, a crown). In some embodiments, the rotatable input device is physically connected to the computer system (e.g., to a housing of the computer system). In some embodiments, the rotatable input device has an axis of rotation that is parallel to a surface of the display generation component (e.g., the rotatable input device is attached to a side of the computer system). Some operations in method 800 are, optionally, combined, the orders of some operations are, optionally, changed, and some operations are, optionally, omitted.

As described below, method 800 provides an intuitive way for editing features of an avatar. The method reduces the cognitive burden on a user when editing features of an avatar, thereby creating a more efficient human-machine interface. For battery-operated computing devices, enabling a user to edit features of an avatar faster and more efficiently conserves power and increases the time between battery charges.

The computer system (e.g., a smart watch) displays (802), via the display generation component, an avatar editing user interface (e.g., 616). Displaying the avatar editing user interface includes concurrently displaying (804) at least a portion of an avatar (e.g., 606*b*) having a plurality of avatar features (e.g., hair, facial features (e.g., lips, eyes, nose), accessories (e.g., earrings, sunglasses, hats)), where displaying at least the portion of the avatar includes displaying a respective avatar feature (e.g., hair color, hair style) with a first characteristic option (e.g., brown; hair style 1; a visual characteristic), and (806) a characteristic selection element (e.g., 622*a*, 622*b*, 622*c*) (e.g., colored circles indicating different distinct colors for the feature; dots indicating a number of different style choices for the feature; a slider indicating a continuous range of colors) corresponding to a set of characteristic options (e.g., hair colors, hair styles) for the respective avatar feature, where the set of characteristic options includes the first characteristic option for the respective avatar feature. In some embodiments, the characteristic selection element is configured to scroll vertically. In some embodiments, the characteristic indication element includes an indicator of the currently selected characteristic (e.g., a larger colored circle; highlighting of a selected dot or a position in a range of colors).

While displaying at least the portion of the avatar and the characteristic selection element, the computer system detects (808) a rotation (e.g., 621, 625, 627, 633, 641, 649, 667, 671) of the rotatable input device.

In response (810) to detecting the rotation of the rotatable input device, the computer system ceases (812) to display the respective avatar feature with the first characteristic option and displays (814), via the display generation component, the respective avatar feature with a second characteristic option (e.g., as shown in FIGS. 6L, 6N, 6P, 6T, 6W, 6AD, and 6AF). In some embodiments, the respective avatar feature is automatically displayed by the computer system with the second characteristic option in response to detecting the rotation of the rotatable input device. The second characteristic option (816) is selected from the set of characteristic options based on the rotation of the rotatable input device (e.g., based on the amount (speed and/or magnitude) and/or direction of rotation of the rotatable input device). The second characteristic option (818) is different from the first characteristic option. In some embodiments, the characteristic selection element (e.g., 622*a*, 622*b*, 622*c*) includes an indicator of the currently selected characteristic (e.g., a larger colored circle; highlighting of a selected dot or a position in the range of colors).

Displaying the respective avatar feature with a second characteristic option in response to detecting the rotation of the rotatable input device provides visual feedback to the user confirming the selection of the characteristic option and allows the user to more easily edit the feature, particularly when display size is limited (e.g., instead of having to tap on an option in a list of options). Providing improved visual feedback to the user and providing additional control of the computer system without cluttering the user interface with additional displayed controls enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the characteristic selection element (e.g., 622*a*, 622*b*) includes a plurality of discrete user interface elements (e.g., colored circles, dots). In some embodiments, the plurality of discrete user interface elements each have a different appearance. In some embodiments, the plurality of discrete user interface elements are independently selectable.

In some embodiments, in response to detecting the rotation of the rotatable input device, the computer system generates, via one or more tactile output generators, a tactile output when the respective avatar feature is displayed with the second characteristic option (e.g., as the crown is rotated, the computer system vibrates when each characteristic option in the set of characteristic options is displayed). Generating a tactile output when the respective avatar feature is displayed with the second characteristic option provides feedback to the user confirming the selection of the characteristic option. Providing improved feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with a determination that the respective avatar feature is a first type of feature (e.g., a feature with different styles of characteristic options (e.g., nose shape, hair style)), the computer system displays the characteristic selection element as a plurality of indicators having a same value for a first visual characteristic (e.g., 622a) (e.g., dots of uniform size and/or color). In some embodiments, the indicators are aligned vertically along the side of the display generation component adjacent to the rotatable input device. In some embodiments, in accordance with a determination that the respective avatar feature is a second type of feature (e.g., a feature with characteristic options of different colors), the computer system displays the characteristic selection element as a plurality of color indicators having different values for the first visual characteristic (e.g., 622b). In some embodiments, the color indicators are aligned vertically along the side of the display adjacent to the crown. In some embodiments, in accordance with a determination that the respective avatar feature is the second type of feature, the computer system displays, via the display generation component, the respective avatar feature with a first color corresponding to a first color indicator in the plurality of color indicators, where the first color indicator is displayed with a size larger than one or more (or all) of the other color indicators in the plurality of color indicators (e.g., the indicator for the currently selected color is larger than indicators for unselected colors). Displaying the characteristic selection element as a plurality of indicators having a same value for a first visual characteristic or as a plurality of color indicators having different values for the first visual characteristic provides visual feedback to the user regarding the type of feature that has been selected to be edited (e.g., a feature with different styles or a feature with different with colors). Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a request (e.g., via a touch-sensitive surface) to edit a second avatar feature of the plurality of avatar features (e.g., 623, 639, 643, 647, 653, 659, 669) (e.g., a left/right swipe while in the editing mode for the respective avatar feature). In some embodiments, detecting the request to edit the second avatar feature includes detecting, via a touch-sensitive surface, a swipe gesture (e.g., 623, 639, 643, 647, 653, 659, 669) (e.g., feature categories are arranged horizontally, and a user can swipe to enter an editing mode for another feature category (e.g., swipe from hair style category to hair color category)). In some embodiments, in response to detecting the request to edit the second avatar feature and in accordance with a determination that the characteristic selection element is displayed as the plurality of indicators having a same value for a first visual characteristic (e.g., 622a) (e.g., dots of uniform size and color) and that the second avatar feature is a first type of feature (e.g., a feature with characteristic options of different colors), the computer system displays, via the display generation component, an animation of the characteristic selection element transitioning from the plurality of indicators having the same value for the first visual characteristic (e.g., 622a) to the plurality of color indicators having different values for the first visual characteristic (e.g., 622b) (e.g., transitioning gradually from a first state of the plurality of indicators to a second state of the plurality of indicators). Displaying an animation of the characteristic selection element transitioning from the plurality of indicators having the same value for the first visual characteristic to the plurality of color indicators having different values for the first visual characteristic provides visual feedback to the user confirming that a different type of feature has been selected to be edited. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting the request to edit the second avatar feature and in accordance with a determination that the characteristic selection element is displayed as the plurality of color indicators having different respective colors (e.g., 622b) and that the second avatar feature is a second type of feature (e.g., a feature with different styles of characteristic options (e.g., nose shape, hair style)), the computer system displays, via the display generation component, an animation of the characteristic selection element transitioning from the plurality of color indicators having different values for the first visual characteristic (e.g., 622b) to the plurality of indicators having the same value for the first visual characteristic (e.g., 622a) (e.g., transitioning gradually from a second state of the plurality of indicators to a first state of the plurality of indicators). Displaying an animation of the characteristic selection element transitioning from the plurality of color indicators having different values for the first visual characteristic to the plurality of indicators having the same value for the first visual characteristic provides visual feedback to the user confirming that a different type of feature has been selected to be edited. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with a determination that the characteristic selection element is displayed as the plurality of indicators having the same value for the first visual characteristic (e.g., 622a) (e.g., dots of uniform size and color) and that the second avatar feature is a second type of feature (e.g., a feature with different styles of characteristic options (e.g., nose shape, hair style)), the computer system maintains display of the characteristic selection element as the plurality of indicators having the same visual appearance (e.g., 622a). Maintaining display of the characteristic selection element as the plurality of indicators having the same visual appearance provides visual feedback to the user confirming that a same type of feature has been selected to be edited. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with a determination that the characteristic selection element is displayed as the plurality of color indicators having different values for the first visual characteristic (e.g., 622b) and that the second avatar feature is the first type of feature (e.g., a feature with characteristic options of different colors), the computer system maintains display of the characteristic selection element as the plurality of color indicators having different values for the first visual characteristic (e.g., 622b). In some embodiments, the colors used for the plurality of color indicators are different for the second avatar feature than for the first avatar feature. Maintaining display of the characteristic selection element as the plurality of color indicators having different values for the first visual characteristic provides visual feedback to the user confirming that a same type of feature has been selected to be edited. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects an input (e.g., 631) (e.g., a tap or a long press detected via a touch-sensitive surface) corresponding to a location of the characteristic selection element (e.g., 622b). In some embodiments, in response to detecting the input corresponding to the location of the characteristic selection element, the computer system displays a plurality of sub-options (e.g., 622c) corresponding to the characteristic option being displayed for the respective avatar feature (e.g., a range of colors similar to the currently displayed color option). In some embodiments, the plurality of sub-options (e.g., 622c) are displayed as a continuous range of options (e.g., a vertical bar having a continuous gradient of colors instead of the discrete options used for the plurality of color indicators). In some embodiments, the range of colors in the continuous gradient of colors is based on a selected color option (e.g., different ranges of colors are displayed based on which color option is selected). In some embodiments, in response to detecting the input corresponding to the location of the characteristic selection element, the computer system replaces the display of the characteristic selection element (e.g., 622b) with the display of the plurality of sub-options (e.g., 622c). Displaying the plurality of sub-options corresponding to the characteristic option being displayed for the respective avatar feature provides the user with more control of the computer system by allowing the user to select from a more precise range of sub-options (e.g., a range of colors with a similar hue) for the respective avatar feature. Providing additional control of the computer system to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the plurality of sub-options, the computer system detects an input (e.g., 633) (e.g., rotation of the rotatable input device) selecting a first sub-option in the plurality of sub-options. In some embodiments, in response to detecting the input, the computer system selects the first sub-option in the plurality of sub-options without providing a tactile output via the one or more tactile output generators (e.g., no vibration when rotating the rotatable input device). In some embodiments, in response to detecting the rotation of the rotatable input device, the computer system selects a first sub-option in the plurality of sub-options and displays the selected sub-option for the respective avatar feature (e.g., as shown in FIG. 6P). Displaying the respective avatar feature with the selected sub-option in response to detecting the rotation of the rotatable input device provides visual feedback to the user confirming the selection of the sub-option and allows the user to more easily edit the feature, particularly when display size is limited (e.g., instead of having to tap on an option in a list of options). Providing improved visual feedback to the user and providing additional control of the computer system without cluttering the user interface with additional displayed controls enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a request (e.g., via a touch-sensitive surface) to cease displaying the plurality of sub-options (e.g., 635, 637) (e.g., by tapping on the sub-options slider, by tapping on a "done" affordance). In some embodiments, in response to detecting the request (e.g., via a touch-sensitive surface) to cease displaying the plurality of sub-options, the computer system ceases to display the plurality of sub-options, displays, via the display generation component, the respective avatar feature with a selected sub-option of the plurality of sub-options (e.g., as shown in FIG. 6Q), and displays, via the display generation component, the characteristic selection element corresponding to the set of characteristic options for the respective avatar feature (e.g., 622b as shown in FIG. 6Q). Ceasing display of the plurality of sub-options and displaying the characteristic selection element corresponding to the set of characteristic options for the respective avatar feature provides visual feedback to the user confirming the selection of the sub-option. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting the rotation (e.g., 641) of the rotatable input device, the computer system displays, via the display generation component, a name of the second characteristic option (e.g., 626) (e.g., style of hair highlight—modern, gradient, or classic) for a predetermined time (e.g., 1 second). Displaying a name of the characteristic option for a predetermined time provides visual feedback to the user confirming which characteristic option is being selected. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a request (e.g., via a touch-sensitive surface) to separate the respective avatar feature (e.g., earrings, earbuds) into a plurality of sub-features (e.g., 661) (e.g., by tapping on the name of the feature in a platter below the avatar) and, in response to detecting the request to separate the respective avatar feature into a plurality of sub-features, the computer system adds the plurality of sub-features to a set of avatar features that can be edited in the avatar editing interface (e.g., the left ear and right ear can be separately edited in the avatar editing interface by swiping left/right). For example, after requesting that the ears be separated into left ear and right ear sub-features, the left ear can be edited to have a first earring, and the right ear can be edited to have a second earring different from the first earring. In some embodiments, the name of the feature is displayed differently (e.g., with indication 632) (e.g., bolded, different background color) than other features to indicate the feature can be separated into sub-features. In some embodiments, only a subset of avatar features can be separated into sub-features (e.g., the earrings and earbuds features can be separated into left and right sub-features, but hair cannot be separated into sub-features). In some embodiments, tapping on the name of the sub-feature in a platter below the avatar (e.g., 673) re-combines the sub-features into the single respective feature. Adding the plurality of sub-features to the set of avatar features that can be edited in the avatar editing interface in response to detecting the request to separate the respective avatar feature into the plurality of sub-features provides the user with more control of the computer system by allowing the user to edit additional avatar sub-features (e.g., a left and right ear can be edited separately, instead of being edited as a pair of ears). Providing additional control of the computer system to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 800 (e.g., FIG. 8) are also applicable in an analogous manner to the methods described above and below. For example, method 800 optionally includes one or more of the characteristics of the various methods described above with reference to method 700 and one or more characteristics of the various methods described below with reference to method 1000. For brevity, these details are not repeated below.

FIGS. 9A-9M illustrate exemplary user interfaces for editing an avatar, in accordance with some embodiments. The user interfaces in these figures are used to illustrate the processes described below, including the processes in FIGS. 10A-10C.

Figure 9A:
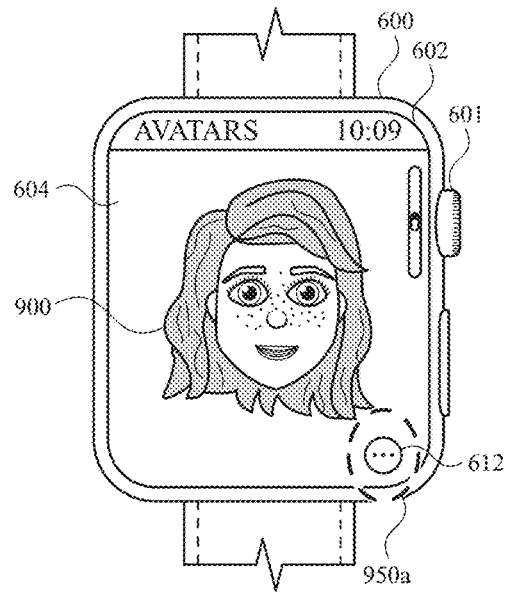
FIGS. 9A-9M illustrate exemplary user interfaces for editing features of an avatar using an electronic device in accordance with some embodiments.
Figure 10A:
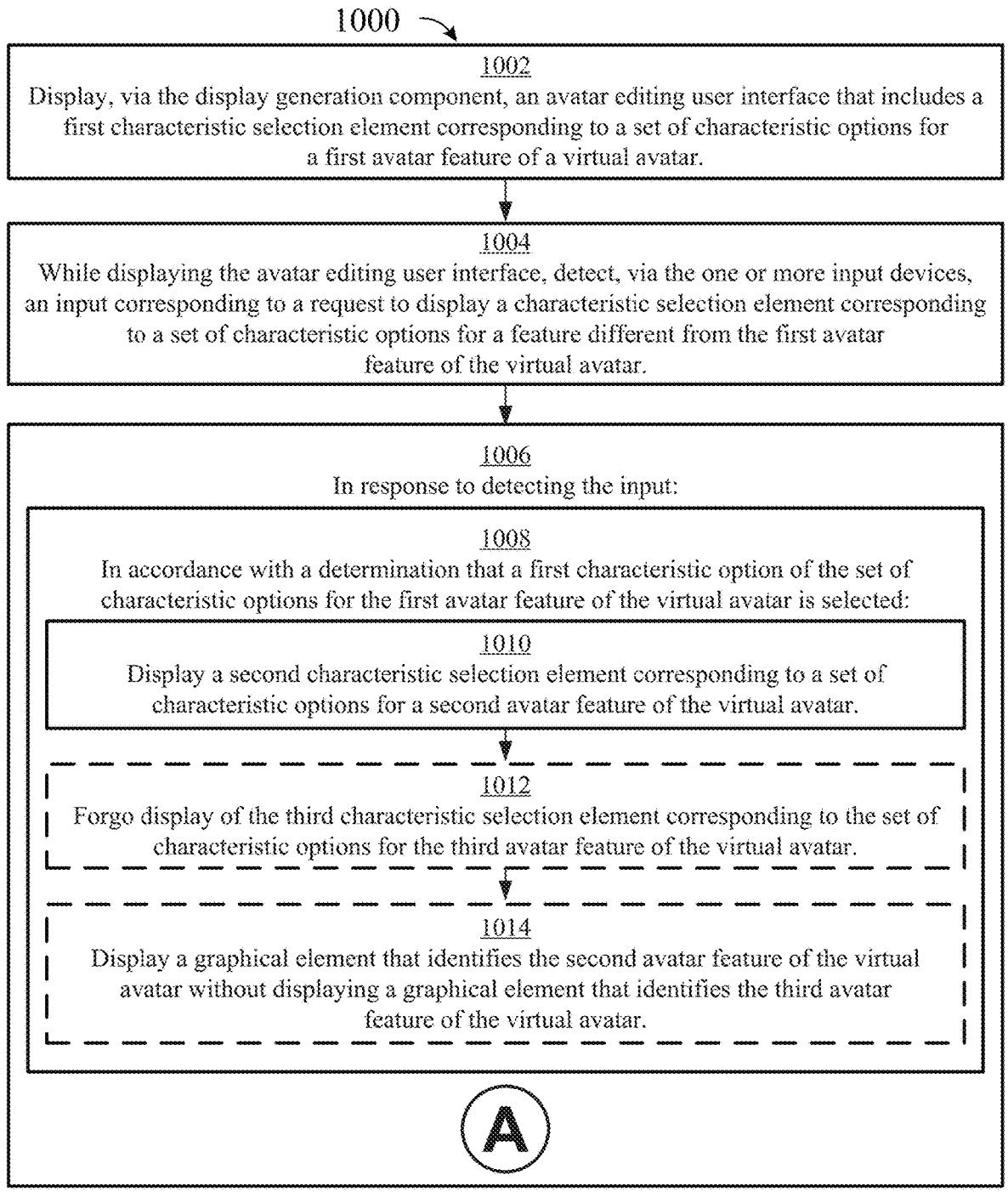

At FIG. 9A, electronic device 600 displays, on display 602, avatar 900 with a default pose in avatar selection user interface 604. As set forth above, in some embodiments, in response to detecting an input corresponding to a request to display a different avatar in the avatar selection user interface 604, electronic device 600 scrolls avatar selection user interface 604 to display another avatar or an affordance for adding an avatar to device 600. In some embodiments, the input corresponding to the request to display a different avatar is a rotation of rotatable input device 601 (e.g., a rotation of a watch crown). In some embodiments, the input corresponding to the request to display a different avatar is a swipe gesture on display 602 (e.g., an upward swipe gesture).

Figure 9B:
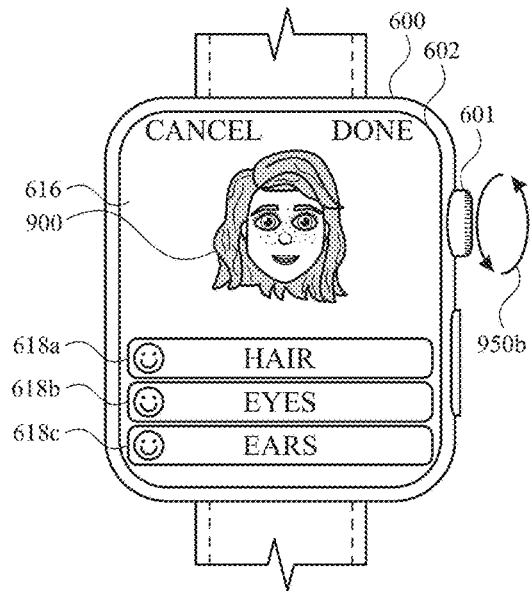

At FIG. 9A, avatar selection user interface 604 further includes edit affordance 612. In response to detecting tap gesture 950a on display 602 at a location corresponding to edit affordance 612, avatar editing user interface 616 is displayed on display 602, as shown at FIG. 9B. At FIG. 9B, avatar editing user interface 616 includes avatar 900 (e.g., in response to selecting avatar 900 for editing by selecting edit affordance 612 while avatar 900 is displayed on avatar selection user interface 604, as shown at FIG. 9A). As shown at FIG. 9B, avatar 900 is displayed at a first size above a list of avatar feature categories (e.g., primary avatar feature categories). In some embodiments, the avatar feature categories include hair category 618a, eyes category 618b, and ears category 618c. In some embodiments, the list of avatar feature categories is a scrollable list. In response to detecting rotation 950b of rotatable input device 601 (e.g., rotation of a watch crown), additional avatar feature categories are displayed, as shown at FIG. 9C.

In some embodiments, additional avatar feature categories include skin category 618d, brows category 618e, facial hair category 618f, eye wear category 618g, and headwear category 618h. In some embodiments, the avatar feature categories are not limited to the categories shown in FIGS. 9B and 9C. Additional, fewer, or different avatar feature categories may be used and/or displayed in avatar editing user interface 616.

Figure 9C:
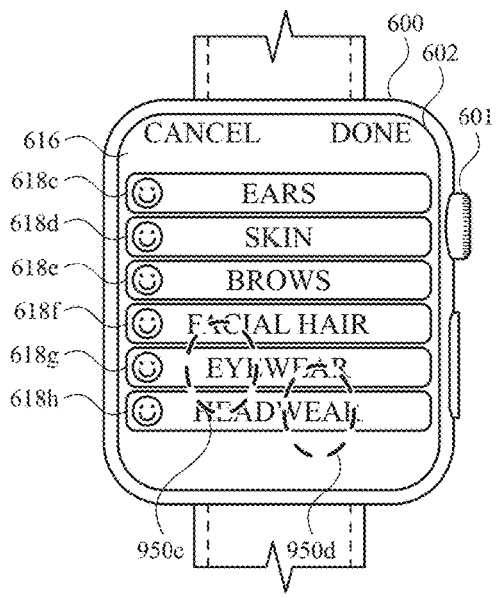
Figure 9D:
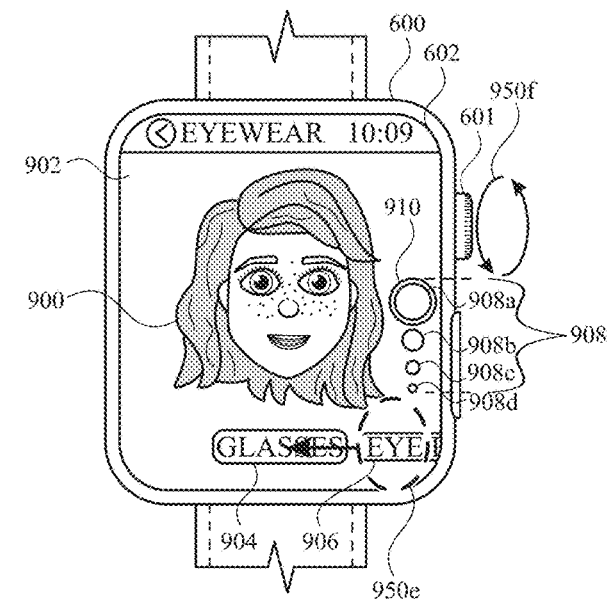

At FIG. 9C, electronic device 600 detects tap gesture 950c at a location corresponding to eye wear category 618g. In response to detecting tap gesture 950c, electronic device 600 displays user interface 902 corresponding to eye wear category 618g, as shown at FIG. 9D. Alternatively, electronic device 600 detects tap gesture 950d at a location corresponding to headwear category 618h. In response to detecting tap gesture 950d, electronic device 600 displays user interface 926 corresponding to headwear category 618h, as shown at FIG. 9K.

At FIG. 9D, electronic device 600 displays avatar 900 on user interface 902 for editing features of the selected category (e.g., eye wear). User interface 902 includes first graphical element 904 (e.g., a first platter labeled "Glasses") corresponding to a first feature (or a first sub-feature) of the selected avatar category and second graphical element 906 (e.g., a second platter labeled "Eye Patch") corresponding to a second feature (or a second sub-feature) of the selected avatar category. At FIG. 9D, electronic device 600 displays first graphical element 904 as being centered on display 602 and below avatar 900. Accordingly, the position of first graphical element 904 indicates that the first feature of the selected category is currently available for editing. As such, in response to detecting rotational inputs on rotatable input device 601, electronic device 600 is configured to adjust settings or characteristics of avatar 900 that are associated with the first feature of the selected category (e.g., transition between avatar 900 without glasses and avatar 900 wearing different pairs of glasses).

At FIG. 9D, user interface 902 includes first characteristic selection element 908 corresponding to the first feature of the selected category. First characteristic selection element 908 includes characteristic options 908a, 908b, 908c, and 908d corresponding to individually selectable options associated with the first feature of the selected category. At FIG. 9D, characteristic option 908a includes indicator 910 (e.g., selection indicator) surrounding characteristic option 908a indicating that characteristic option 908a, corresponding to avatar 900 without a pair of glasses, is currently selected. At FIG. 9D, electronic device 600 detects user input 950e (e.g., a swipe gesture) on user interface 902. In response to detecting user input 950e, electronic device 600 displays a second page of user interface 902, as shown at FIG. 9E.

Figure 9E:
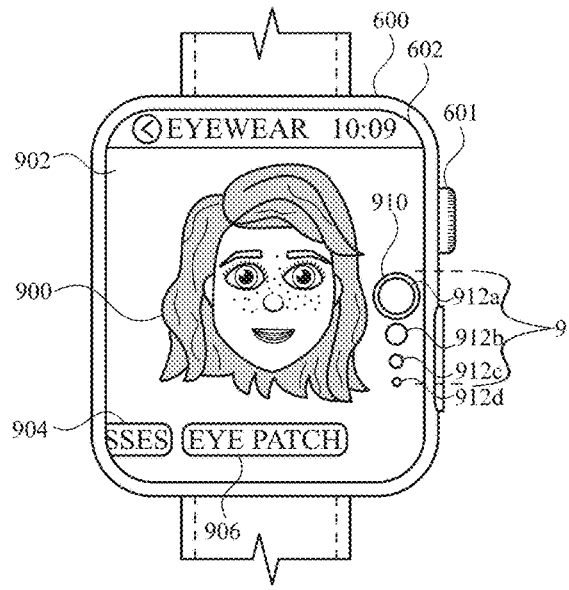

At FIG. 9E, the second page of user interface 902 enables adjustment of a second feature (e.g., eye patch) of the selected category. At FIG. 9E, electronic device 600 displays second graphical element 906 as being centered on display 602 and below avatar 900. Accordingly, the position of second graphical element 906 indicates that the second feature of the selected category (e.g., eye wear) is currently available for editing. In response to detecting rotational inputs on rotatable input device 601, electronic device 600 adjusts settings or characteristics of avatar 900 that are associated with the second feature of the selected category (e.g., transition between avatar 900 without an eye patch and avatar 900 wearing particular eye patches).

Additionally, at FIG. 9E, user interface 902 includes second characteristic selection element 912 corresponding to the second feature of the selected category. Second characteristic selection element includes characteristic options 912a, 912b, 912c, and 912d associated with individually selectable options for the second feature (e.g., eye patch) of the selected category (e.g., eyewear). At FIG. 9E, characteristic option 912a includes indicator 910 (e.g., selection indicator) surrounding characteristic option 912a indicating that characteristic option 912a corresponding to avatar 900 without an eye patch is currently selected.

Further, at FIG. 9E, electronic device 600 displays second graphical element 906 adjacent to (e.g., positioned next to) first graphical element 904 while second graphical element 906 is centered on display 602. As set forth above, when electronic device 600 detects user input 950e, characteristic option 908a of first characteristic selection element 908 is currently selected. Characteristic option 908a corresponds to an absence of the first feature (e.g., no glasses) of the selected avatar feature, as illustrated in FIGS. 9D and 9E, where avatar 900 is not wearing a pair of glasses. Accordingly, in response to user input 950e, electronic device 600 transitions from the first page of user interface 902 associated with first graphical element 904 to the second page of user interface 902 associated with second graphical element 906. As set forth below, when electronic device 600 determines that one of characteristic options 908b-908d of first characteristic selection element 908 is currently selected, electronic device 600 displays a page of user interface 902 (e.g., a page different from the second page of user interface 902) for editing a subcategory of the first feature of the selected category and, in some embodiments, replaces display of second graphical element 906 with a different (e.g., additional) graphical element corresponding to the subcategory of the first feature of the selected category.

Figure 9F:
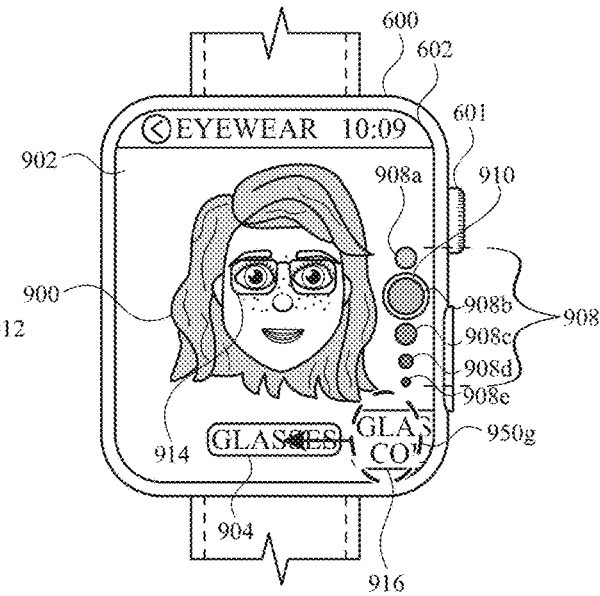

Turning back to FIG. 9D, electronic device 600 detects rotational input 950f on rotatable input device 601. In response to detecting rotational input 950f, electronic device 600 updates the first page of user interface 902, as shown at FIG. 9F. At FIG. 9F, electronic device 600 displays avatar 900 wearing glasses 914 on avatar 900 in response to detecting rotational input 950f. Additionally, electronic device 600 selects a different characteristic option. In the embodiment illustrated in FIG. 9F, electronic device 600 translates characteristic options 908a-908d in accordance with a direction of rotational input 950f (e.g., characteristic options 908a-908d are translated in an upward direction in response to a clockwise rotation of rotatable input device 601). In some embodiments, electronic device 600 causes display of characteristic option 908e in response to detecting rotational input 950f.

Further, in response to detecting rotational input 950f, electronic device 600 transitions display of indicator 910 from first characteristic option 908a to second characteristic option 908b. Second characteristic option 908b corresponds to glasses 914, whereas first characteristic option 908a corresponds to an absence of a pair of glasses on avatar 900. In some embodiments, characteristic options 908c, 908d, and/or 908e correspond to avatar 900 wearing a different pair of glasses than glasses 914 (e.g., different frame shapes). Thus, in response to detecting an additional rotational input (and/or a continuation of rotational input 950f), electronic device 600 transitions indicator 910 to one of characteristic options 908c, 908d, and/or 908e and displays avatar 900 as wearing the corresponding pair of glasses.

At FIG. 9F, electronic device 600 displays first graphical element 904 and replaces display of second graphical element 906 with third graphical element 916 (e.g., electronic device 600 ceases to display second graphical element 906 on display 602 and displays third graphical element 916) corresponding to a first sub-feature (e.g., a sub-option and/or a subcategory; a feature that is optionally available for editing depending on the characteristic option that is selected for the first feature) of the first feature of the selected category. As set forth above, second characteristic option 908b is currently selected (e.g., as indicated by indicator 910) such that electronic device 600 displays avatar 900 as wearing glasses 914. Because second characteristic option 908b is associated with the presence of the first feature (e.g., avatar 900 wearing an accessory and/or glasses) of the selected category (e.g., eye wear), electronic device 600 displays third graphical element 916, which is associated with a first sub-feature of the first feature of the selected category (e.g., a subcategory for editing glasses 914, such as a color of the frames of glasses 914). As set forth above, when first characteristic option 908a is selected, electronic device 600 forgoes display of third graphical element 916, and in response to user input 950e, displays the second page of user interface 902 associated with the second feature of the selected category (e.g., eye patch). In other words, in response to detecting user input 950f, and thus when displaying avatar 900 as wearing glasses 914, electronic device 600 displays third graphical element 916 (and optionally ceases to display second graphical element 906) to provide additional editing options for customizing glasses 914.

Figure 9G:
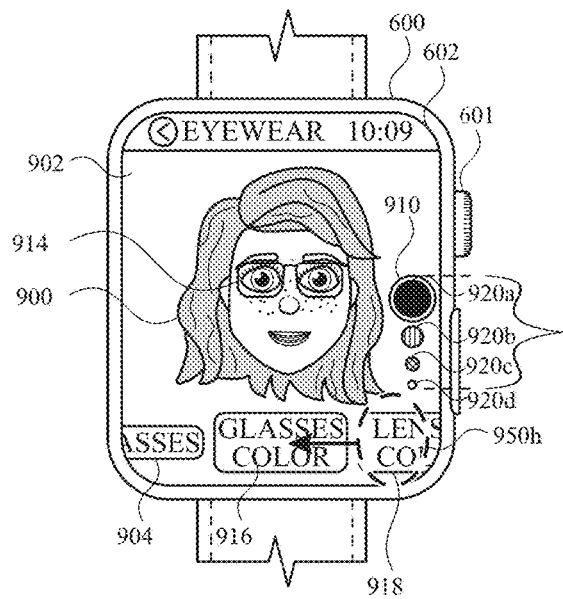

At FIG. 9F, electronic device 600 detects user input 950g (e.g., a swipe gesture) on user interface 902. In response to detecting user input 950g, electronic device 600 displays third page of user interface 902 for editing a first sub-feature (e.g., a color of glasses 914 and/or a color of the frames of glasses 914) of the first feature of the selected category, as shown at FIG. 9G. At FIG. 9G, electronic device 600 displays first graphical element 904, third graphical element 916, and fourth graphical element 918. As described below, fourth graphical element 918 is associated with a second sub-feature of the first feature of the selected category (e.g., a subcategory for editing glasses 914, such as a color of the lenses of glasses 914). At FIG. 9G, electronic device 600 displays third graphical element 916 as being centered on display 602 and below avatar 900. Accordingly, the position of third graphical element 916 indicates that the first sub-feature (e.g., glasses color) of the first feature of the selected category is currently available for editing. In response to detecting rotational input(s) on rotatable input device 601, electronic device 600 adjusts settings or characteristics of avatar 900 that are associated with the first sub-feature of the first feature of the selected category (e.g., a color of the frames of glasses 914).

At FIG. 9G, user interface 902 includes third characteristic selection element 920 corresponding to the first sub-feature of the first feature of the selected category. Third characteristic selection element 920 includes characteristic options 920a, 920b, 920c, and 920d corresponding to individually selectable options for characteristics associated with the first sub-feature of the first feature of the selected category. At FIG. 9G, characteristic option 920a includes indicator 910 (e.g., selection indicator) surrounding characteristic option 920a indicating that characteristic option 920a, corresponding to a first color of the frames of glasses 914, is currently selected. In response to detecting inputs on rotatable input device 901, electronic device 600 transitions between characteristic options 920a, 920b, 920c, and/or 920d and display avatar 900 wearing glasses 914 with frames that have a color corresponding to the selected characteristic option 920a, 920b, 920c, or 920d (e.g., as indicated by indicator 910).

Figure 9H:
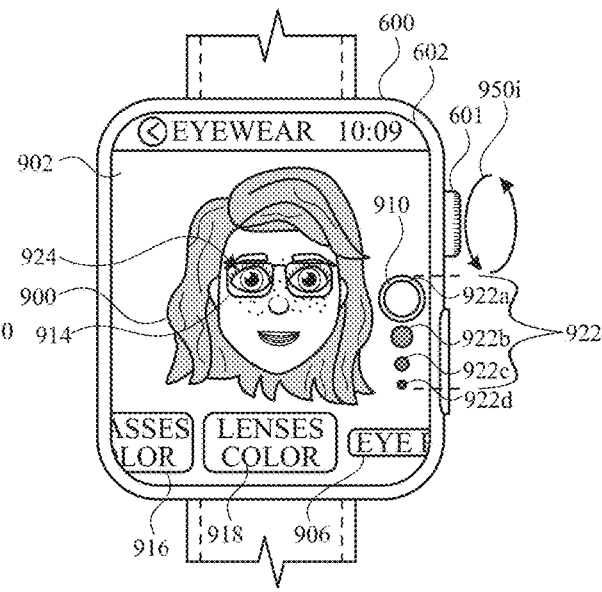

At FIG. 9G, electronic device 600 detects user input 950h (e.g., a swipe gesture) on user interface 902. In response to detecting, user input 950h, electronic device 600 displays a fourth page of user interface 902, as shown at FIG. 9H. At FIG. 9H, electronic device 600 displays third graphical element 916, fourth graphical element 918, and second graphical element 906. As set forth above, fourth graphical element 918 corresponds to the second sub-feature of the first feature (e.g., glasses) of the selected category. In the illustrated embodiments of FIGS. 9D-9J, the first feature of the selected category includes two sub-features (e.g., represented by third graphical element 916 and fourth graphical element 918) for the selected characteristic option (e.g., "glasses on", as opposed to the "no glasses" option). Therefore, electronic device 600 displays (e.g., re-displays) second graphical element 906 in response to user input 950h because there are no additional sub-features of the first feature for the selected characteristic option. In some embodiments, a respective feature of the selected category may include additional or fewer than two sub-features such that fewer or additional graphical elements are displayed in response to user inputs before second graphical element 906 is displayed (e.g., re-displayed) by electronic device 600.

At FIG. 9H, electronic device 600 displays fourth graphical element 918 as being centered on display 602 and below avatar 900. Accordingly, the position of fourth graphical element 918 indicates that the second sub-feature (e.g., lenses color) of the first feature of the selected category is currently available for editing. As described below, in response to detecting rotational input(s) on rotatable input device 601, electronic device 600 is configured to adjust settings or characteristics of avatar 900 that are associated with the second sub-feature of the first feature of the selected category (e.g., to adjust a color of the lenses of glasses 914).

At FIG. 9H, user interface 902 includes fourth characteristic selection element 922 corresponding to the second sub-feature of the first feature of the selected category. Fourth characteristic selection element 922 includes characteristic options 922a, 922b, 922c, and 922d corresponding to individually selectable options associated with the second sub-feature of the first feature of the selected category. At FIG. 9H, characteristic option 922a includes indicator 910 (e.g., selection indicator) surrounding characteristic option 922a indicating that characteristic option 922a corresponding to a first color (e.g., no lenses, clear lenses, and/or lenses without color) of lenses 924 of glasses 914 is currently selected. At FIG. 9H, electronic device 600 detects rotational input 950i on rotatable input device 901. In response to detecting rotational input 950i, electronic device 600 updates the fourth page of user interface 902, as shown at FIG. 9I.

Figure 9I:
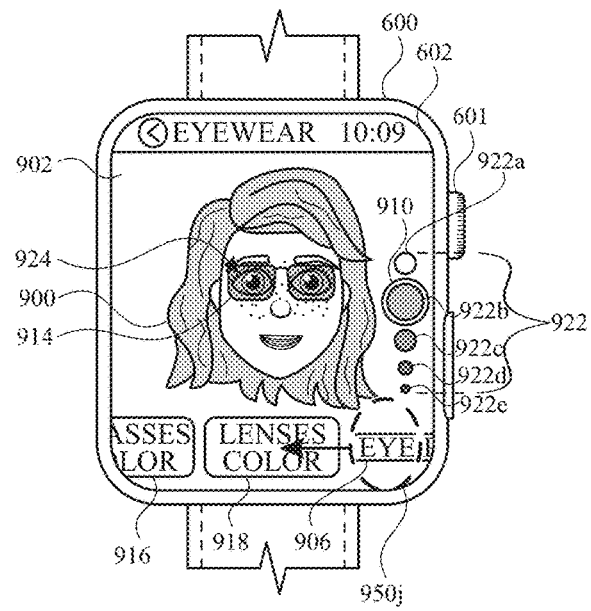

At FIG. 9I, electronic device 600 translates fourth characteristic selection element 922 such that fifth characteristic option 922e is displayed and indicator 910 surrounds second characteristic option 922b. Additionally, electronic device 600 displays avatar 900 wearing glasses 914 with a second color of lenses 924 that corresponds to second characteristic option 922b. Characteristic options 922c, 922d, and/or 922e correspond to avatar 900 wearing glasses 914 with different color lenses 924 (e.g., different colors than the first color and the second color). Thus, in response to detecting an additional rotational input (and/or a continuation of rotational input 950i), electronic device 600 transitions indicator 910 to one of characteristic options 922c, 922d, and/or 922e and displays avatar 900 as wearing glasses 914 having lenses 924 with a third color, different from the first color and the second color.

Figure 9J:
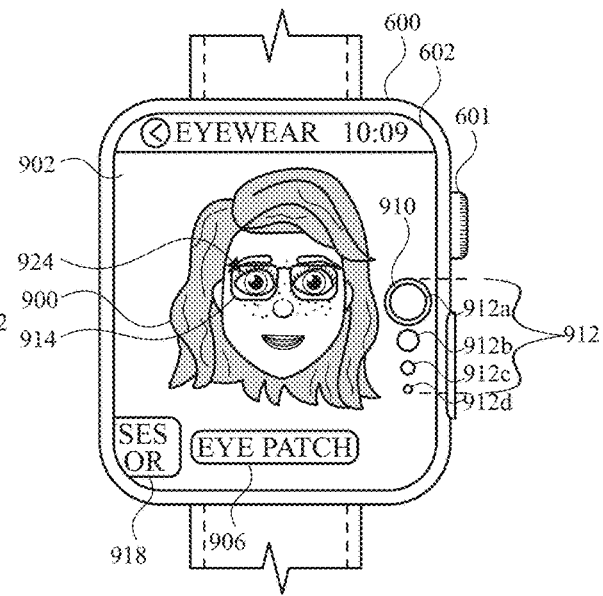
Figure 9K:
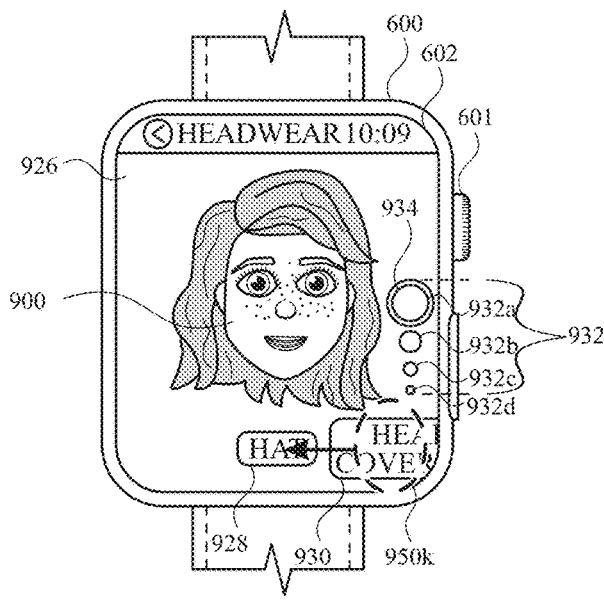

At FIG. 9I, electronic device 600 detects user input 950j (e.g., a swipe gesture) on user interface 902. In response to detecting user input 950j, electronic device 600 displays the second page of user interface 902, as shown at FIG. 9J. As set forth above, the second page of user interface 902 enables adjustment of the second feature (e.g., eye patch) of the selected category (e.g., eyewear). At FIG. 9J, electronic device 600 displays avatar 900 wearing glasses 914 having lenses 924 with the second color in accordance with user input 950j being detected while second characteristic option 922b is selected (e.g., as indicated by indicator 910 at FIG. 9I). Additionally, at FIG. 9J, the second page of user interface 902 includes second graphical element 906 and fourth graphical element 918. As such, electronic device 600 maintains display of fourth graphical element 918 because electronic device 600 detects that a characteristic option (e.g., second characteristic option 908b) corresponding to avatar 900 is wearing glasses 914 is selected, and thus, the second sub-feature of the first feature of the currently selected category is available for editing.

As discussed above, in response to detecting user input 950d at FIG. 9C, electronic device 600 displays user interface 926 (e.g., a first page of user interface 926) corresponding to headwear category 618h, as shown at FIG. 9K. At FIG. 9K, electronic device 600 displays avatar 900 on user interface 926 for editing a feature of the selected avatar category (e.g., headwear). User interface 926 includes first graphical element 928 (e.g., a first platter labeled "Hat") corresponding to a first feature (or a first subcategory) of the selected category and second graphical element 930 (e.g., a second platter labeled "Head Covering") corresponding to a second feature (or a second subcategory) of the selected avatar category. At FIG. 9K, electronic device 600 displays first graphical element 928 as being centered on display 602 and below avatar 900. Accordingly, the position of first graphical element 928 indicates that the first feature of the selected category is currently available for editing. In response to detecting rotational input(s) on rotatable input device 601, electronic device 600 adjusts settings or characteristic options of avatar 900 that are associated with the first feature of the selected category (e.g., transitions between avatar 900 without a hat and avatar 900 wearing different types and/or styles of hats).

At FIG. 9K, user interface 926 includes first characteristic selection element 932 corresponding to the first feature of the selected category. First characteristic selection element 932 includes characteristic options 932a, 932b, 932c, and 932d corresponding to individually selectable options associated with the first feature of the selected category. At FIG. 9K, characteristic option 932a includes indicator 934 (e.g., selection indicator) surrounding characteristic option 932a indicating that characteristic option 932a corresponding to avatar 900 without a hat is currently selected. At FIG. 9K, electronic device 600 detects user input 950k (e.g., a swipe gesture) on user interface 926. In response to detecting user input 950k, electronic device 600 displays a second page of user interface 926, as shown at FIG. 9L.

Figure 9L:
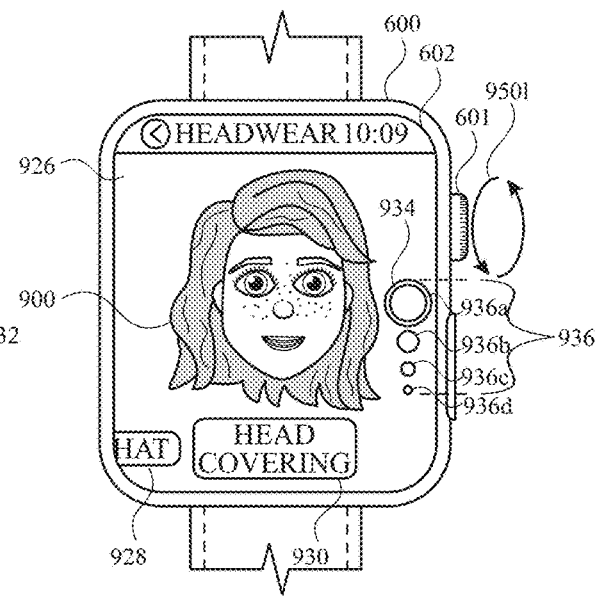

At FIG. 9L, the second page of user interface 926 enables adjustment of the second feature (e.g., head covering) of the selected category. At FIG. 9L, electronic device 600 displays second graphical element 930 as being centered on display 602 and below avatar 900. Accordingly, the position of second graphical element 930 indicates that the second feature of the selected avatar category is currently available for editing. In response to detecting rotational inputs on rotatable input device 601, electronic device 600 is configured to adjust settings or characteristics of avatar 900 that are associated with the second feature of the selected category (e.g., to transition between avatar 900 without a head covering and avatar 900 wearing different types and/or styles of head coverings).

Additionally, at FIG. 9L, user interface 926 includes second characteristic selection element 936 corresponding to the second feature of the selected avatar category. Second characteristic selection element includes characteristic options 936a, 936b, 936c, and 936d associated with individually selectable options for the second feature of the selected category. At FIG. 9L, electronic device 600 displays second graphical element 930 adjacent to (e.g., positioned next to) first graphical element 928 while second graphical element 930 is centered on display 602. As set forth above, when electronic device 600 detects user input 950k, characteristic option 932a of first characteristic selection element 932 is currently selected. Characteristic option 932a corresponds to an absence of the first feature of the selected category (e.g., no hat), as illustrated in FIGS. 9K and 9L, where avatar 900 is not wearing a hat. Accordingly, in response to user input 950k, electronic device 600 transitions from the first page of user interface 926 associated with first graphical element 928 to the second page of user interface 926 associated with second graphical element 930. As set forth above, when electronic device 600 detects that one of characteristic options 932b-932d of first characteristic selection element 932 is currently selected, electronic device 600 displays an additional graphical element associated with a sub-feature of the first feature of the selected category and, in some embodiments, replaces display of second graphical element 930 with the additional graphical element.

Figure 9M:
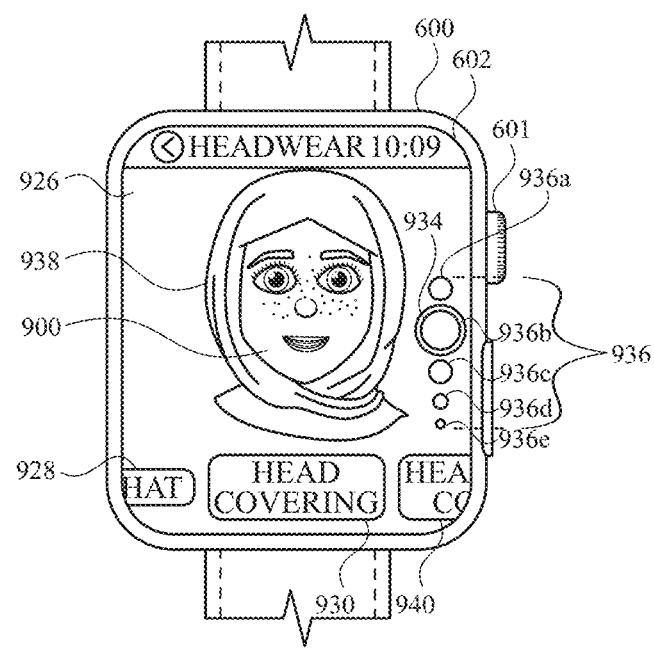

At FIG. 9L, electronic device 600 detects rotational input 950l on rotatable input device 601. In response to detecting rotational input 950l, electronic device 600 updates the second page of user interface 926, as shown at FIG. 9M. At FIG. 9M, electronic device 600 displays avatar 900 wearing head covering 938 in response to detecting rotational input 950l. Additionally, electronic device 600 translates characteristic options 936a-936d in accordance with a direction of rotational input 950l (e.g., characteristic options 936a-936d are translated in an upward direction in response to a clockwise rotation of rotatable input device 601). In some embodiments, electronic device 600 causes display of characteristic option 936e in response to detecting rotational input 950l.

Further, in response to detecting rotational input 950l, electronic device 600 transitions display of indicator 934 from first characteristic option 936a to second characteristic option 936b. Second characteristic option 936b corresponds to head covering 938, whereas first characteristic option 936a corresponds to an absence of a head covering on avatar 900. Additionally, characteristic options 936c, 936d, and/or 936e correspond to avatar 900 wearing a different head covering than head covering 938 (e.g., a different shape and/or type of head covering). Thus, in response to detecting an additional rotational input (and/or a continuation of rotational input 950l), electronic device 600 transitions indicator 934 to one of characteristic options 936c, 936d, and/or 936e and displays avatar 900 as wearing the corresponding head covering.

At FIG. 9M, electronic device 600 displays first graphical element 928, second graphical element 930, and third graphical element 940 (e.g., electronic device 600 causes third graphical element 940 to appear on display 602. Third graphical element 940 corresponds to a first sub-feature (e.g., a sub-option and/or a subcategory) of the second feature of the selected category. As set forth above, second characteristic option 936b is currently selected (e.g., as indicated by indicator 934) such that electronic device 600 displays avatar 900 as wearing head covering 938. Because second characteristic option 936b is associated with the presence of the first feature (e.g., avatar 900 wearing an accessory and/or head covering) of the selected category (e.g., headwear), electronic device 600 displays third graphical element 940, which is associated with the first sub-feature of the first feature of the selected category (e.g., a sub-feature for editing head covering 938, such as a color of head covering 938). Therefore, in response to detecting user input (e.g., a swipe gesture) on user interface 926, electronic device 600 displays a third page of user interface 926 that enables editing of the first sub-feature of the first feature of the selected category. When first characteristic option 936a is currently selected, electronic device 600 forgoes display of third graphical element 940.

FIGS. 10A-10C are flow diagrams illustrating methods for editing features of an avatar using a computer system, in accordance with some embodiments. Method 1000 is performed at a computer system (e.g., 100, 300, 500, 600, a smartwatch, a smartphone) with a display generation component (e.g., 602) and a rotatable input device (e.g., 601, a crown).

The computer system (e.g., 100, 300, 500, 600) displays (1002), via the display generation component (e.g., 602), an avatar editing user interface (e.g., 902) that includes a first characteristic selection element (e.g., 908) (e.g., a graphical element indicating a set of characteristic options (e.g., no glasses, glasses, eyepatch) for a feature (e.g., eyewear) of an avatar) corresponding to a set of (e.g., selectable) characteristic options (e.g., 908a-908d) for a first avatar feature of a virtual avatar (e.g., 900). In some embodiments, the first characteristic selection element (e.g., 908) includes one or more selectable characteristic options (e.g., 908a-908d) (e.g., affordances) for selecting a characteristic for the corresponding avatar feature. In some embodiments, the computer system (e.g., 100, 300, 500, 600) displays the first characteristic selection element (e.g., 908, 910) on, adjacent to, and/or around a respective characteristic option to indicate which of the set of characteristic options (e.g., 908a-

908*d*) for the first avatar feature is selected. In some embodiments, the computer system (e.g., 100, 300, 500, 600) translates and/or causes movement of the set of characteristic options (e.g., 908*a*-908*d*) with respect to the first characteristic selection element (e.g., 908) in response to user input (e.g., 950*f*), such as a rotational gesture on a rotatable input device (e.g., 601) (e.g., crown) of the computer system (e.g., 100, 300, 500, 600), a tap gesture corresponding to a position of the respective characteristic option on the display generation component (e.g., 602), and/or a swipe gesture on the display generation component (e.g., 602). In some embodiments, the respective characteristic option (e.g., 908*a*) is associated with an option that includes an absence of the first avatar feature (e.g., an avatar without eyewear and/or headwear). In some embodiments, the respective characteristic option (e.g., 908*b*-908*d*) is associated with an option that includes a particular option for the first avatar feature (e.g., an avatar wearing a pair of glasses, an eyepatch, a hat, and/or a head covering).

The computer system (e.g., 100, 300, 500, 600), while displaying the avatar editing user interface (e.g., 902), detects (1004), via the one or more input devices, an input (e.g., 950*e*, 950*g*) (e.g., a swipe input on a touch sensitive surface such as a touchscreen display and/or a tap gesture on a user interface object corresponding to the next feature of the avatar on a touch sensitive surface such as a touchscreen display) corresponding to a request to display a characteristic selection element (e.g., 912, 920, 922) corresponding to a set of characteristic options (e.g., 912*a*-912*d*, 920*a*-920*d*, 922*a*-922*d*) for a feature different from the first avatar feature of the virtual avatar (e.g., a feature that is a sub-feature or subcategory of the first avatar feature and/or a feature that is adjacent to the first avatar feature in a list of avatar features to edit for the avatar displayed on the avatar editing user interface).

The computer system (e.g., 100, 300, 500, 600), in response to detecting (1006) the input (e.g., 950*e*, 950*g*) and in accordance with a determination (1008) that a first characteristic option (e.g., 908*a*) of the set of characteristic options (e.g., 908*a*-908*d*) for the first avatar feature of the virtual avatar (e.g., 900) is selected (e.g., when the input is detected) (e.g., the first characteristic option for the first avatar feature is designated by the first characteristic selection element and the first characteristic option corresponds to an absence of the first avatar feature, such as an avatar without eyewear and/or headwear), displays (1010) a second characteristic selection element (e.g., 912) corresponding to a set of characteristic options (e.g., 912*a*-912*d*) for a second avatar feature of the virtual avatar (e.g., 900) (e.g., a second avatar feature that is different from the first avatar feature; a different feature category from the first avatar feature).

The computer system (e.g., 100, 300, 500, 600), in response to detecting (1006) the input (e.g., 950*e*, 950*g*) and in accordance with a determination (1016) that a second characteristic option (e.g., 908*b*-908*d*), different from the first characteristic option (e.g., 908*a*), of the set of characteristic options (e.g., 908*a*-908*d*) for the first avatar feature of the virtual avatar (e.g., 900) is selected (e.g., the second characteristic option for the first avatar feature is designated by the first characteristic selection element and the second characteristic option corresponds to a particular option for the first avatar feature, such as an avatar wearing a pair of glasses, an eyepatch, a hat, and/or a head covering), displays (1018) a third characteristic selection element (e.g., 920, 922) corresponding to a set of characteristic options (e.g., 920*a*-920*d*, 922*a*-922*d*) for a third avatar feature of the virtual avatar (e.g., 900), different from the second avatar feature of the virtual avatar (e.g., 900) (e.g., the third avatar feature is a sub-feature or subcategory of the first avatar feature, such as a color for a pair of glasses, a lens color for the pair of glasses, a color for any eyepatch, a color for a hat, and/or a color for headwear).

Displaying a second characteristic selection element corresponding to a set of characteristic options for a second avatar feature of the virtual avatar or a third characteristic selection element corresponding to a set of characteristic options for a third avatar feature of the virtual avatar, different from the second avatar feature of the virtual avatar, depending on whether a first characteristic option or a different second characteristic option of the set of characteristic options for the first avatar feature of the virtual avatar is selected provides improved feedback by indicating what avatar editing options are available to the user based on the selected characteristic option. Doing so also provides the ability to display additional control options without cluttering the user interface with additional displayed controls by displaying a characteristic selection element for only available sets of characteristic options. Providing improved feedback and additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), in response to detecting (1006) the input (e.g., 950*e*, 950*g*) and in accordance with the determination (1008) that the first characteristic option (e.g., 908*a*) of the set of characteristic options (e.g., 908*a*-908*d*) for the first avatar feature is selected, forgoes (1012) display of the third characteristic selection element (e.g., 920, 922) corresponding to the set of characteristic options (e.g., 920*a*-920*d*, 922*a*-922*d*) for the third avatar feature of the virtual avatar (e.g., 900) (e.g., do not display a graphical element corresponding to a sub-feature or subcategory of the first avatar feature of the virtual avatar, such as an indication of characteristic options for a subcategory of the first avatar feature or a platter or label for a subcategory of the first avatar feature).

Foregoing display of the third characteristic selection element corresponding to the set of characteristic options for the third avatar feature of the virtual avatar in response to detecting the input and in accordance with the determination that the first characteristic option of the set of characteristic options for the first avatar feature is selected provides improved feedback by indicating that the set of characteristic options for the third avatar feature of the virtual avatar is not available for selection. Doing so also prevents cluttering the user interface with additional displayed controls by not displaying a characteristic selection element for a set of characteristic options that is not available. Providing improved feedback without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second characteristic option (e.g., 908*b*-908*d*) of the set of characteristic options (e.g., 908*a*-908*d*) for the first avatar feature (e.g., eyewear) of the virtual avatar (e.g., 900) includes a pair of glasses (e.g., 914) (e.g., the first avatar feature corresponds to eyewear (or the like) for the virtual avatar and an option is selected such that the virtual avatar is displayed wearing a pair of glasses), the third avatar feature of the virtual avatar (e.g., 900) includes a color of the pair of glasses (e.g., frame color and/or lens color; if a pair of glasses is selected for the eyewear category (e.g., as opposed to a "no-glasses" option), the computer system provides the ability to select a color of the frame of the pair of glasses and/or a color of the lenses of the pair of glasses; the third characteristic selection element corresponds to a set of color options for the frame of the pair of glasses and/or the lenses of the pair of glasses).

Including a color of the pair of glasses for the third avatar feature in accordance with a determination that the second characteristic option of the set of characteristic options for the first avatar feature of the virtual avatar includes a pair of glasses provides improved feedback by presenting the user with the ability to edit a relevant feature of the selected characteristic option. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the color of the pair of glasses (e.g., 914) of the third avatar feature of the virtual avatar (e.g., 900) corresponds to a color of a first portion (e.g., the frame) of the pair of glasses (e.g., 900). The computer system, while displaying (1026) the avatar editing user interface (e.g., 902), including the third characteristic selection element (e.g., 920, 922) corresponding to the set of characteristic options (e.g., 920a-920d, 922a-922d) for the third avatar feature of the virtual avatar (e.g., 900) (e.g., a characteristic selection element for the color of the frame (frame color) of the pair of glasses), detects (1028), via the one or more input devices, a second input (e.g., 950h) (e.g., a swipe input on a touch sensitive surface such as a touchscreen display and/or a tap gesture on a user interface object corresponding to the next feature of the avatar on a touch sensitive surface such as a touchscreen display) corresponding to a request to display a characteristic selection element (e.g., 922) corresponding to a set of characteristic options (e.g., 922a-922d) for a feature different from the third avatar feature of the virtual avatar (e.g., not frame color) and different from the first avatar feature of the virtual avatar (e.g., not the eyewear category).

The computer system, in response to detecting the second input (e.g., 950h), displays (1030) a fourth characteristic selection element (e.g., 922) corresponding to a set of options for a color of a second portion (e.g., the lenses) of the pair of glasses (e.g., 914) that is different from the first portion of the pair of glasses (e.g., 914).

Displaying a fourth characteristic selection element corresponding to a set of options for a color of a second portion of the pair of glasses that is different from the first portion of the pair of glasses in response to detecting the second input corresponding to a request to display a characteristic selection element corresponding to a set of characteristic options for a feature different from the third avatar feature of the virtual avatar and different from the first avatar feature of the virtual avatar provides improved feedback that allows the user to easily and efficiently edit additional features related to the selected characteristic option for the first avatar feature of the virtual avatar. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second characteristic option (e.g., 936b-936d) of the set of characteristic options (e.g., 936a-936d) for the first avatar feature (e.g., headwear) of the virtual avatar (e.g., 900) includes a head covering (e.g., 938) (e.g., the first avatar feature corresponds to headwear (or the like) for the virtual avatar and an option is selected such that the virtual avatar is displayed wearing a head covering), the third avatar feature of the virtual avatar (e.g., 900) includes a color of the head covering (e.g., 938) (e.g., if a head covering is selected for the headwear category (e.g., as opposed to a "no-head wear" option), the computer system provides the ability to select a color of the headwear; the third characteristic selection element corresponds to a set of color options for the headwear).

Including a color of the head covering for the third avatar feature in accordance with a determination that the second characteristic option of the set of characteristic options for the first avatar feature of the virtual avatar includes a head covering provides improved feedback by presenting the user with the ability to edit a relevant feature of the selected characteristic option. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600) (e.g., while displaying the avatar editing user interface that includes the first characteristic selection element corresponding to the set of characteristic options for the first avatar feature of the virtual avatar), in accordance with a determination (1008) that the first characteristic option (e.g., 908a) of the set of characteristic options (e.g., 908a-908d) for the first avatar feature of the virtual avatar (e.g., 900) is selected (e.g., no eyewear or no headwear), displays (1014) a graphical element (e.g., 906) (e.g., a platter with text) that identifies the second avatar feature of the virtual avatar (e.g., 900) (e.g., a different category from the first avatar feature) without displaying a graphical element (e.g., 916, 918) that identifies the third avatar feature of the virtual avatar (e.g., 900) (e.g., a subcategory of the first avatar feature or the second characteristic option).

The computer system (e.g., 100, 300, 500, 600), in accordance with a determination (1016) that the second characteristic option (e.g., 908b-908d) of the set of characteristic options (e.g., 908a-908d) for the first avatar feature of the virtual avatar (e.g., 900) is selected (e.g., glasses or a head covering), displays (1020) the graphical element (e.g., 916, 918) that identifies the third avatar feature of the virtual avatar (e.g., 900) (e.g., without displaying the graphical element (e.g., 906) that identifies the second avatar feature of the virtual avatar; the graphical element that identifies the third avatar feature replaces the graphical element that identifies the second avatar feature). In some embodiments, in response to selection of the second characteristic option of the set of characteristic options for the first avatar feature of the virtual avatar (e.g., via rotation of a rotatable input mechanism or a touch gesture on a portion of the first characteristic selection element that corresponds to the second characteristic option), the computer system replaces a display of the graphical element that identifies the second avatar feature of the virtual avatar with a display of the graphical element that identifies the third avatar feature of the virtual avatar.

Displaying a graphical element that identifies the third avatar feature or displaying a graphical element that identifies the second avatar feature without displaying the graphical element that identifies the third avatar feature depending on what characteristic option is selected for the first avatar feature provides improved feedback by indicating to the user what features are (and are not) available to be edited. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), while displaying the graphical element (e.g., 916, 918) that identifies the third avatar feature of the virtual avatar (e.g., 900) (e.g., a subcategory of the first avatar feature and/or the second characteristic option), detects (1022) a third input (e.g., 950*i*) corresponding to a selection of a third characteristic option (e.g., 908*a*) of the set of characteristic options (e.g., 908*a*-908*d*) for the first avatar feature of the virtual avatar (e.g., 900) that is different from the second characteristic option (e.g., 908*b*-908*d*) of the set of characteristic options (e.g., 908*a*-908*d*) for the first avatar feature of the virtual avatar (e.g., 900) (e.g., selection of the first characteristic option).

The computer system (e.g., 100, 300, 500, 600), in response to detecting the third input (e.g., 905*i*), ceases (1024) display of the graphical element (e.g., 916, 918) that identifies the third avatar feature of the virtual avatar (e.g., 900) (e.g., and display (or re-display) the graphical element (e.g., 906) that identifies the second avatar feature; replace the graphical element that identifies the third avatar feature with the graphical element that identifies the second avatar feature).

Ceasing display of the graphical element that identifies the third avatar feature of the virtual avatar in response to detecting the third input corresponding to a selection of a third characteristic option of the set of characteristic options for the first avatar feature of the virtual avatar provides improved feedback to the user about what avatar features are (and are not) available to be edited and prevents cluttering the user interface with additional elements related to avatar features that are not available for editing. Providing improved feedback and preventing cluttering the user interface with additional elements enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third avatar feature of the virtual avatar (e.g., 900) (e.g., a subcategory of the first avatar feature) includes a first feature (e.g., frame color) of the second characteristic option (e.g., 908*b*-908*d*) (e.g., glasses; the third characteristic selection element corresponds to a set of characteristic options (e.g., colors) for the second characteristic option (e.g., glasses) or a feature of the second characteristic option (e.g., a frame of the glasses)).

Including a first feature of the second characteristic option for the third avatar feature provides improved feedback by presenting the user with the ability to edit a relevant feature of the selected characteristic option. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), while displaying (1026) the avatar editing user interface (e.g., 902), including the third characteristic selection element (e.g., 920) corresponding to the set of characteristic options (e.g., 920*a*-920*d*) for the third avatar feature of the virtual avatar (e.g., 900) (e.g., a characteristic selection element for the selected option), detects (1032), via the one or more input devices, a fourth input (e.g., 950*h*) (e.g., a swipe input on a touch sensitive surface such as a touchscreen display and/or a tap gesture on a user interface object corresponding to the next feature of the avatar on a touch sensitive surface such as a touchscreen display) corresponding to a request to display a characteristic selection element (e.g., 922) corresponding to a set of characteristic options (e.g., 922*a*-922*d*) for a feature different from the third avatar feature of the virtual avatar (e.g., not the current subcategory) and different from the first avatar feature of the virtual avatar (e.g., not the category).

The computer system (e.g., 100, 300, 500, 600), in response to detecting the fourth input (e.g., 950*h*), displays (1034) a fifth characteristic selection element (e.g., 922) corresponding to a set of characteristic options (e.g., 922*a*-922*d*) for a fourth avatar feature of the virtual avatar (e.g., 900) that is different from the third avatar feature of the virtual avatar (e.g., 900), where the fourth avatar feature of the virtual avatar (e.g., 900) includes a second feature of the second characteristic option (e.g., 608*b*) that is different from the first feature of the second characteristic option (e.g., 608*b*).

Displaying the fifth characteristic selection element corresponding to the set of characteristic options for a fourth avatar feature of the virtual avatar in response to detecting the fourth input, provides additional control options for the user without cluttering the user interface with additional controls by allowing the user to easily access options for a feature that is related to a selected avatar feature. Providing additional control options without cluttering the user interface with additional display controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIGS. 10A-10C) are also applicable in an analogous manner to the methods described above. For example, method 1000 optionally includes one or more of the characteristics of the various methods described above with reference to methods 700 and 800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to edit features of an avatar. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to create an avatar with a similar likeness to a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system, comprising:
   a display generation component;
   one or more input devices;
   one or more processors; and
   memory storing one or more programs configured to be executed by the one or more processors, the one or more programs including instructions for:
      displaying, via the display generation component, an avatar editing user interface that includes a first characteristic selection element corresponding to a set of characteristic options for a first avatar feature of a virtual avatar;
      while displaying the avatar editing user interface, detecting, via the one or more input devices, an input corresponding to a request to display a characteristic selection element corresponding to a set of characteristic options for a feature different from the first avatar feature of the virtual avatar; and
      in response to detecting the input:
         in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

2. The computer system of claim 1, wherein the one or more programs further include instructions for:

in response to detecting the input and in accordance with the determination that the first characteristic option of the set of characteristic options for the first avatar feature is selected, foregoing display of the third characteristic selection element corresponding to the set of characteristic options for the third avatar feature of the virtual avatar.

3. The computer system of claim 1, wherein:

in accordance with a determination that the second characteristic option of the set of characteristic options for the first avatar feature of the virtual avatar includes a pair of glasses, the third avatar feature of the virtual avatar includes a color of the pair of glasses.

4. The computer system of claim 3, wherein the color of the pair of glasses of the third avatar feature of the virtual avatar corresponds to a color of a first portion of the pair of glasses, wherein the one or more programs further include instructions for:

while displaying the avatar editing user interface, including the third characteristic selection element corresponding to the set of characteristic options for the third avatar feature of the virtual avatar, detecting, via the one or more input devices, a second input corresponding to a request to display a characteristic selection element corresponding to a set of characteristic options for a feature different from the third avatar feature of the virtual avatar and different from the first avatar feature of the virtual avatar; and in response to detecting the second input, displaying a fourth characteristic selection element corresponding to a set of options for a color of a second portion of the pair of glasses that is different from the first portion of the pair of glasses.

5. The computer system of claim 1, wherein:

in accordance with a determination that the second characteristic option of the set of characteristic options for the first avatar feature of the virtual avatar includes a head covering, the third avatar feature of the virtual avatar includes a color of the head covering.

6. The computer system of claim 1, wherein the one or more programs further include instructions for:

in accordance with the determination that the first characteristic option of the set of characteristic options for the first avatar feature of the virtual avatar is selected, displaying a graphical element that identifies the second avatar feature of the virtual avatar without displaying a graphical element that identifies the third avatar feature of the virtual avatar; and in accordance with the determination that the second characteristic option of the set of characteristic options for the first avatar feature of the virtual avatar is selected, displaying the graphical element that identifies the third avatar feature of the virtual avatar.

7. The computer system of claim 6, wherein the one or more programs further include instructions for:

while displaying the graphical element that identifies the third avatar feature of the virtual avatar, detecting a third input corresponding to a selection of a third characteristic option of the set of characteristic options for the first avatar feature of the virtual avatar that is different from the second characteristic option of the set of characteristic options for the first avatar feature of the virtual avatar; and in response to detecting the third input, ceasing display of the graphical element that identifies the third avatar feature of the virtual avatar.

8. The computer system of claim 1, wherein the third avatar feature of the virtual avatar includes a first feature of the second characteristic option.

9. The computer system of claim 8, wherein the one or more programs further include instructions for:

while displaying the avatar editing user interface, including the third characteristic selection element corresponding to the set of characteristic options for the third avatar feature of the virtual avatar, detecting, via the one or more input devices, a fourth input corresponding to a request to display a characteristic selection element corresponding to a set of characteristic options for a feature different from the third avatar feature of the virtual avatar and different from the first avatar feature of the virtual avatar; and in response to detecting the fourth input, displaying a fifth characteristic selection element corresponding to a set of characteristic options for a fourth avatar feature of the virtual avatar that is different from the third avatar feature of the virtual avatar, wherein the fourth avatar feature of the virtual avatar includes a second feature of the second characteristic option that is different from the first feature of the second characteristic option.

10. A non-transitory computer-readable storage medium storing one or more programs configured to be executed by one or more processors of a computer system with a display generation component and one or more input devices, the one or more programs including instructions for:

displaying, via the display generation component, an avatar editing user interface that includes a first characteristic selection element corresponding to a set of characteristic options for a first avatar feature of a virtual avatar;

while displaying the avatar editing user interface, detecting, via the one or more input devices, an input corresponding to a request to display a characteristic selection element corresponding to a set of characteristic options for a feature different from the first avatar feature of the virtual avatar; and in response to detecting the input:

in accordance with a determination that a first characteristic option of the set of characteristic options for the first avatar feature of the virtual avatar is selected, displaying a second characteristic selection element corresponding to a set of characteristic options for a second avatar feature of the virtual avatar; and in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

11. The non-transitory computer-readable storage medium of claim 10, wherein the one or more programs further include instructions for:
   in response to detecting the input and in accordance with the determination that the first characteristic option of the set of characteristic options for the first avatar feature is selected, foregoing display of the third characteristic selection element corresponding to the set of characteristic options for the third avatar feature of the virtual avatar.

12. The non-transitory computer-readable storage medium of claim 10, wherein:
   in accordance with a determination that the second characteristic option of the set of characteristic options for the first avatar feature of the virtual avatar includes a pair of glasses, the third avatar feature of the virtual avatar includes a color of the pair of glasses.

13. The non-transitory computer-readable storage medium of claim 12, wherein the color of the pair of glasses of the third avatar feature of the virtual avatar corresponds to a color of a first portion of the pair of glasses, wherein the one or more programs further include instructions for:
   while displaying the avatar editing user interface, including the third characteristic selection element corresponding to the set of characteristic options for the third avatar feature of the virtual avatar, detecting, via the one or more input devices, a second input corresponding to a request to display a characteristic selection element corresponding to a set of characteristic options for a feature different from the third avatar feature of the virtual avatar and different from the first avatar feature of the virtual avatar; and
   in response to detecting the second input, displaying a fourth characteristic selection element corresponding to a set of options for a color of a second portion of the pair of glasses that is different from the first portion of the pair of glasses.

14. The non-transitory computer-readable storage medium of claim 10, wherein:
   in accordance with a determination that the second characteristic option of the set of characteristic options for the first avatar feature of the virtual avatar includes a head covering, the third avatar feature of the virtual avatar includes a color of the head covering.

15. The non-transitory computer-readable storage medium of claim 10, wherein the one or more programs further include instructions for:
   in accordance with the determination that the first characteristic option of the set of characteristic options for the first avatar feature of the virtual avatar is selected, displaying a graphical element that identifies the second avatar feature of the virtual avatar without displaying a graphical element that identifies the third avatar feature of the virtual avatar; and
   in accordance with the determination that the second characteristic option of the set of characteristic options for the first avatar feature of the virtual avatar is selected, displaying the graphical element that identifies the third avatar feature of the virtual avatar.

16. The non-transitory computer-readable storage medium of claim 15, wherein the one or more programs further include instructions for:
   while displaying the graphical element that identifies the third avatar feature of the virtual avatar, detecting a third input corresponding to a selection of a third characteristic option of the set of characteristic options for the first avatar feature of the virtual avatar that is different from the second characteristic option of the set of characteristic options for the first avatar feature of the virtual avatar; and
   in response to detecting the third input, ceasing display of the graphical element that identifies the third avatar feature of the virtual avatar.

17. The non-transitory computer-readable storage medium of claim 10, wherein the third avatar feature of the virtual avatar includes a first feature of the second characteristic option.

18. The non-transitory computer-readable storage medium of claim 17, wherein the one or more programs further include instructions for:
   while displaying the avatar editing user interface, including the third characteristic selection element corresponding to the set of characteristic options for the third avatar feature of the virtual avatar, detecting, via the one or more input devices, a fourth input corresponding to a request to display a characteristic selection element corresponding to a set of characteristic options for a feature different from the third avatar feature of the virtual avatar and different from the first avatar feature of the virtual avatar; and
   in response to detecting the fourth input, displaying a fifth characteristic selection element corresponding to a set of characteristic options for a fourth avatar feature of the virtual avatar that is different from the third avatar feature of the virtual avatar, wherein the fourth avatar feature of the virtual avatar includes a second feature of the second characteristic option that is different from the first feature of the second characteristic option.

19. A method, comprising:
   at a computer system that is in communication with a display generation component and one or more input devices:
      displaying, via the display generation component, an avatar editing user interface that includes a first characteristic selection element corresponding to a set of characteristic options for a first avatar feature of a virtual avatar;
      while displaying the avatar editing user interface, detecting, via the one or more input devices, an input corresponding to a request to display a characteristic selection element corresponding to a set of characteristic options for a feature different from the first avatar feature of the virtual avatar; and
      in response to detecting the input:
         in accordance with a determination that a first characteristic option of the set of characteristic options for the first avatar feature of the virtual avatar is selected, displaying a second characteristic selection element corresponding to a set of characteristic options for a second avatar feature of the virtual avatar; and
         in accordance with a determination that a second characteristic option, different from the first characteristic option, of the set of characteristic options for the first avatar feature of the virtual avatar is selected, displaying a third characteristic selection element corresponding to a set of characteristic options for a third avatar feature of the virtual avatar, different from the second avatar feature of the virtual avatar.

20. The method of claim 19, wherein the one or more programs further include instructions for:

in response to detecting the input and in accordance with the determination that the first characteristic option of the set of characteristic options for the first avatar feature is selected, foregoing display of the third characteristic selection element corresponding to the set of characteristic options for the third avatar feature of the virtual avatar.

21. The method of claim 19, wherein:
in accordance with a determination that the second characteristic option of the set of characteristic options for the first avatar feature of the virtual avatar includes a pair of glasses, the third avatar feature of the virtual avatar includes a color of the pair of glasses.

22. The method of claim 21, wherein the color of the pair of glasses of the third avatar feature of the virtual avatar corresponds to a color of a first portion of the pair of glasses, wherein the one or more programs further include instructions for:
while displaying the avatar editing user interface, including the third characteristic selection element corresponding to the set of characteristic options for the third avatar feature of the virtual avatar, detecting, via the one or more input devices, a second input corresponding to a request to display a characteristic selection element corresponding to a set of characteristic options for a feature different from the third avatar feature of the virtual avatar and different from the first avatar feature of the virtual avatar; and
in response to detecting the second input, displaying a fourth characteristic selection element corresponding to a set of options for a color of a second portion of the pair of glasses that is different from the first portion of the pair of glasses.

23. The method of claim 19, wherein:
in accordance with a determination that the second characteristic option of the set of characteristic options for the first avatar feature of the virtual avatar includes a head covering, the third avatar feature of the virtual avatar includes a color of the head covering.

24. The method of claim 19, wherein the one or more programs further include instructions for:
in accordance with the determination that the first characteristic option of the set of characteristic options for the first avatar feature of the virtual avatar is selected, displaying a graphical element that identifies the second avatar feature of the virtual avatar without displaying a graphical element that identifies the third avatar feature of the virtual avatar; and
in accordance with the determination that the second characteristic option of the set of characteristic options for the first avatar feature of the virtual avatar is selected, displaying the graphical element that identifies the third avatar feature of the virtual avatar.

25. The method of claim 24, wherein the one or more programs further include instructions for:
while displaying the graphical element that identifies the third avatar feature of the virtual avatar, detecting a third input corresponding to a selection of a third characteristic option of the set of characteristic options for the first avatar feature of the virtual avatar that is different from the second characteristic option of the set of characteristic options for the first avatar feature of the virtual avatar; and
in response to detecting the third input, ceasing display of the graphical element that identifies the third avatar feature of the virtual avatar.

26. The method of claim 19, wherein the third avatar feature of the virtual avatar includes a first feature of the second characteristic option.

27. The method of claim 26, wherein the one or more programs further include instructions for:
while displaying the avatar editing user interface, including the third characteristic selection element corresponding to the set of characteristic options for the third avatar feature of the virtual avatar, detecting, via the one or more input devices, a fourth input corresponding to a request to display a characteristic selection element corresponding to a set of characteristic options for a feature different from the third avatar feature of the virtual avatar and different from the first avatar feature of the virtual avatar; and
in response to detecting the fourth input, displaying a fifth characteristic selection element corresponding to a set of characteristic options for a fourth avatar feature of the virtual avatar that is different from the third avatar feature of the virtual avatar, wherein the fourth avatar feature of the virtual avatar includes a second feature of the second characteristic option that is different from the first feature of the second characteristic option.

* * * * *